United States Patent [19]

Bernard, II

[11] Patent Number: 5,593,269
[45] Date of Patent: Jan. 14, 1997

[54] AUTOMATED WORK CENTER

[75] Inventor: Clay Bernard, II, Pt. Richmond, Calif.

[73] Assignee: Computer Aided Systems, Inc., Hayward, Calif.

[21] Appl. No.: 163,654

[22] Filed: Dec. 3, 1993

Related U.S. Application Data

[63] Continuation of Ser. No. 931,648, Aug. 17, 1992, Pat. No. 5,273,392, which is a continuation of Ser. No. 484,050, Feb. 22, 1990, abandoned, which is a division of Ser. No. 214,568, Jul. 1, 1988, abandoned, which is a continuation-in-part of Ser. No. 815,808, Jan. 2, 1986, abandoned, and a continuation-in-part of Ser. No. 15,083, Feb. 17, 1987, abandoned, and a continuation-in-part of Ser. No. 158,310, Feb. 22, 1988, abandoned.

[51] Int. Cl.$^6$ .................................................. B65G 1/10
[52] U.S. Cl. .................. 414/331; 414/417; 198/469.1; 198/800; 211/1.51; 312/268
[58] Field of Search .................................. 414/786, 331, 414/278, 285, 286, 273, 274, 287, 222, 417; 312/268; 364/478; 211/1.5; 198/469.1, 793, 475.1, 794, 474.1, 797, 478.1, 798, 481.1, 799, 800, 339.1, 340, 345, 346.2, 855, 575, 570, 571, 572, 341, 502.2

[56] References Cited

U.S. PATENT DOCUMENTS

| | | | |
|---|---|---|---|
| 844,806 | 2/1907 | Jones | 198/801 |
| 931,570 | 8/1909 | Courtney | 198/798 |
| 1,020,746 | 3/1912 | Dehler . | |
| 1,046,386 | 12/1912 | Heimer | 198/800 |
| 1,153,316 | 4/1915 | Olson | 198/137 |
| 1,525,870 | 2/1925 | Lee | 198/463.3 |
| 1,669,497 | 5/1928 | Steegmuller | 193/351 |
| 1,718,512 | 6/1929 | Wright et al. . | |

(List continued on next page.)

FOREIGN PATENT DOCUMENTS

| | | | |
|---|---|---|---|
| 0140393 | 3/1981 | European Pat. Off. . | |
| 1343507 | 10/1963 | France | 198/346 |
| 1427294 | 4/1966 | France . | |
| 2587005 | 3/1987 | France . | |
| 424919 | 9/1924 | Germany . | |
| 2515829 | 10/1976 | Germany . | |
| 2514932 | 10/1986 | Germany . | |
| 3218253 | 5/1987 | Germany . | |

(List continued on next page.)

OTHER PUBLICATIONS

EPO Publication 0 123 556 A1, Oct. 31, 1984.
EPO Publication 0 272 340 A1, Jun. 29, 1988.
Patent Abstracts of Japan, vol. 8, No. 152 (M–309) (1589), Jul. 14, 1984.
International Patent Pub. WO 86/05943, Oct. 9, 1986.

*Primary Examiner*—Frank E. Werner
*Attorney, Agent, or Firm*—William J. Egan, III; Fish & Richardson PC

[57] ABSTRACT

An automated work center for use in materials handling operations is disclosed. The work center includes a randomly accessible vertically moving temporary storage queue 11 for receiving containers 25 that hold material goods. A fixed loading ramp 20 is arranged to receive containers 20 from an external system and to load the received containers onto the storage queue 11. A work area 5 having a plurality of rotatable work tables 7 provides an gives the operator access to the containers. A delivery system 14 transfers containers between the storage queue 11 and the work tables 7 and a takeaway system 16 transfers containers between the work area and the conveyor network. An automated control system 17 coordinates the delivery of containers between the temporary storage queue 11 and the work area 5. A consolidation queue 18 having a multiplicity of vertically spaced shelves may be disposed opposite the work tables 7 to facilitate the consolidation of ordered goods.

17 Claims, 34 Drawing Sheets

U.S. PATENT DOCUMENTS

| | | | |
|---|---|---|---|
| 2,226,742 | 12/1940 | Raymond | 154/9 |
| 2,353,638 | 7/1944 | Beaulieu et al. | 198/341 |
| 2,605,912 | 8/1952 | Small et al. | |
| 2,707,548 | 5/1955 | Furst | 198/477.1 |
| 2,734,617 | 2/1956 | Temple | 198/31 |
| 2,736,419 | 2/1956 | Ferro | 198/75 |
| 3,062,358 | 11/1962 | Woodward | |
| 3,068,987 | 12/1962 | Franklin | 198/435 |
| 3,133,622 | 5/1964 | Immesberger | 198/346 |
| 3,148,785 | 9/1964 | Fauconnier | 414/243 |
| 3,184,032 | 5/1965 | Jonsson | |
| 3,244,304 | 4/1966 | Pollak, Jr. et al. | |
| 3,268,055 | 8/1966 | Stein et al. | 198/457 |
| 3,368,688 | 2/1968 | Weiss et al. | 211/122 |
| 3,379,321 | 4/1968 | Weir | 414/267 |
| 3,415,353 | 12/1968 | Oertle, Jr. | |
| 3,424,321 | 1/1969 | Lichti | 198/797 |
| 3,448,870 | 6/1969 | Gallo et al. | |
| 3,509,688 | 5/1970 | Hartbauer et al. | 53/163 |
| 3,532,201 | 10/1970 | McConnell | 193/35 A |
| 3,534,850 | 10/1970 | Roger et al. | 198/301 |
| 3,547,281 | 1/1970 | Lichti | 198/797 |
| 3,554,391 | 1/1971 | Goodell | |
| 3,571,892 | 3/1971 | Levy | 29/208 |
| 3,581,865 | 6/1971 | Adams | 198/19 |
| 3,593,862 | 7/1971 | Pierson | |
| 3,605,912 | 8/1952 | Small et al. | |
| 3,627,110 | 12/1971 | Lichti | 198/798 |
| 3,633,726 | 1/1972 | Carlier | 198/20 |
| 3,642,158 | 2/1972 | Koennecke et al. | |
| 3,656,608 | 4/1972 | Lichti | 198/798 |
| 3,661,284 | 5/1972 | Traube | |
| 3,670,867 | 6/1972 | Traube | 414/134 |
| 3,672,485 | 6/1972 | Walters | 198/26 |
| 3,695,462 | 10/1972 | Sullivan | |
| 3,726,383 | 4/1973 | Bornfleth et al. | 198/20 R |
| 3,750,804 | 8/1973 | Lemelson | 414/278 |
| 3,780,852 | 12/1973 | Weiss et al. | 414/331 |
| 3,792,757 | 2/1974 | Musser | 198/536 |
| 3,792,785 | 2/1974 | Weir | 414/278 |
| 3,803,556 | 4/1974 | Duffy | 340/172.5 |
| 3,805,974 | 4/1974 | Anderrson et al. | 414/276 |
| 3,809,263 | 5/1974 | Dodd et al. | |
| 3,889,797 | 6/1975 | Naito et al. | 198/35 |
| 3,903,810 | 9/1975 | Jones | 104/166 |
| 3,928,114 | 12/1975 | Aylon | 198/586 |
| 3,954,165 | 5/1976 | Snyder | 198/34 |
| 3,958,102 | 12/1985 | Burt | 235/61.6 |
| 3,989,090 | 11/1976 | Kawai | 414/277 |
| 4,013,186 | 3/1977 | Barton et al. | 414/660 |
| 4,018,325 | 4/1977 | Rejsa | 198/347 |
| 4,039,785 | 8/1977 | Ziemann | 235/151 |
| 4,071,150 | 1/1978 | Thompson et al. | 414/270 |
| 4,088,237 | 5/1978 | Brown | |
| 4,110,214 | 8/1978 | Pfeffer | 210/77 |
| 4,168,009 | 9/1979 | Ide | 198/800 |
| 4,189,273 | 2/1980 | Soderstrom et al. | 414/285 |
| 4,192,496 | 3/1980 | Basclice et al. | 198/463.3 |
| 4,227,607 | 10/1980 | Malavenda | 198/460 |
| 4,232,779 | 11/1980 | Khoylian et al. | 198/472 |
| 4,239,436 | 12/1980 | Wildenaur | 414/278 |
| 4,244,672 | 1/1981 | Lund | 414/134 |
| 4,307,988 | 12/1981 | Page et al. | 414/276 |
| 4,379,671 | 4/1983 | Cochran | 414/331 |
| 4,389,157 | 6/1983 | Bernard, II et al. | 414/787 |
| 4,394,104 | 7/1983 | Camerini et al. | 414/276 |
| 4,422,554 | 12/1983 | Lichti | 211/115 |
| 4,484,289 | 11/1984 | Hemond | 364/478 |
| 4,492,504 | 1/1985 | Hainsworth | 414/278 |
| 4,505,375 | 3/1985 | Kuster | 198/482 |
| 4,542,808 | 9/1985 | Lloyd, Jr. et al. | 186/56 |
| 4,547,343 | 10/1985 | Takano et al. | 414/417 X |
| 4,561,060 | 12/1985 | Hemond | 364/478 |
| 4,566,595 | 1/1986 | Fustier | 209/545 |
| 4,618,932 | 10/1986 | Sauer | 414/331 X |
| 4,629,059 | 12/1986 | Allinquant | 198/463.3 |
| 4,643,495 | 2/1987 | Pepping et al. | 312/268 |
| 4,651,863 | 3/1987 | Reuter et al. | 414/223 X |
| 4,669,047 | 5/1987 | Chucta | 364/468 |
| 4,678,390 | 7/1987 | Bonneton et al. | 414/282 |
| 4,692,876 | 9/1987 | Tenma et al. | 364/513 |
| 4,712,964 | 12/1987 | Van Elten et al. | 414/281 |
| 4,722,653 | 2/1988 | Williams et al. | 414/222 |
| 4,752,175 | 6/1988 | Lichti | 414/276 |
| 4,787,803 | 11/1988 | Van Elten et al. | 414/281 |
| 4,801,236 | 1/1989 | Katzenschwanz | 414/416 |
| 4,812,985 | 3/1989 | Hambrick et al. | 414/331 X |
| 4,846,619 | 7/1989 | Crabtree et al. | 414/273 |
| 4,909,697 | 3/1990 | Bernard, II et al. | 414/331 |
| 4,968,207 | 11/1990 | Lichti | 414/331 |
| 4,983,091 | 1/1991 | Lichti et al. | 414/331 |
| 5,090,863 | 2/1992 | Lichti et al. | 414/331 |
| 5,096,366 | 3/1992 | Bernard, II et al. | 414/786 |

FOREIGN PATENT DOCUMENTS

| | | | |
|---|---|---|---|
| 131278 | 10/1979 | Japan | 414/285 |
| 48306 | 3/1984 | Japan | 414/331 |
| 102703 | 6/1984 | Japan | 414/331 |
| 128104 | 2/1986 | Japan | |
| 27804 | 2/1986 | Japan | 414/285 |
| 55004 | 3/1986 | Japan | |
| 81302 | 4/1986 | Japan | |
| 229703 | 10/1986 | Japan | |
| 243701 | 10/1986 | Japan | |
| 16904 | 1/1987 | Japan | |
| 74811 | 4/1987 | Japan | 414/331 |
| 215410 | 9/1987 | Japan | |
| 131845 | 6/1996 | Japan | |
| 449198 | 4/1968 | Switzerland | |
| 755693 | 4/1978 | U.S.S.R. | |
| 2157667 | 10/1985 | United Kingdom | |

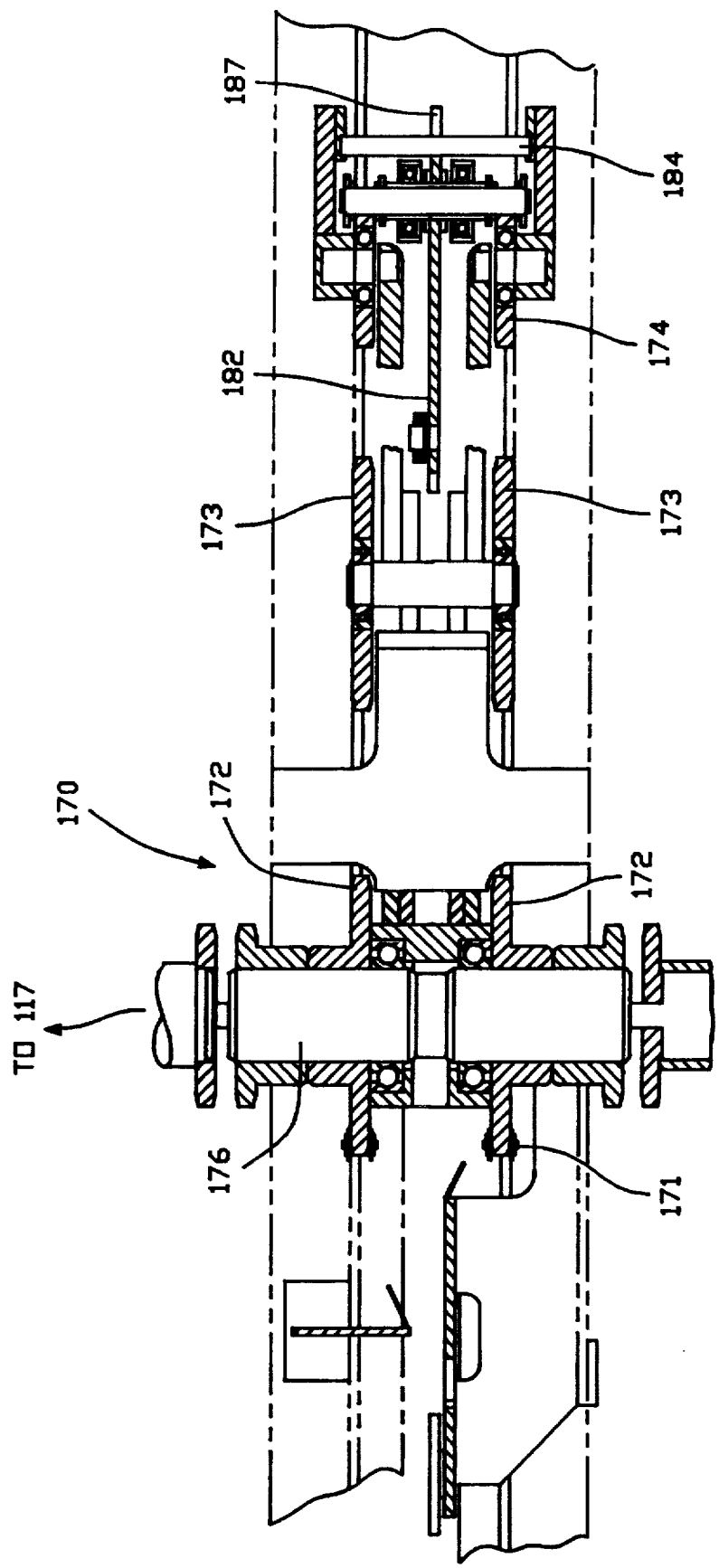
FIG.—10B

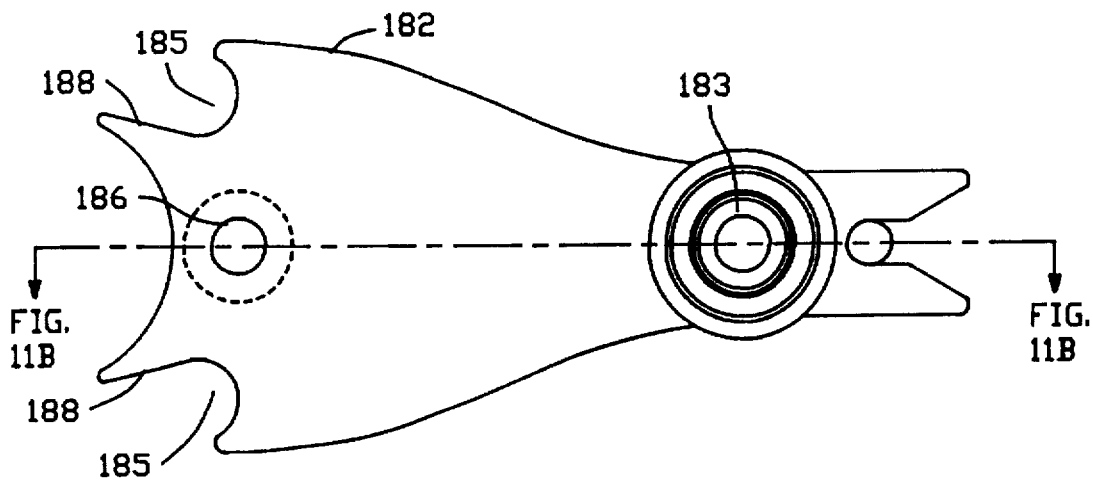
FIG.—11A
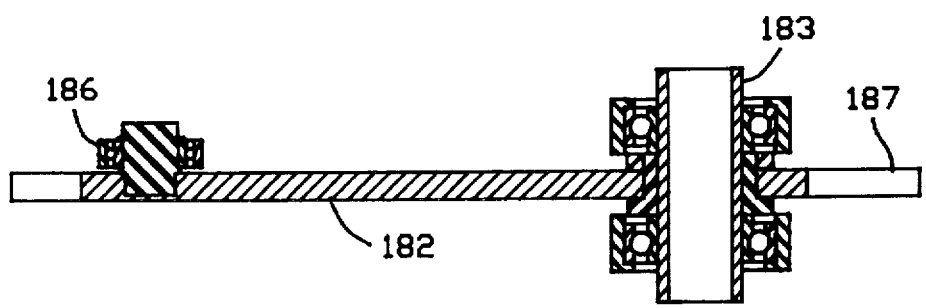
FIG.—11B
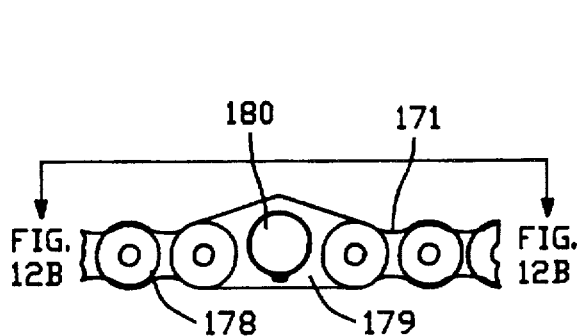
FIG.—12A
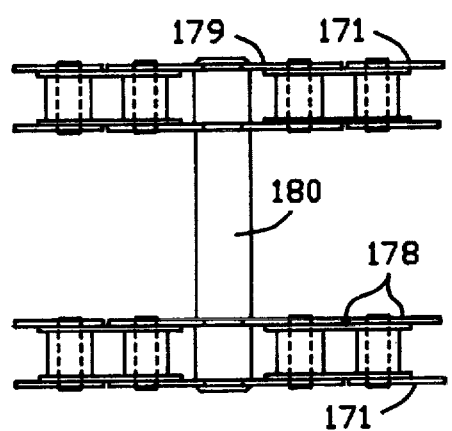
FIG.—12B

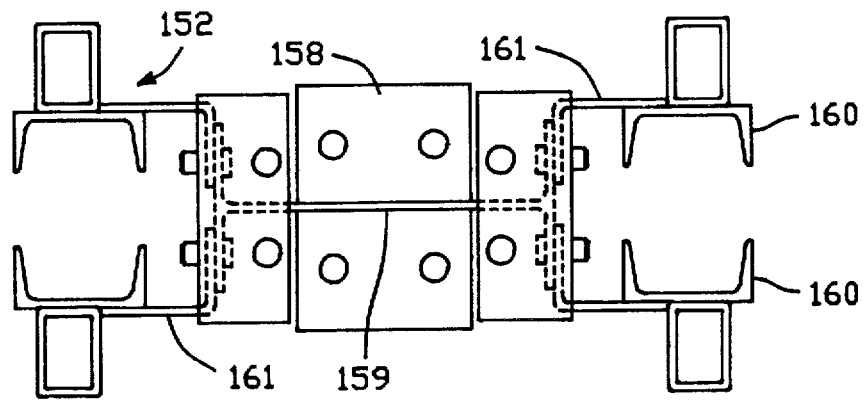
FIG.—15
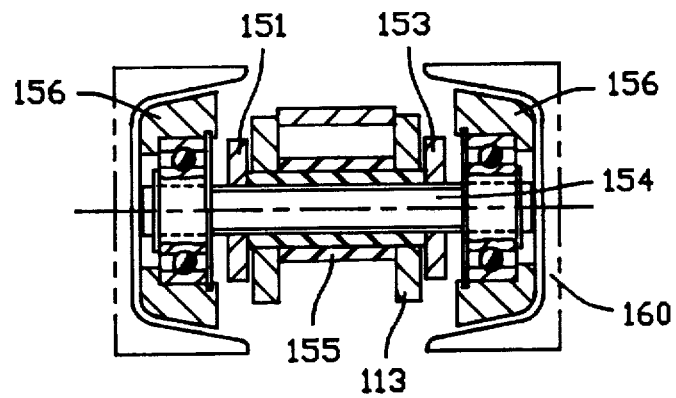
FIG.—16
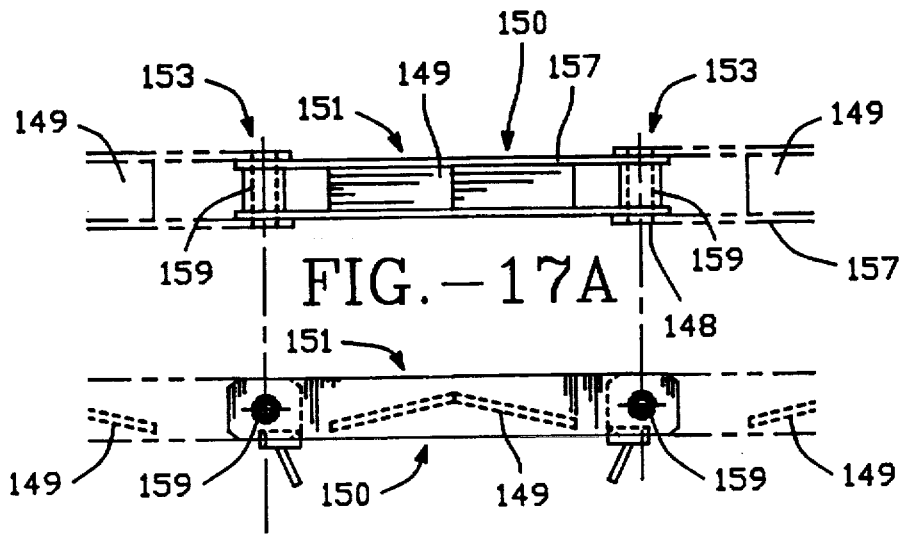
FIG.—17A
FIG.—17B

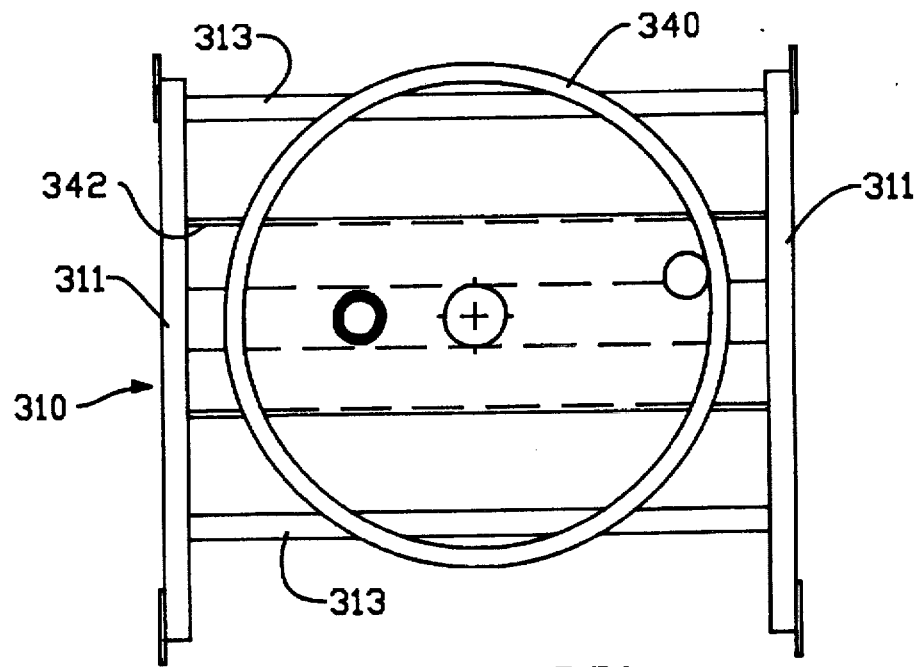
FIG.—27
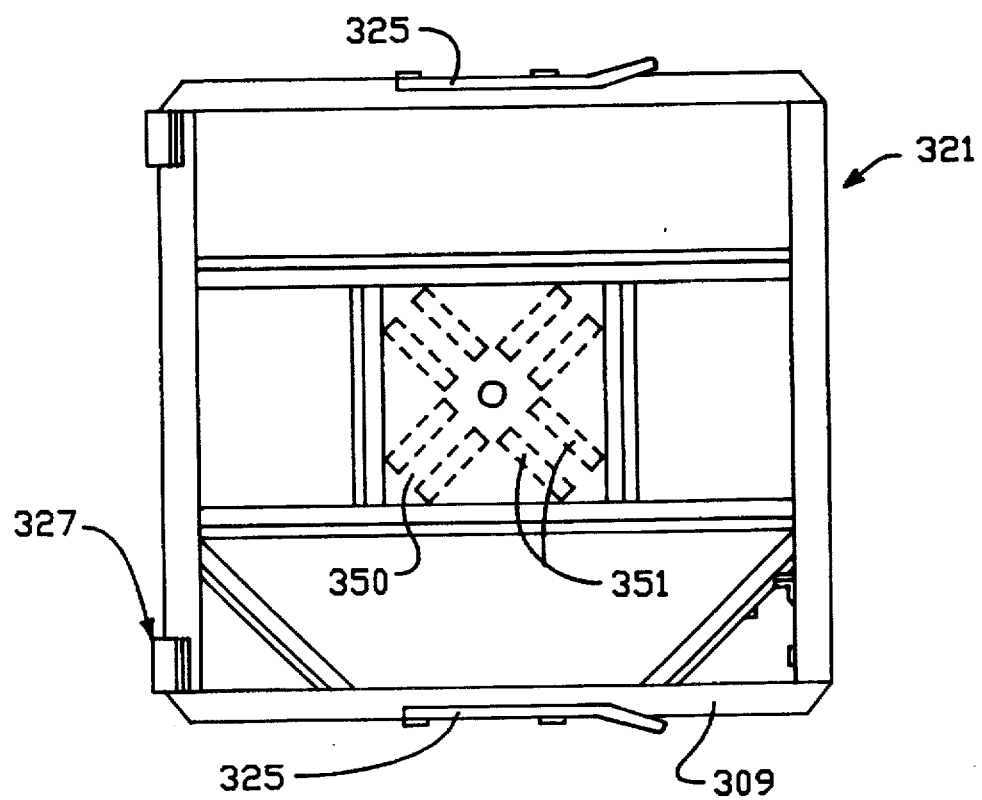
FIG.—28

FIG.—33

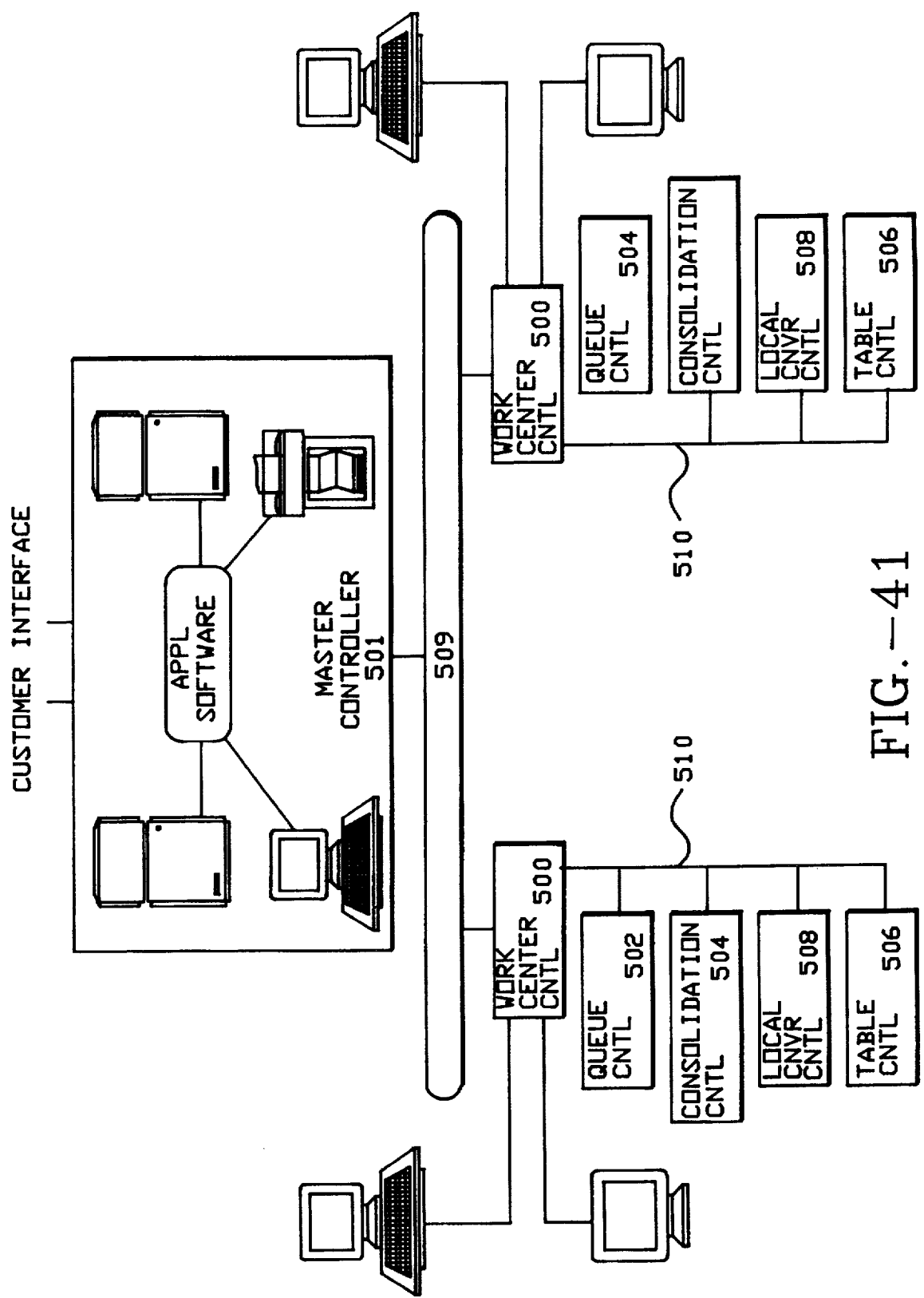
FIG.—41

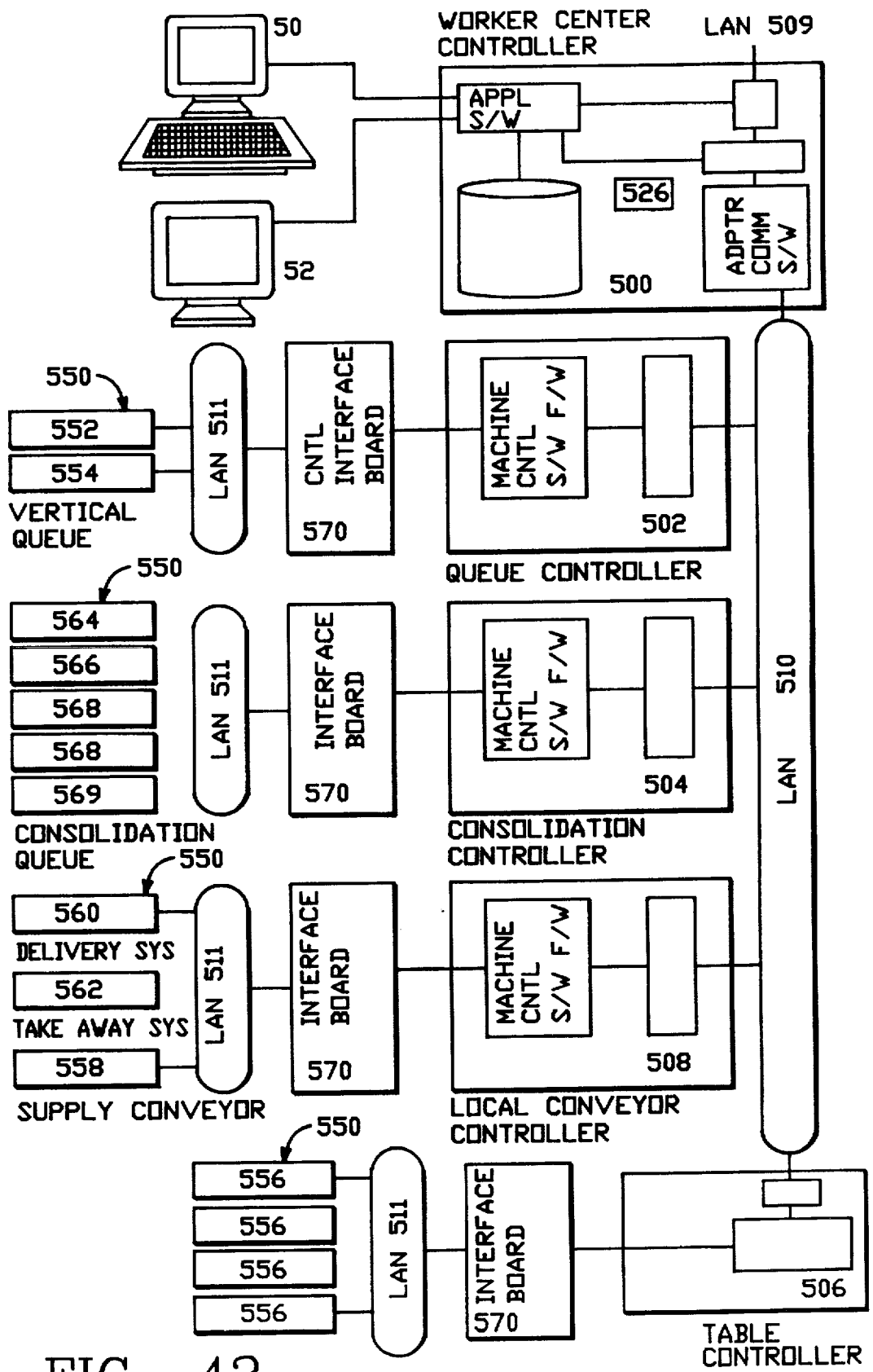
FIG.—42

AUTOMATED WORK CENTER

This is a continuation of application Ser. No. 07/931,648, filed Aug. 17, 1992, now U.S. Pat. No. 5,273,392; which is a continuation of application Ser. No. 07/484,050, filed Feb. 22, 1990 (now abandoned); which is a division of application Ser. No. 07/214,568, filed Jul. 1, 1988 (now abandoned); which is a continuation-in-part of application Ser. Nos. 06/815,808, filed Jan. 2, 1986 (now abandoned), 07/015,083 filed Feb. 17, 1987 (now abandoned), and 07/158,310 filed Feb. 22, 1988 (now abandoned). Reference is also made to application Ser. Nos. 07/031,989, filed Mar. 30, 1987 (now abandoned) which is a continuation-in-part of application Ser. No. 06/732,927, filed May 13, 1985 (now abandoned); 06/800,337, filed Nov. 21, 1985 (now abandoned); and U.S. Pat. No. 4,983,091, dated Jan. 8, 1991. Each of these applications and the patent are incorporated herein by reference.

BACKGROUND OF THE INVENTION

The present invention relates to an automated integrated work station for handling goods within distribution and production environments. In one of the preferred embodiments the work station is specifically adapted for consolidating goods.

Many modern distribution systems require the storage and retrieval of thousands of inventoried goods. Often goods must be stored in bins or containers due to their size or delicate construction. Therefore, storage requires loading the containers and delivering the containers to a known location where they can later be retrieved as necessary. When an order is received, the desired items must be picked from their respective storage positions and prepared for either shipping or use. An effective warehousing operation requires the ability to both rapidly retrieve a wide variety of goods from storage and to efficiently dispose of the retrieved items. The present invention relates generally to an automated work station for rapidly and effectively disposing of retrieved items. The work station disclosed may also be used to receive goods into the storage system.

An example of an existing complex distribution and storage application is the environment of an electronic product manufacturing and/or repair facility wherein the products built incorporate printed circuit boards. Such warehousing applications may require storage of as many as 150,000 components, the vast majority of which would fit into 6"×6"×18" compartments. In any given day as many as 5 to 10 thousand assorted components may be drawn from the storage facility. In the environment of a repair facility, there must also be an effective mechanism for storing various items. The stored items may include working parts associated with a malfunctioning part in the process of being repaired and/or components that cannot be repaired using parts in stock while the unavailable parts are on order. Absent effective integration between the storage system and the work stations of the repair or manufacturing facilities, the combined man hours lost between delivering the goods to the appropriate work station and the down time at various work stations as they wait for supplies to be delivered would make the facility cost prohibitive.

Another typical example of a complex distribution operation is a consumer products and pharmaceutical warehousing facility which stores and arranges such products for delivery to retail outlets. Modern consumer products warehousing facilities may require the storage of on the order of 25,000 stock items which must be stored in both case lots and piece lots. The individual stock items may range in size anywhere between 1"×1"×1" to 36"×36"×18". A representative warehouse may have on the order of 1000 customers with 400 to 800 customers, placing orders on any given day. The orders may call for as many as 60,000 individual stock units and the actual number of items requested for each particular stock unit may widely vary. Additionally, it is desirable to package the ordered goods for each customer in lots of related goods rather than sending each customer a truckload randomly containing all of the goods that particular customer requested. For example, in the consumer products and pharmaceutical applications described, related families of products might include RX, hair care products, cosmetics, etc. Consolidating the orders in groups of related goods facilitates rapid restocking at the retail store when the goods are ultimately delivered. Often, the ordered goods are delivered in totes designed specifically for the purpose of transportation between the warehouse and the retail stores.

Yet another application wherein efficiently integrated work centers are required is in the environment of a production facility. Recent studies investigating productivity and quality control have suggested that it is often more efficient to allow an individual worker to assemble whole products (or at least substantial components), rather than using an extended production line wherein each employee adds only one or two small parts to a larger system. A drawback to such systems is that in order to effectively allow a single assembler to put together a product having a large number of parts, it is important to "kit" the parts. That is, they need to be arranged in readily accessible groups, preferably in the reverse order of construction. In many production lines, the kitting stage proves to be the slowest link. Therefore, there is a need for a work center that has access to all the parts and is capable of effectively kitting parts for production requirements.

To facilitate these and other distribution applications, numerous integrated warehousing systems have heretofore been proposed. Such systems traditionally include a work station of some sort. For example, Japanese Patent Application No. 53-37829 discloses a method for assorting goods that are stored on fixed storage shelves. The system contemplates moving boxes containing ordered goods from a storage shelf onto a horizontal loop-type conveyor which transfers the boxes to a branch line wherein they are reviewed by an operator. The operator looks at the goods in the box and then identifies the customers who need such goods. He then drives a second loop-type conveyor to bring a container before him into which the ordered goods may be placed. However, such a system has significant time delays in delivering goods to the operator. Further, the system is not fully automated and the equipment provided is not organized to maximize efficiency. Additionally, the conveyors disclosed are horizontally oriented which requires devoting abundant floor space to the material handling operation. When the demands on the system change (traditionally volume tends to rise dramatically), the expansive floor space required severely limits the ability to expand the system to meet the increased demand without adding to the size of the warehouse. It will be appreciated that the increasing cost of space and the costs associated with materials moving about an expansive area have become significant drawbacks to such approaches. Thus, although the systems heretofore available have greatly increased the speed and effectiveness of material handling, they still lack the ability to coordinate order consolidating activities fast enough to meet current demand in numerous applications.

SUMMARY OF THE INVENTION

Accordingly, it is a primary objective of the present invention to provide a new and improved work station for use in conjunction with warehousing, production and repair facilities for handling the disposition of items in great quantity and variety wherein required manual operations are minimized.

Another object of the invention is to provide a work station having temporary storage facilities for queuing inventoried items for random delivery to a work area.

Another object of the invention is to provide an efficient work station for consolidating a wide range of variable orders using a minimal amount of manual labor.

Another object of the invention is to provide an efficient work station for receiving goods into a storage system using a minimal amount of manual labor.

To achieve the foregoing and other objects and in accordance with the purpose of the present invention, an automated work station is provided for use in materials handling operations. The work station includes a randomly accessible temporary storage queue for receiving containers that hold material goods. Loading means are provided for receiving containers from an external conveyor network and loading the received containers into the storage queue. A work area is provided to give operators access to the containers. A delivery system transfers containers between the temporary storage queue and the work area while a takeaway system transfers containers between the work area and the conveyor network. An automated control system coordinates the delivery of container between the temporary storage queue and the work area.

The temporary storage queue preferably takes the form of a vertically moving storage queue having a multiplicity of vertically spaced shelves arranged about an endless loop, wherein each of the shelves is adapted to receive at least one container. A fixed loading ramp is provided to load containers onto the vertical queue. To facilitate loading the vertical queue, the shelves are rotated about the endless loop until an empty shelf is disposed adjacent the loading ramp wherein loading may take place. To unload the vertical queue, the shelf carrying the container to be unloaded is rotated until it is disposed adjacent to the delivery means at which time the container may be discharged onto the delivery system for transportation to the work area. In a preferred embodiment, the work area takes the form of a plurality of rotatable work tables.

In another preferred embodiment, the work center is designed to facilitate consolidating an extremely large number of customer orders. In this embodiment a rotational consolidation queue is provided that carries a large number of totes suitable for receiving individual consolidated orders. The consolidation queue is disposed in close proximity to the work area so that an operator may readily transfer goods between the work area and the consolidation queue. The consolidation queue preferably includes a multiplicity of vertically spaced shelf pans carried about a track that forms an endless loop. Each shelf pan includes a multiplicity of tote pads each adapted to hold one of the totes. An opening mechanism, that may take the form of a plurality of pneumatic rams, is provided to push particular totes onto a fixed loading shelf to provide an operator with access to the totes.

A preferred control system for the work station includes a queue controller for directing movements of the temporary storage queue and a conveyor controller for managing the activities of the delivery and takeaway systems. In embodiments having a plurality of work tables and a consolidation queue, individual component controllers in the form of a work table controller that manages the activities of the work tables and a consolidation controller that orchestrates movements of the consolidation queue would be provided as well. A dedicated work center controller integrates and manages the activities of the various component controllers. Each of the component controllers communicates with the work center controller and the other component controllers over a primary local area network.

In a preferred architecture, a multiplicity of logic boards are provided for directly controlling the mechanical movements of the various components. Each of the component controllers has a plurality of associated logic boards for directly controlling the mechanical movements of the particular component controlled by the associated component controller. Each component controller has an associated secondary local area network over which the component controller communicates with its associated component controllers. Preferably, each component controller further has an associated interface board having a plurality of buffers for receiving communications from the logic board and temporarily storing the information transmitted by the logic boards until the component controller requests the transmitted information.

In a preferred method of operation, the work station is used to consolidate customer orders, production kits, or the like. In such a system, a multiplicity of orders for material goods are received. The control system automatically assigns particular totes to receive specific ordered goods. Containers holding ordered goods are then delivered to the work area. Goods disposed within a container in the work area are selected for distribution and the operator is informed of both the selected goods and the location of an active container that holds the selected goods. The consolidation queue is rotated until a shelf holding at least one tote designated to receive the selected goods is disposed adjacent the fixed loading shelf. A tote designated to receive the selected goods is then automatically opened and the operator is informed of the quantity of the selected goods that are to be placed into the open tote. The ordered number of the selected goods is placed into the open tote which is then closed. The tote opening and queue rotating steps are repeated as necessary to distribute the selected goods. The goods selecting, queue rotating and tote opening steps are repeated as necessary to consolidate all of the ordered items into the totes. Each time that all of the materials selected for distribution within a particular container have been distributed, the spent container is discharged from the work area and, when appropriate, an additional container that carries material goods to be distributed is automatically delivered to the work area.

In an additional preferred embodiment, a multiplicity of containers are originally requested from an external storage system for delivery to the work station. The received containers are loaded onto the vertical queue for temporary storage. When containers are discharged from a particular work table within the work area, a container request is made for the delivery of an additional designated container to the work table that discharged a container. Similarly, each time a container is transferred from the temporary storage queue, a request is made for the delivery of an additional container to the work station from the external storage system. In an alternative method of operation the work station is utilized as a receiving station for accepting inventory items into a storage system.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 10b is a cross sectional view of the drive assembly shown in FIG. 10a taken along the line 10b—10b.

FIG. 11a is a front elevational view of a weldment attachment for the drive assembly shown in FIG. 10.

FIG. 11b is a side elevational view of the weldment attachment shown in FIG. 11a.

FIG. 12a is a side view of a portion of the drive chain for the drive assembly as shown in FIG. 10.

FIG. 12b is a top view of the drive chain shown in FIG. 12a.

FIG. 15 is an edge view of a portion of the guide track shown in FIG. 13 with the continuous loop in place.

FIG. 16 is a cutaway front view of the guide roller assembly for the compression chain.

FIG. 17a is a front elevational view of a inner link for the compression chain.

FIG. 17b is a side elevational view of the inner compression chain link shown in FIG. 17a coupled to its adjacent outer links.

FIG. 27 is a top view of the rotating work table base.

FIG. 28 is a top view of platform portion of the rotating work table with the rollers removed.

FIG. 41 is a block diagram for representative work center control system.

FIG. 42 is a more detailed block diagram of a particular work center controller as seen in FIG. 40.

DETAILED DESCRIPTION OF A PREFERRED EMBODIMENT

Figure 1:
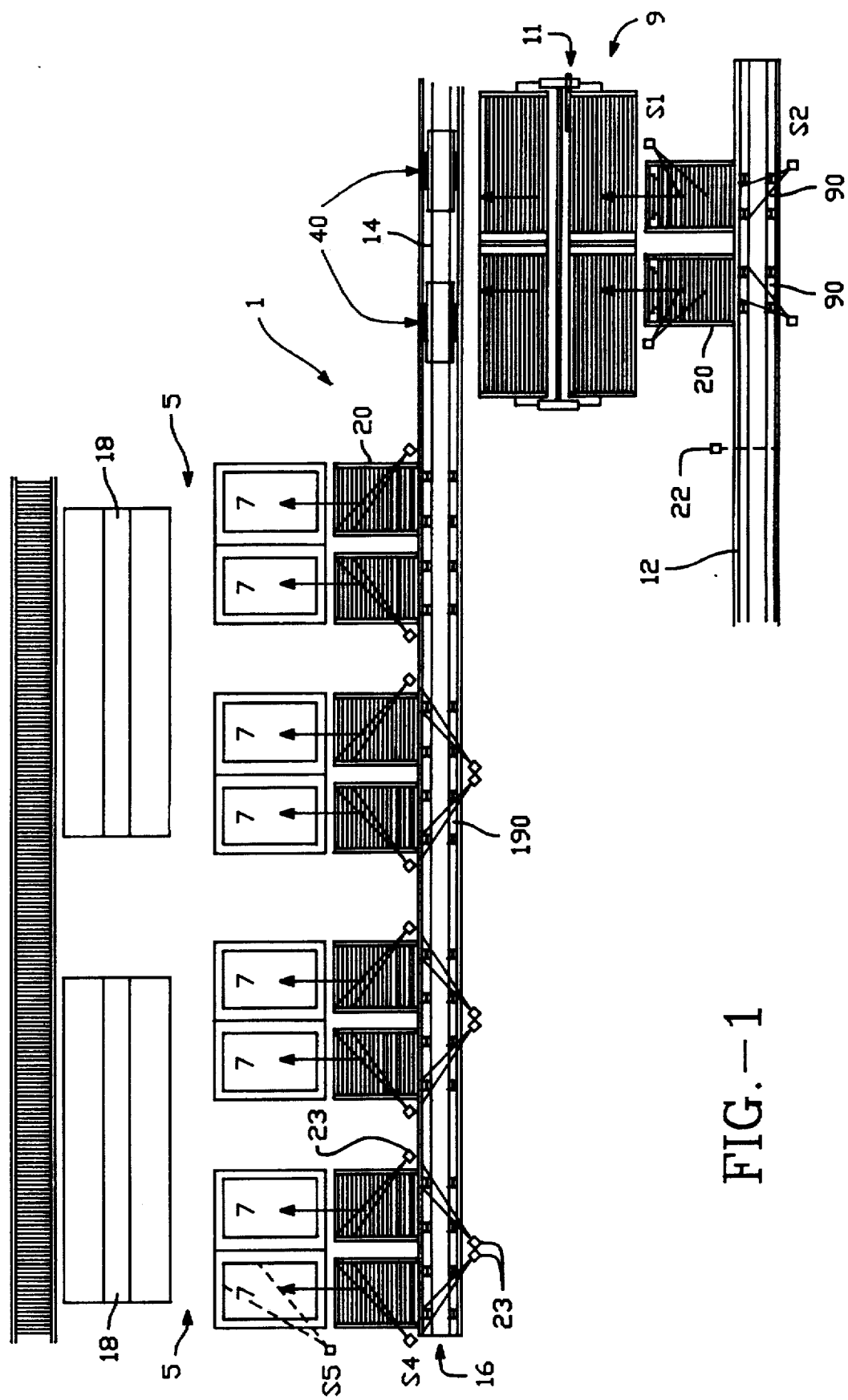
FIG. 1 is a diagrammatic floor plan of a work station having a pair of work areas supported by a single vertical queue in accordance with the present invention.

The automated work center of the present invention comprises a plurality of integrated components adapted to facilitate high speed handling and distribution of bulk storage goods. Referring initially to FIG. 1, an embodiment of the work center chosen for the purpose of illustration includes two work areas 5 each having a plurality of work tables 7, a temporary storage queue 9 that may take the form of vertical queue 11, a supply conveyor 12, a delivery system 14, a takeaway system 16, a control system that manages the activities of the work center and a consolidation queue 18. In the embodiment shown in FIG. 1, takeaway system 16 is positioned directly below delivery system 14.

Figure 2:
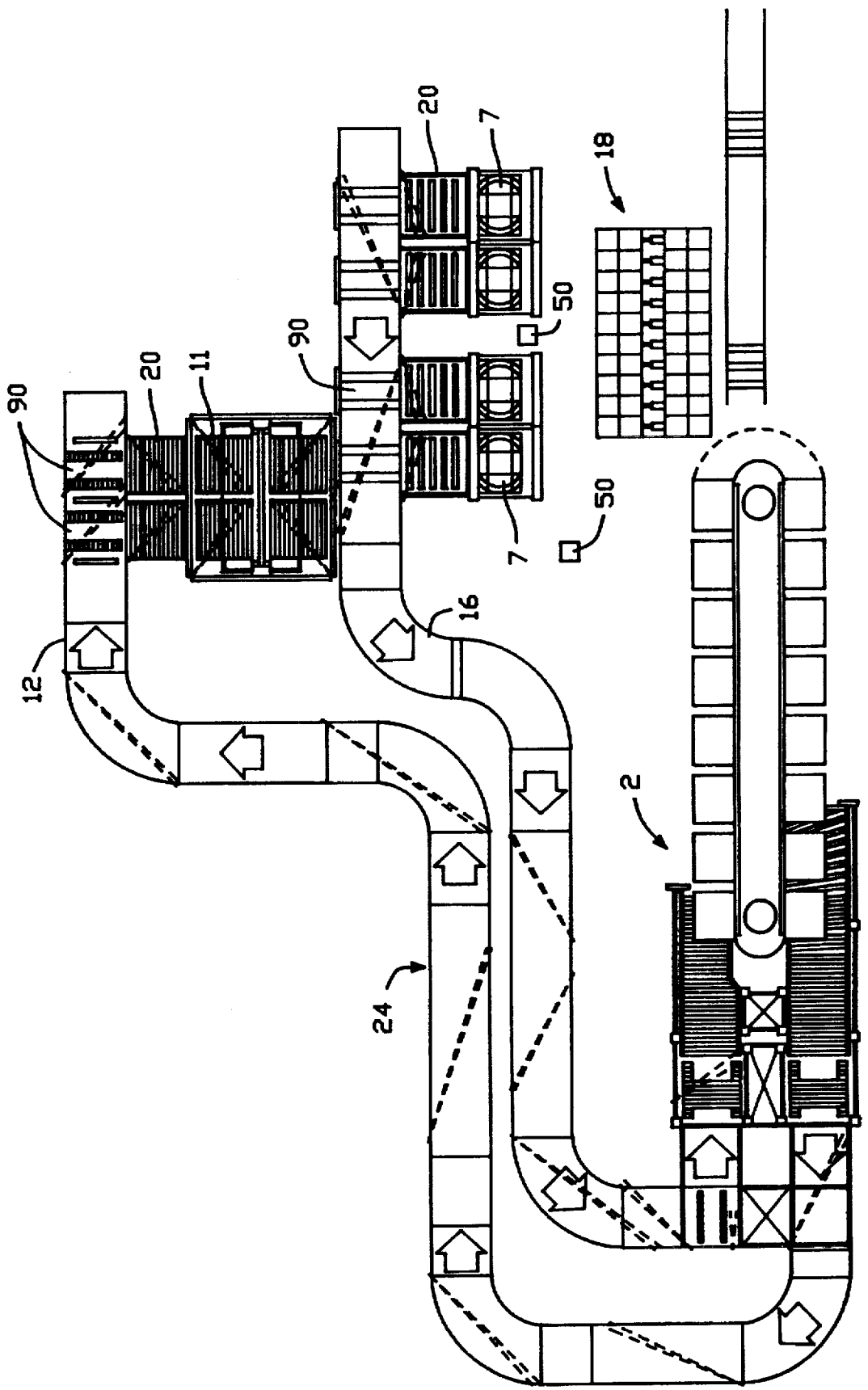
FIG. 2 is a diagrammatic floor plan of a simplified warehousing system incorporating a work station in accordance with the present invention.

The work center is adapted to be integrated into a wide variety of distribution, warehousing and production environments. In a simplified embodiment, the work center is designed to substantially continuously provide an operator with needed materials. In more sophisticated embodiments, the work center may be integrated to assist an operator consolidate customer orders or production kits or to receive inventory into the facility. Alternatively the work center may be configured to facilitate inspection, rewarehousing, replenishment, inventory monitoring and/or production assembly operations. To facilitate explanation, the system will be described in the environment of a consumer products distribution system as discussed above. Referring next to FIG. 2, in such a system, the inventoried items are kept in containers stored in a remote storage structure 2. When a customer order is received that requests a particular material good, the container holding the requested goods is selectively picked from the storage structure by an extraction assembly and delivered to the work center via a suitable conveyor network 24. By way of example, suitable storage structures are disclosed in U.S. Application Ser. No. 192,419, filed Apr. 29, 1988, now U.S. Pat. No. 4,983,091 as well as in U.S. Pat. Nos. 4,422,554 and 4,561,820, each of which is incorporated herein by reference. More conventional storage and retrieval systems that utilize multi-level fixed storage shelves in combination with an extractor picking mechanism may be used as well. The bulk goods may be delivered to the work station in any suitable form. For the purposes of illustration, the system will be described as though the stored items are kept in containers 25 as described below. It should, however, be understood that they may be delivered on pallets, in boxes or in their original packaging without departing from the spirit of the invention.

Figure 39:
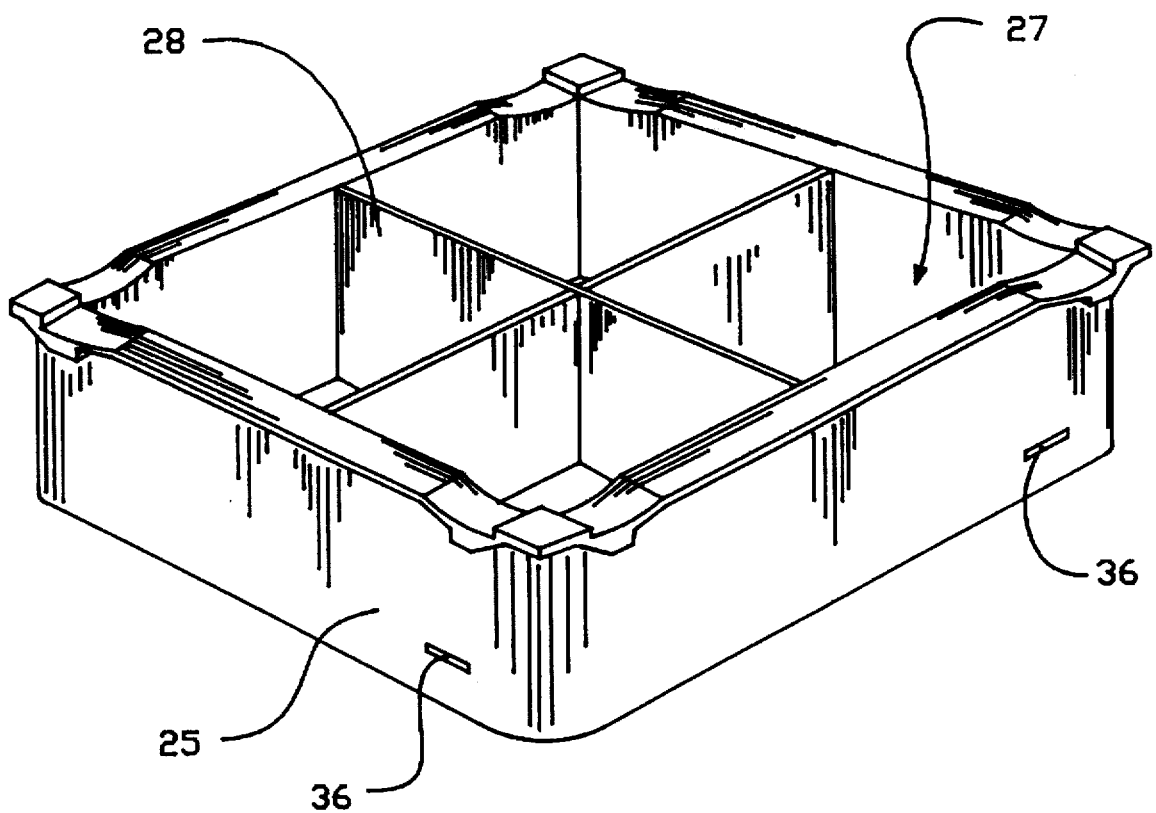
FIG. 39 is a perspective view of a suitable container.

The containers 25 are preferably open boxes that are sized appropriately to receive the stored goods. A representative container 25 is shown in FIG. 39. The containers are preferably square so that they may be delivered to the operator in any orientation. The containers must be large enough to hold reasonable quantities of the inventoried goods, yet they must be small enough so that an operator can readily pick the goods therefrom. By way of example, 36×36×24" containers are suitable for most consumer product applications. In applications where extremely small parts or small numbers of each item are inventoried, smaller containers on the order of 24×24×16" would be appropriate.

The containers 25 may be formed from a molded fiberglass reinforced resin material. Each container has an identification indicia 36 that individually identifies the particular container. By way of example, the containers may be numbered sequentially with the numbers being applied in bar coded form to each exterior corner of the container. Bar code labels may be readily printed at the edge of the container corners. It is desirable to label each corner to enable a single scanner to identify the container regardless of its orientation as it passes the scanner. With larger containers it may also be desirable to control the orientation of the container when it is presented to an operator. With such systems, the bar code labels are coded to individually identify each particular corner.

In most warehousing operations, the sizes of the stored goods will vary widely. Thus, for compatibility relatively large containers are used so that only one or two container sizes need be handled by the distribution system. To minimize the empty shelf space, many of the containers would be subdivided into multiple compartments 27 by placing wall inserts 28 into the containers. Generally, there would be containers having a wide range of compartment sizes within the distribution or production system, with the actual number of containers having a given compartment size and being entirely dependent upon the nature of the goods being stored. To maximize flexibility, wall inserts 28 may be removable so that the number of compartments within any container may be readily altered. To facilitate automatic control, each compartment 27 has a specific designation within the container 25. It is contemplated that each container will have only compartments 27 of a uniform size although it should be appreciated that this is not a requirement.

Referring to FIG. 1, a typical work center 1 includes one or more work areas 5 having a plurality of work tables 7 adapted to receive the containers 25. A randomly accessible temporary storage queue 9 preferably in the form of vertical queue 11 serves as a holding point where the containers may be temporarily stored before delivery to the work tables. Thus, containers need not be supplied to the work tables 7 in the same order that they are received by the work center. The temporary storage serves the important function of acting as a buffer for holding the next few containers that will be required by the operator. Thus, when an operator is prepared to receive the next working container, it may readily be delivered to the work tables without experiencing the delays likely to occur if the container was requested from the storage structure. The actual construction of the vertical queue 11 may vary widely within the scope of the invention.

In operation, containers are carried to the work center by an external conveyor network 24 that delivers containers to supply conveyor 12. As containers enter the work center they pass over supply conveyor 12 to any one of a plurality of loading ramps 20 that feed vertical queue 11. When a container is properly positioned on a loading ramp, the vertical queue 11 is rotated until an empty shelf appears adjacent the loading ramp. The container may then be loaded onto the empty shelf. The vertical queue is randomly accessible, therefore, when a particular container is requested for delivery to the work area, the vertical carousel is rotated until the requested container is adjacent a discharge station 40 wherein it may be unloaded from the vertical queue onto delivery system 14 for transportation to one of the work tables. The work tables present the containers to an operator in a position such that the operator may readily access the contents of the container. After the operator is finished working with the contents of the container, the container is discharged from the work table to takeaway system 16 which returns the container to the conveyor network for delivery either to another work center or to the storage structure. In embodiments wherein the containers are expected to be relatively large, the work tables are preferably rotatable so that the container may be presented to the operator in any orientation. Specifically, the container is always positioned such that the portion of the container that requires service will face the operator. This makes it easier to access goods within the container.

Figure 4:
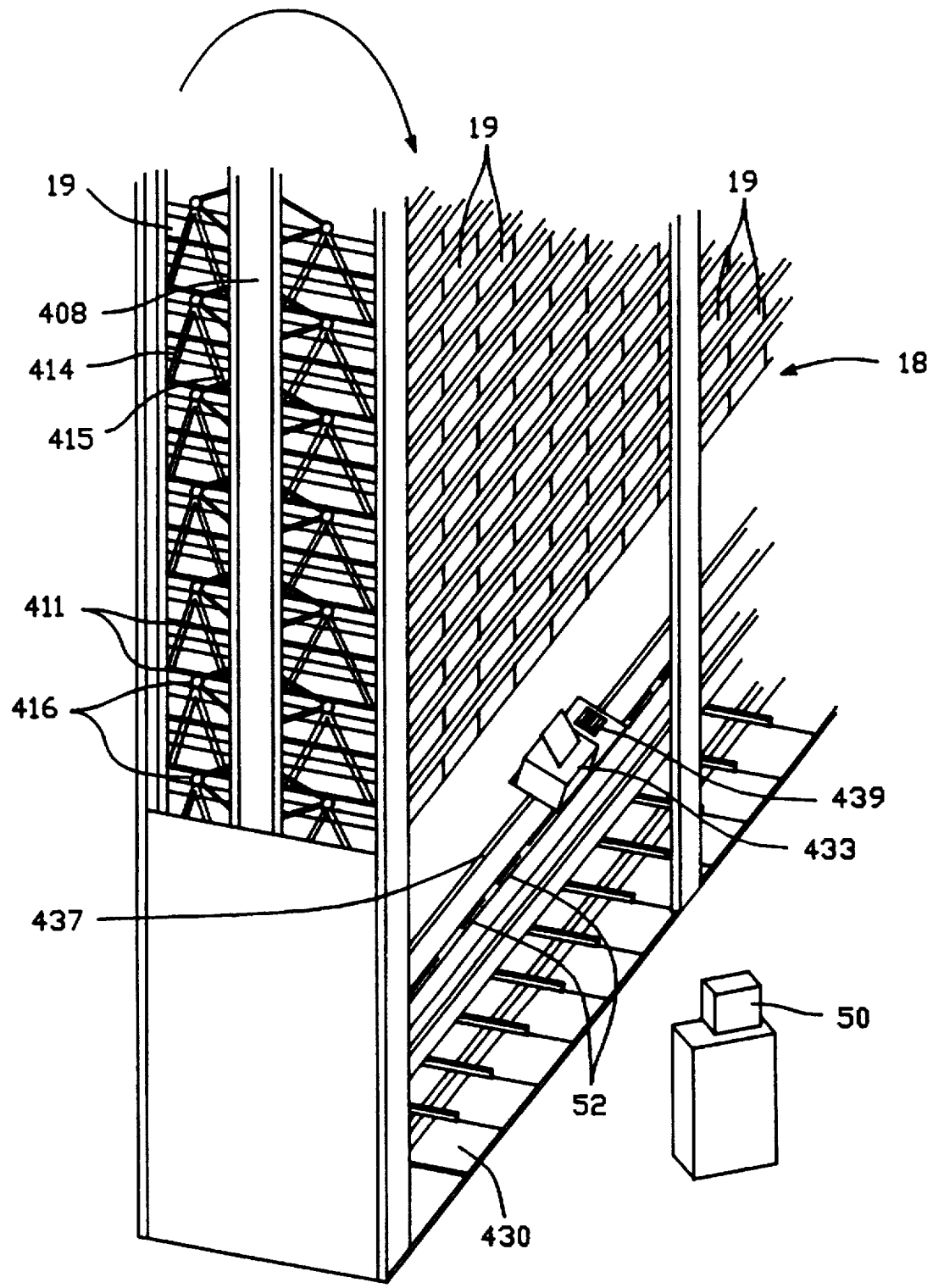
FIG. 4 is a perspective view of a typical consolidation queue as shown in FIG. 1 with the front panel removed.

The work center may be arranged to function as an issue station that facilitates consolidation of customer orders, production kits, and the like. Although the actual construction of the issue station may vary a great deal within the scope of the invention, as seen in FIGS. 1 and 4, each work area within the described embodiment of the issue work station contains a consolidations queue 18 adapted to hold a large number of tote drawers 19. The consolidation queue forms a vertically traveling carousel having a multiplicity of shelves. Each shelf has a plurality of tote pads each adapted to receive at least one tote 19. Using the consumer products application previously described, the totes would be designated to receive particular customer orders. Throughout the rest of this disclosure, the system will be described as though a single vertical queue 11 services a single work area. However, it should be appreciated that a single vertical queue could readily service two or more work areas as shown in FIG. 1.

When an order is received for goods found within the warehousing system, the operator or an automatic controller would request containers holding the desired goods from the storage structure 2 as previously described. It will be appreciated that a particular customer order may request several different stock items. Thus, when the operator receives a container holding some of the ordered goods, he would place those goods in a tote 19 associated with the particular order. As the remaining goods are received, they would be placed in the same tote drawer 19 until the order is filled. Once the order has been filled, a shipping invoice or production document is printed and placed into the tote and the tote is dispatched to a shipping queue, a packing station, an assembly station, a storage structure, or the like, depending upon the requirements of the system.

The totes 19 are preferably rectangular boxes having a hinged cover. The totes must be sized such that they can readily be manually moved about within the delivery trucks and retail stores. By way of example, a suitable size is 16"×22"×10". Each tote has an identification indicia that individually identifies the particular tote. The identification indicia 37 may take the form of bar coded labels. In alternative embodiments the totes may take the form of cases of particular products.

VERTICAL QUEUE

Figure 5:
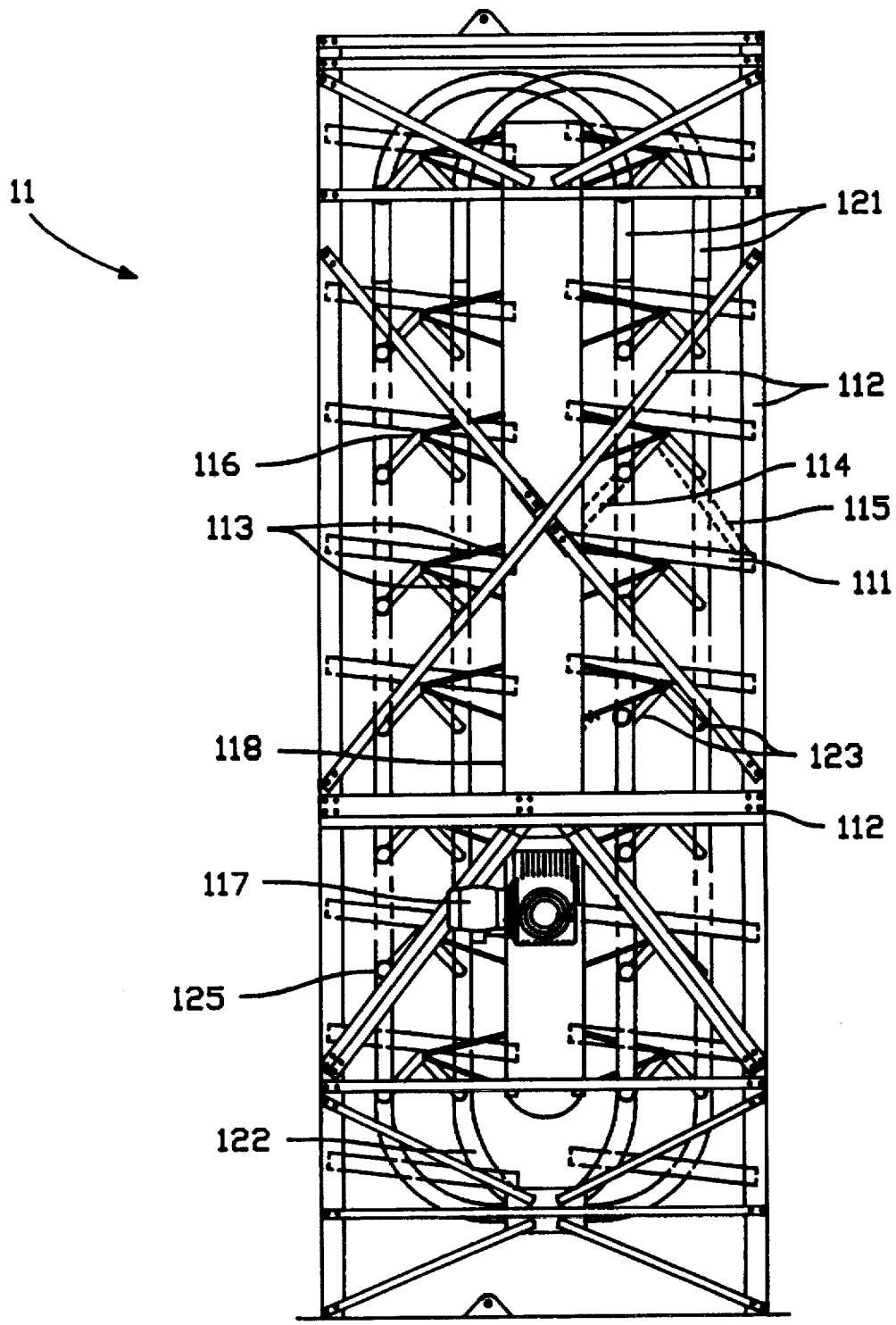
FIG. 5 is a side view of a typical vertical queue as shown in FIG. 1 including the supporting frame and highlighting the shelf guiding arrangement.
Figure 6:
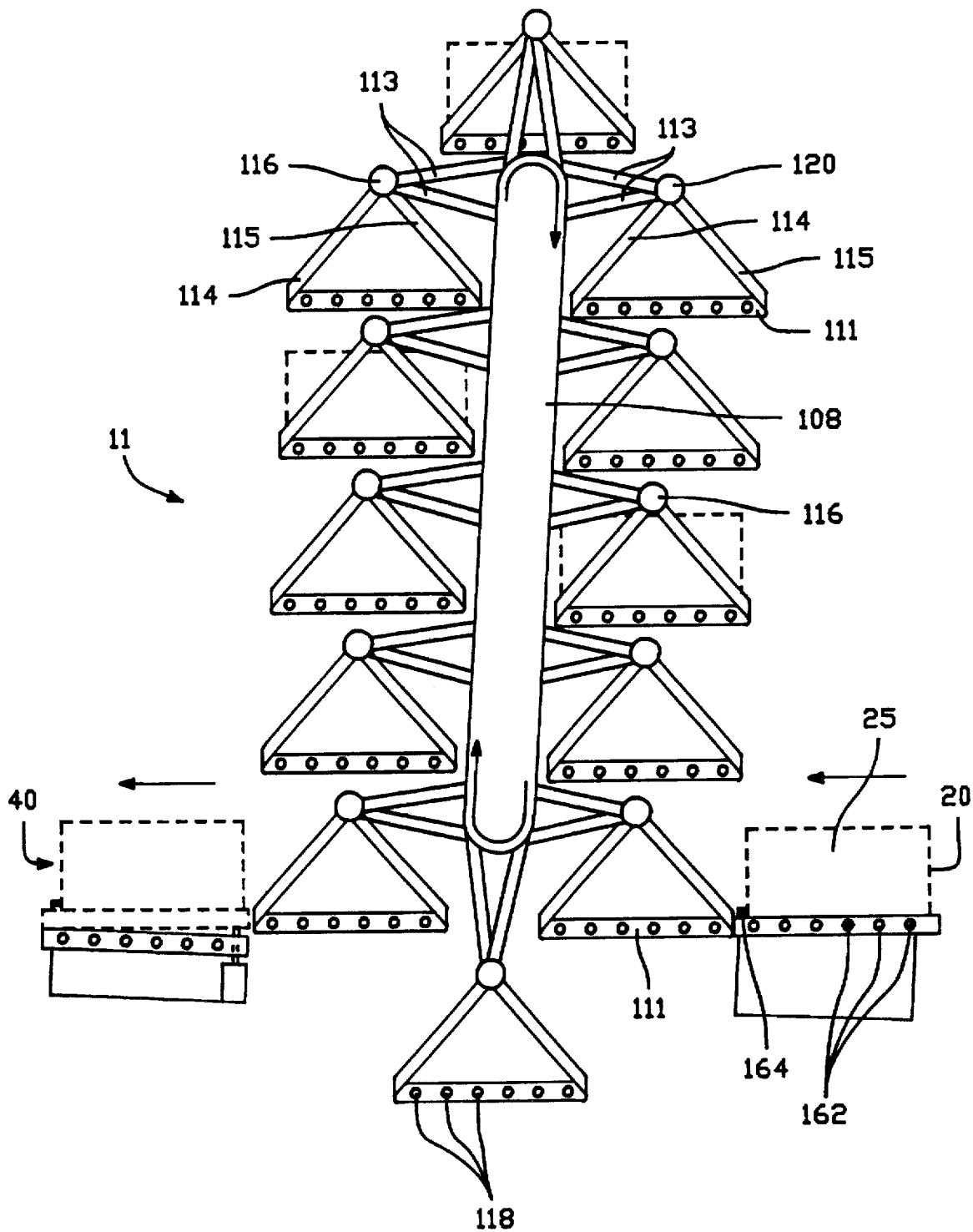
FIG. 6 is a diagrammatic side view of the vertical queue shown in FIG. 5 with the frame and guiding channels removed.
Figure 7:
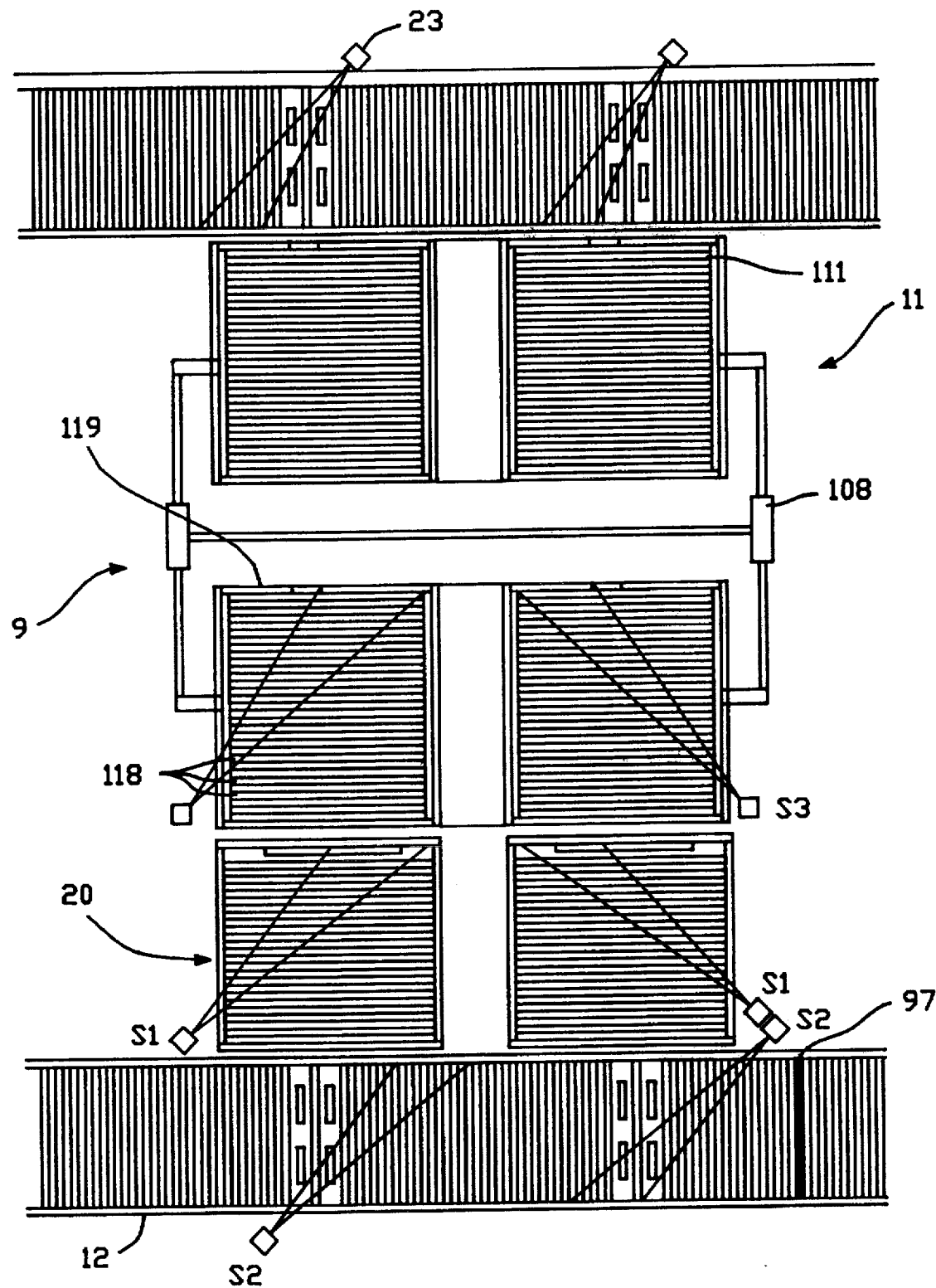
FIG. 7 is a top view of a vertical queue shown in FIG. 5 with the frame removed.
Figure 8:
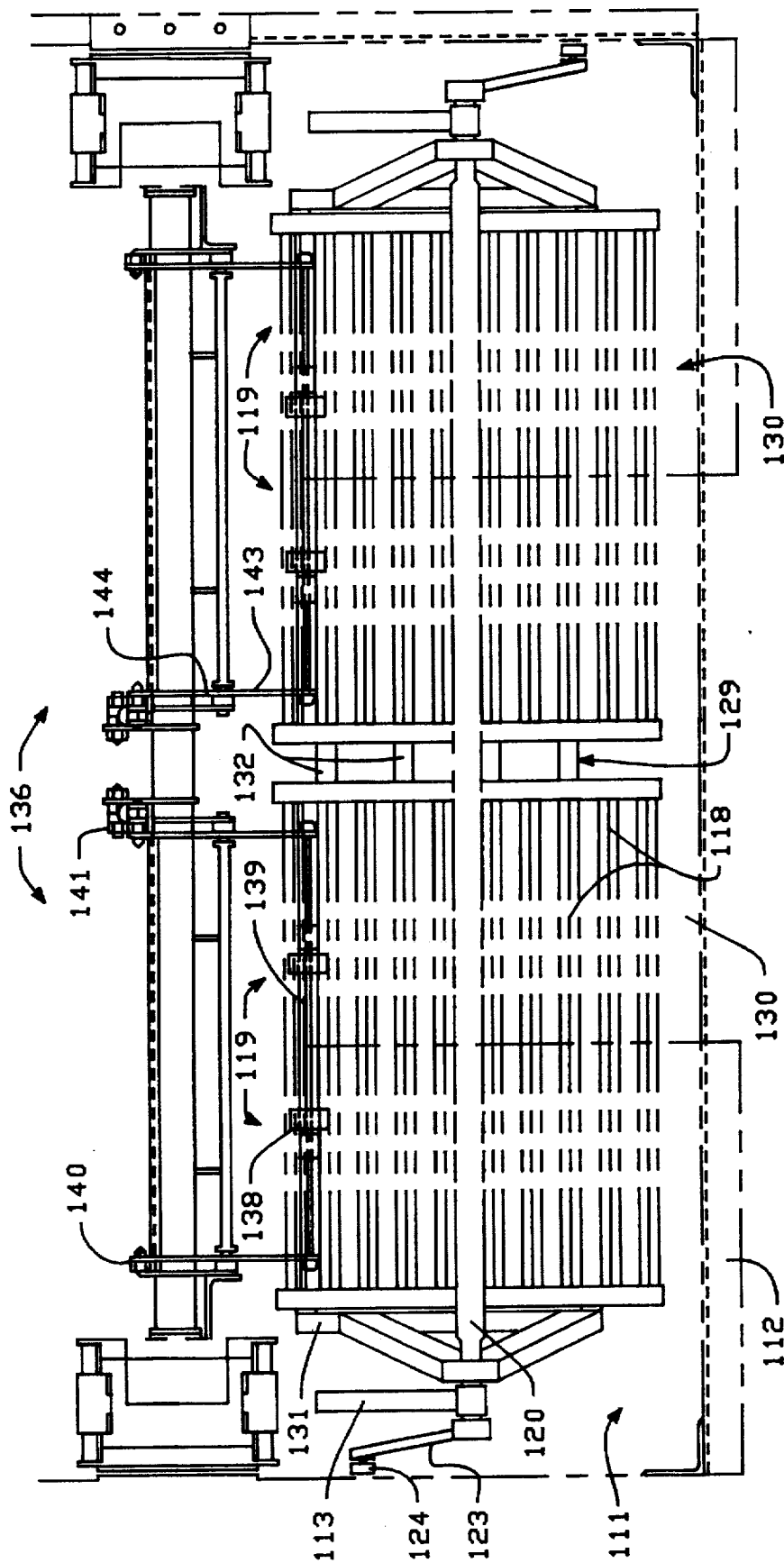
FIG. 8 is a top view of a vertical queue shelf taken along line 8—8 in FIG. 5 and including a soft stop mechanism.

Referring next to FIGS. 5–20, the embodiment of vertical queue 11 chosen for the purpose of illustration, will be described. As best seen in FIGS. 5–7, vertical queue 11 comprises an endless progression of shelves 111 spaced about an opposing pair of endless loops 108 for traveling around a frame 112. The endless loops may be driven by an electrically or hydraulically operated motor 117. The opposite ends of shelf 111 are each attached to one of the opposing endless loops by brackets 113 and suspension struts 114, 115. As can be seen in FIGS. 6 and 8, each end of each shelf 111 has a pair of suspension struts 114, 115 of appropriate length that are secured from the front and back edges of the shelf respectively to the corresponding brackets 113 by a pivot point 116 so that the shelves are pivotably supported by the struts in a substantially horizontal orientation. A support rod 120 which extends the length of the shelf joins the suspension struts to their corresponding bracket and therefore forms the rotational axis of the pivot point. The pivotal mounting causes the shelves 111 to always hang below the bracket and support rod in a substantially horizontal orientation so that the containers may ride with the shelf as the shelf passes over from its up travel reach to its down travel reach.

Figure 20:
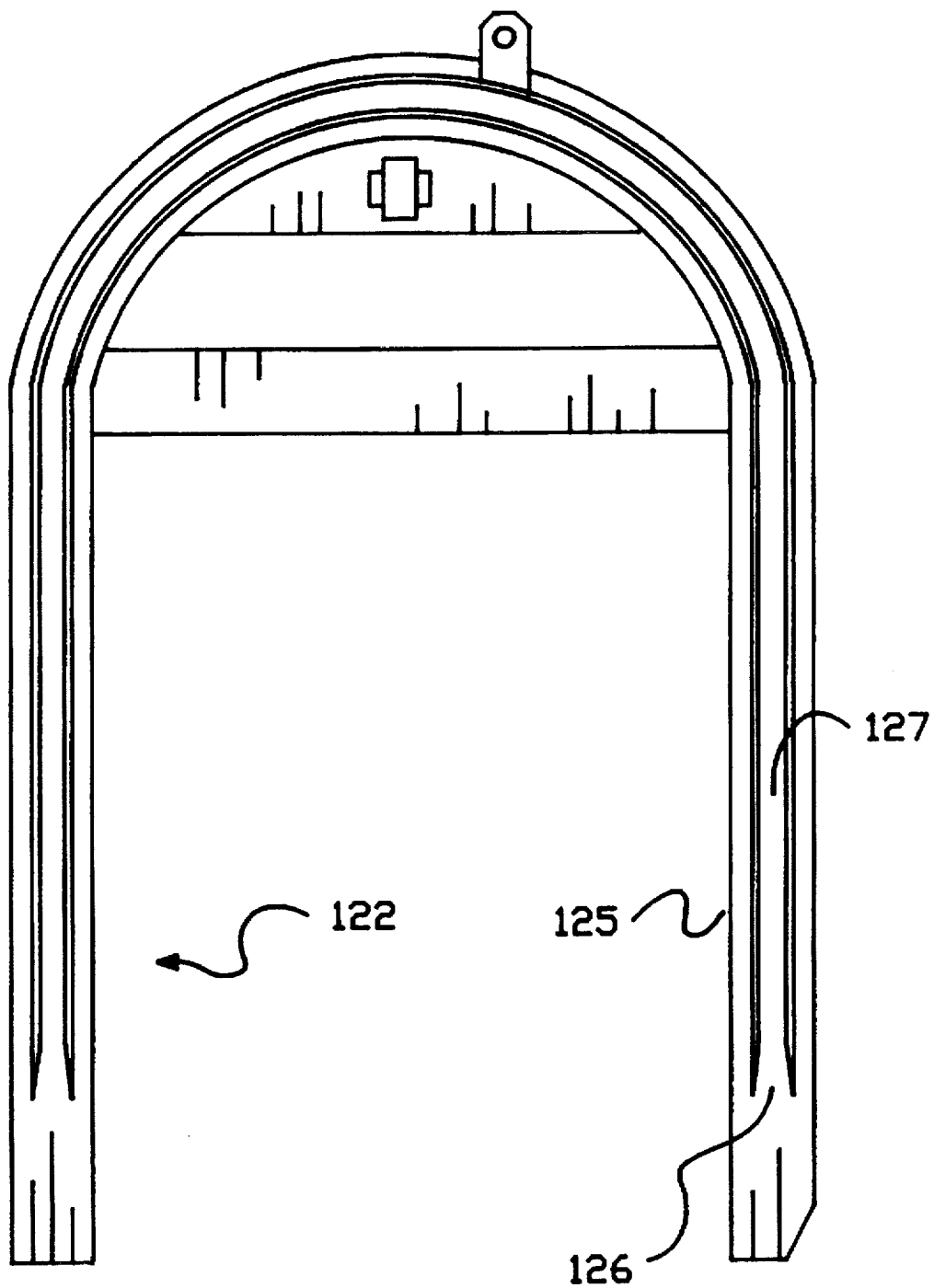
FIG. 20 is a back elevational view of the guide channel.

To ensure that the shelves remain substantially horizontal when passing over the top and bottom ends of the endless loop, top and bottom guide channels 121 and 122 respectively are provided for each endless loop 108 to cooperate with guide tubes 123 fixedly mounted on opposite ends of the support rod 120. Each guide tube 123 carries a roller 124 at its free end and a single guide tube 123 extends obliquely downward from each end of the support rod 120 in opposite directions relative to the vertical axis. (FIG. 8) As can be seen in FIGS. 5 and 20, the guide channels 121, 122 define a semi-circular path equivalent to the arc that the shelves must follow when passing between the up travel reach and the down travel reach along the endless loop, together with a pair of stub arms 125 that define a portion of the up and down travel reaches of the shelves. The channel portion 127 of the guide channels is sized to closely receive the guide tube roller 124. The open end of each stub arm 125 includes a substantially trapezoidal funnel portion 126 that acts as a funnel entrance to the channel portion 127 that ensures the rollers 124 will enter the channel portion as they begin to pass over the top or bottom ends of the vertical queue. Since the guide tubes 123 are fixed relative to the support rod 120, each guide tube 123 together with its roller 124 will cooperate with the top and bottom guide channels 121, 122 to ensure that its corresponding shelf will remain substantially horizontal as it passes over or under the queue by pivoting about pivot point 116 as previously mentioned. This action ensures that containers will not slip off of their shelves as they pass over or under the queue.

Referring next to FIG. 8, each shelf includes a frame 129 that supports a pair of side by side holding sections 130. Each end of the frame comprises a triangular support formed by suspension struts 114 and 115 together with riser 131. A plurality of struts 132 extend between the opposing risers 131. The holding sections 130 are formed of a plurality of aligned low friction rollers 118 that extend between riser members 133. The riser members are securely fastened to struts 132 in a manner that allows low friction roller 118 to freely rotate. To prevent containers from floating around on the shelves, at least one of the rollers 118 takes the form of a ratchet roller that resists backward movement of the containers.

In the embodiment used for the purpose of illustration, movement onto and off of the shelves is gravity motivated. Thus, the shelves are constructed so that each has a permanent tilt. This may be seen in FIG. 6 with the right hand sides being slightly higher than the left hand sides. Low friction rollers 118 on the shelves support the containers 25 in a potentially slidable condition. Shelf blockers 119 (FIG. 22) hold the containers on the shelves until they are ready to be released. With shelves arranged in this fashion, containers are received on one side of the vertical queue while they are be released on the opposite side.

As can best be seen with reference to FIG. 8, the suspension struts 114, 115 project slightly outwardly as they extend upward between riser 131 to support rod 120. The slant in the suspension struts give the entire shelf a trapezoidal shape that facilitates stacking. A pair of opposing guide members depend from each of the risers to form a rounded V-shaped guide that receives the support rod from the shelf disposed immediately beneath it. The vertical spacing between the shelves is adjusted such that when a shelf is on either the up or down travel reach about its endless loop path, its support rod will be closely held within the apex of the V-shaped guide depending from the shelf positioned immediately above, while its own guide closely receives the support rod from the shelf disposed immediately below. This interlocking of the shelves prevents the shelves from swinging back and forth while they are outside the influence of guide channels 121 & 122.

Since the containers may carry several hundred pounds of materials and the loading ramp 20 that feeds the vertical queue is gravity motivated, the containers may be traveling with a great deal of momentum as they are loaded onto a shelf. To reduce the impact with which the containers strike the shelf blocker 119 during loading operations, a soft stop mechanism 136 is provided for absorbing a substantial percentage of the container's momentum.

Figure 9:
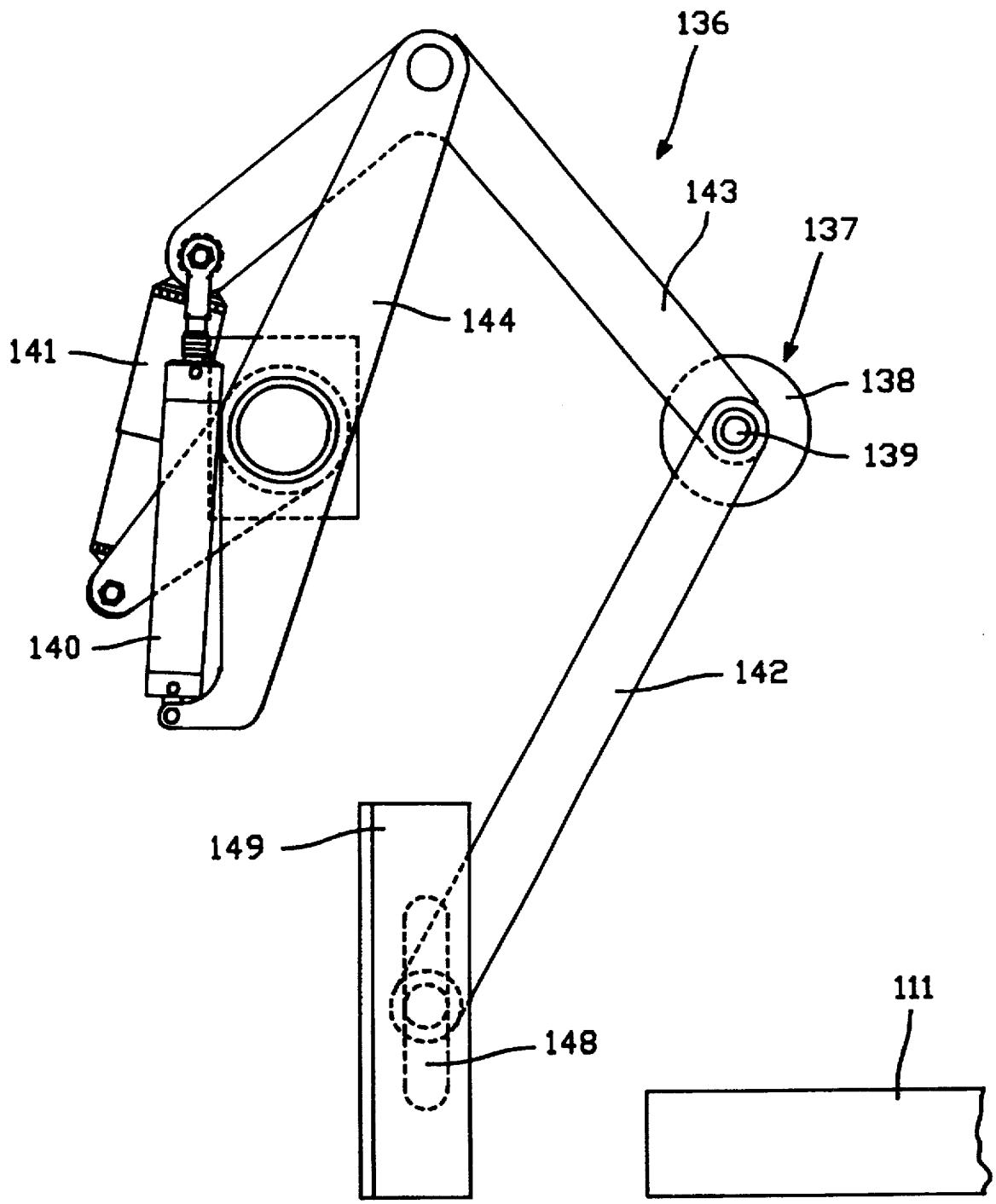
FIG. 9 is a side view of the soft stop mechanism shown in FIG. 8.

A soft stop mechanism 136 is mounted to the vertical queue frame 112 adjacent each of the loading ramps 20. Referring specifically to FIGS. 8 and 9, the soft stop mechanism are disposed within the endless loop that defines the travel of the shelves 111 and operates substantially as a scissor type shock absorbing device. It includes a strike bar 137 having a plurality of shock absorbing compressible pads 138 thereon, a support rod 139, a pair of shock absorbers 140 and 141 and a plurality of connecting members 142–144 for connecting the various components. Members 142 and 143 are pivotally coupled to each end of the strike bar 137. A first end of member 142 is pivotally coupled to the strike bar and its opposing end is slidably coupled to a slot 148 in frame element 149. Member 143 is substantially L-shaped and is pivotally coupled to strike bar 137 on a first end, shock absorber 140 on its opposite end and member 144 at its joint. Member 144 is pivotally mounted to the support rod at an intermediate point while its ends are pivotally mounted to the opposite end of shock absorber 140 and the joint portion of the L-shaped member 143 respectively. Shock absorber 141 is connected to a similar structure at the opposite end of the strike bar. Members 142 and 143 are identical for the opposite ends, while the geometry of member 144 is varied between the two ends such that the alignment of shock absorbers 140 and 141 are varied as shown in FIGS. 8 & 9. Such an arrangement enhances the shock absorbing characteristics of the soft stop 136.

It should be appreciated that the soft stop mechanism must be fully withdrawn when the vertical queue is rotated so that it does not interfere with the shelves. To facilitate fully withdrawing the soft stop, the shock absorbers 140 and 141 are both pneumatic cylinders that take a collapsed position when they are not pressurized. When the pneumatic shock absorbers 140,141 are in the collapsed position, the entire soft stop mechanism rests inside of the endless loop defined by the travel of shelves 111. When a container positioned on loading ramp 20 is ready to be loaded onto a properly positioned shelf 111, the pneumatic shock absorbers 140,141 are pressurized thereby extending the strike bar 137 to a position slightly upstream from the shelf blocker 119. Thus, when the container 25 strikes the soft stop mechanism 136, the shock absorbers dampen its kinetic energy. The strike bar is then slowly retracted by releasing pressure from the pneumatic shock absorbers thereby allowing the container to position itself slowly against the blocker 119. The weight of the container helps compress the shock absorber as pressure is released.

Although the described embodiment of the loading ramp 20 and the shelves 111 incorporate are tilted to facilitate gravity motivated loading and unloading, it should be appreciated that equivalent mechanisms may be constructed that eliminate the need for tilting by incorporating power operated traction rollers or various actuators to transfer the containers onto and off of level shelves on the vertical lift. With such arrangements the need for a soft stop mechanism as described above would be eliminated.

Referring next to FIGS. 10–17, the construction of the drive mechanism will be described that is responsible for rotating the shelves about the vertical queue in an endless loop. To facilitate explanation, the entire drive arrangement will be described as it applies to one side of the vertical queue. However, it should be appreciated that identical structures are provided on each side of the vertical queue. Each endless loop 108 comprises a compression chain 150 formed of a multiplicity of pivotably coupled linkage bars 151,153 that travel about a guide track 152. The linkage bars (see FIG. 17) alternate between inner linkages 151 and outer linkages 153 that are pivotably coupled together by an axle 154 disposed between a pair of spaced apart equally sized tapered guide rollers 156. The rollers 156 (as shown in FIG. 16) are adapted to travel about the guide track 152. The brackets 113 are fixedly mounted to the axle 154 by a mounting member that forms a shoulder 155. Two brackets 113 are provided to support each shelf. Only one bracket 113 is attached to each axle 154 and the brackets are arranged such that they combine with one of the linkage bars to form a triangular support for the shelf. As will be apparent from the description below, it is important to the operation of the drive mechanism that each linkage bar be the same length. Each of the inner linkage bars is formed by a pair of spaced apart equally sized plate members 157 (FIG. 17B) coupled by a support element 149 and a pair of tubular members 159 adapted to receive axle 154. The outer linkage bars have apertures 148 adapted to align with tubular members 159 to receive the axle 154 and form a pivot point with the adjacent inner linkages. The outer linkage bars also have supports similar to support elements 149 to increase the strength of the compression chain.

Figure 13:
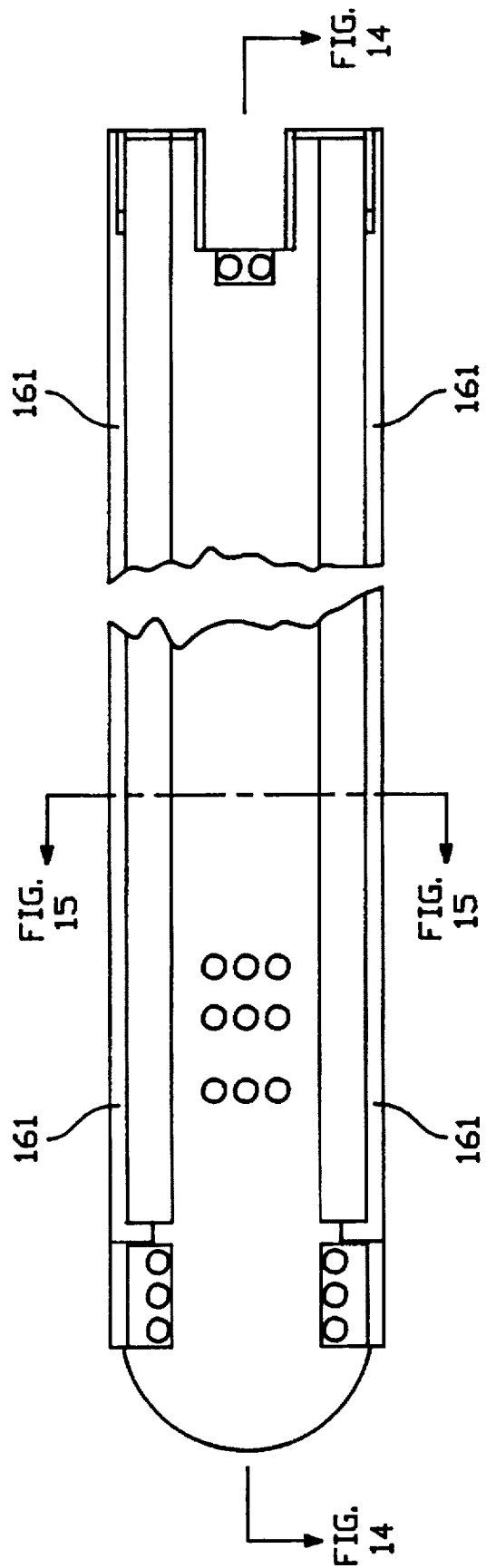
FIG. 13 is a side elevational view of the guide track for the endless loop that comprises the vertical queue.
Figure 14:
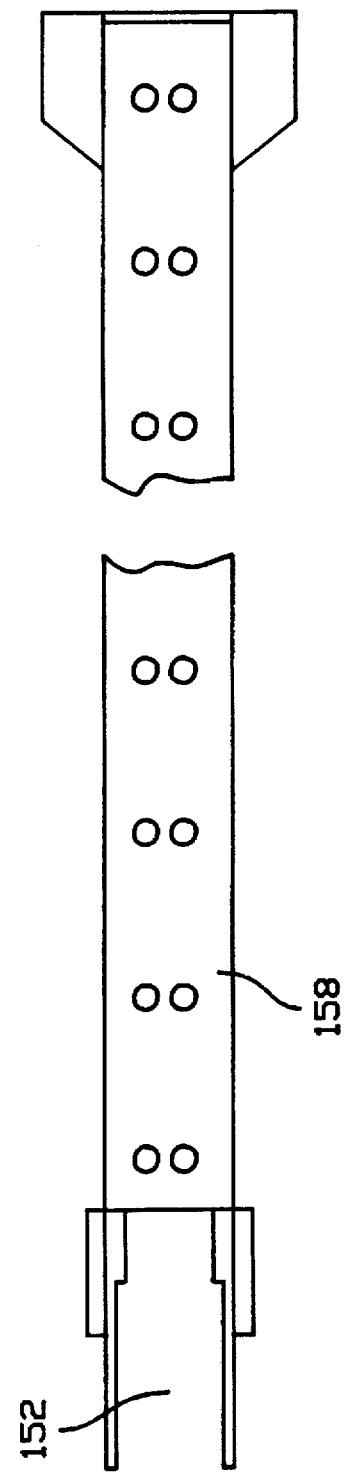
FIG. 14 is a cross sectional view of the guide track shown in FIG. 13.
Figure 18:
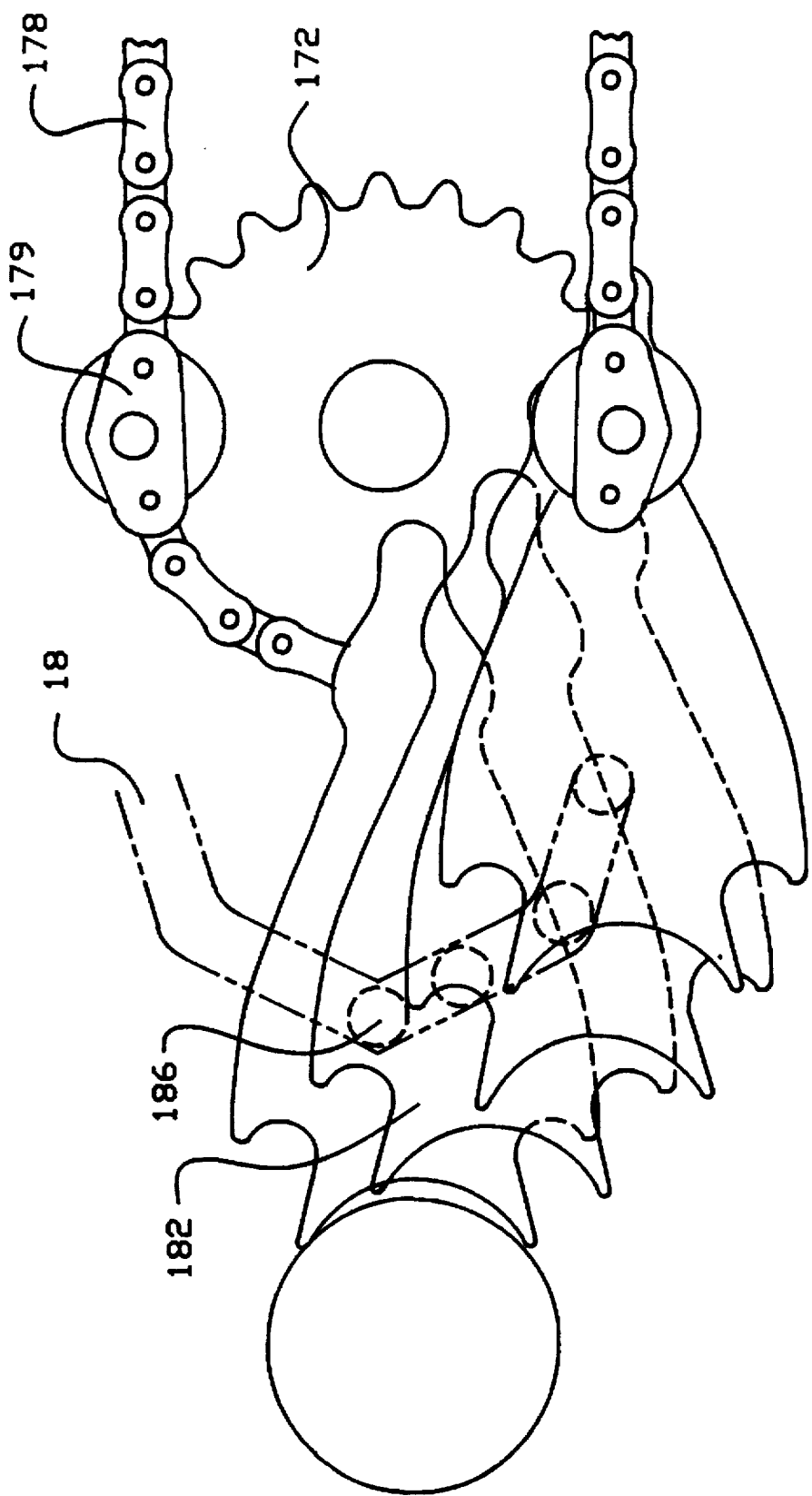
FIG. 18 is a time lapse diagrammatic view illustrating the travel of the weldment about the drive gear under the influence of the guide channel.
Figure 19:
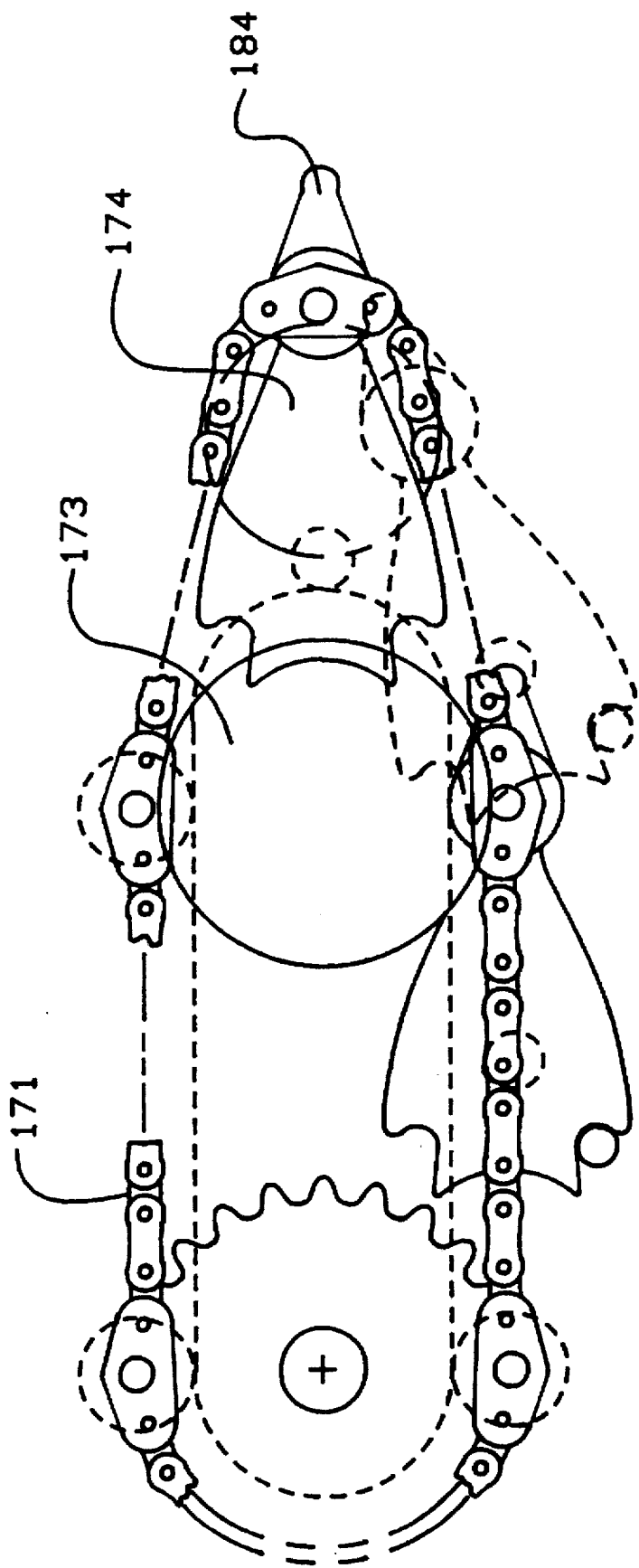
FIG. 19 is a time lapse diagrammatic view illustrating the travel of the weldment about the idler gear.

Referring specifically to FIGS. 13–15, the guide track 152 is carried by a tower 158 which carries much of the structural load of the vertical queue. The guide track itself is formed of a pair of vertically extending track portions 161 that are mounted to opposite sides of an I-beam. Each track portion comprise a pair of spaced apart, facing U-shaped members 160 adapted to receive the rollers 156. An opening is provided between the U-shaped members 160 that is wide enough to receive the linkage bars 151,153 and the bracket 113 and still leave enough room for the drive weldments described below to access the shoulder 155 on axle 154. The top and bottom ends of the guide track are left open so as to allow the linkage bars to rotate about the ends without interference. It should be appreciated that as the linkage bars rotate about the ends, their associated shelves are being guided about the end by the interaction between guide tube 123 and guide channels 121 or 122 as previously discussed.

Figure 10A:
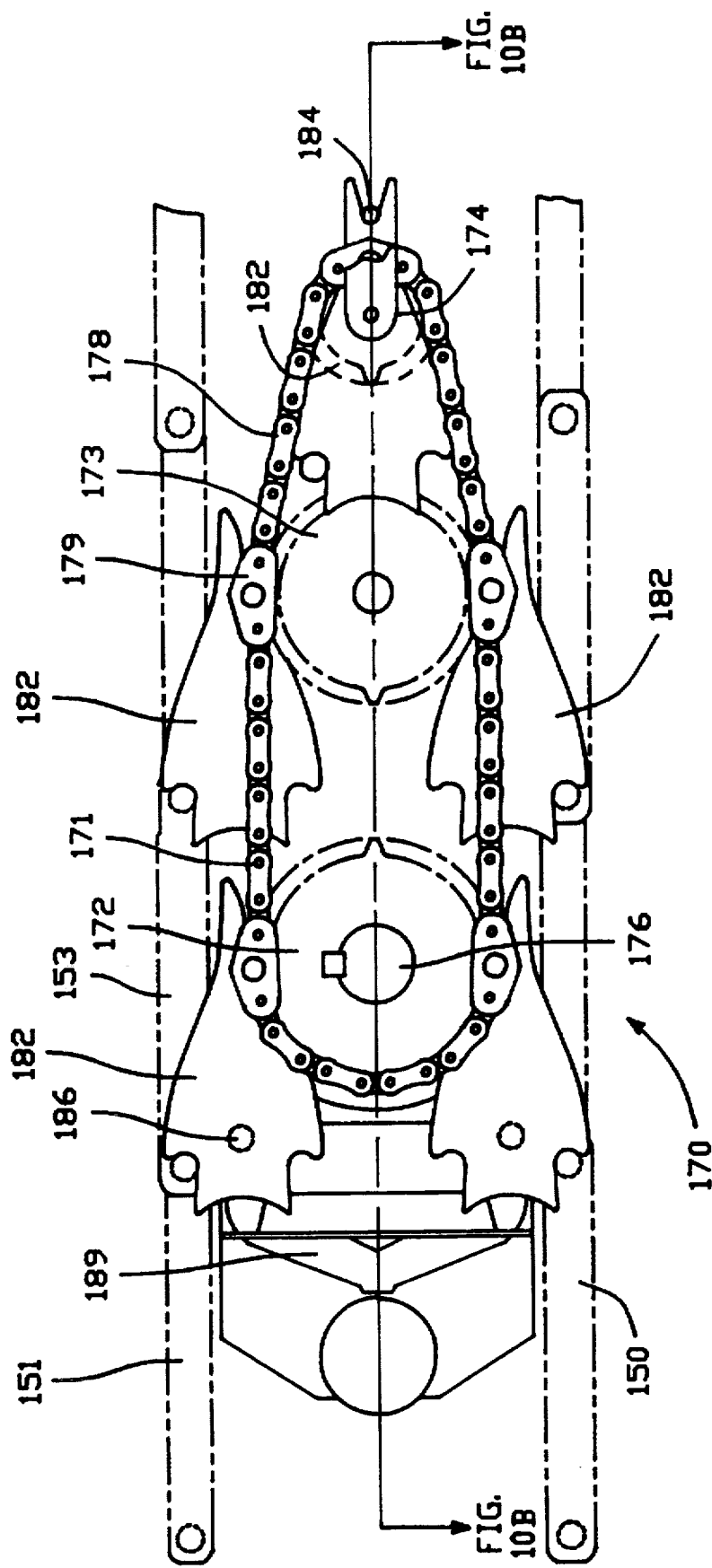
FIG. 10a is a side elevational view of a drive assembly suitable for powering the vertical queue.

To drive the compression chain in a continuous loop a drive mechanism 170 is provided as will be described with reference to FIGS. 10–12. The drive mechanisms 170 on opposite sides of the vertical queue may be driven by a common motor. Each drive mechanism is incorporated into a removable unit that is attached between segments of the I-beam. A pair of identically sized spaced apart endless drive chains 171 each extend about a three gear set comprising a drive gear 172, a spacing gear 173 that is sized identically with the drive gear and a reduced sized idler sprocket 174 as seen in FIG. 10a. The two drive chains and their associated gear trains are mirror images of one another. Therefore, the drive mechanism will be described by reference to a single drive chain 171 although it should be appreciated that the described structure is duplicated in actual practice. The drive gears 172 are carried by an axle 176 that is driven by motor 117.

The drive chains 171 are comprised of a plurality of links 178 interspaced with a plurality of equally spaced apart brackets 179 (FIG. 12A). The brackets 179 carry a rod 180 that extends between the two drive chains. Each rod is pivotally coupled to a weldment attachment 182 by a tubular member 183 that is aligned perpendicularly with the plane of the weldment 182 (FIG. 11B). The weldments 182 are all identically sized and it is important that they be equally spaced about the drive chain. As can be seen by reference to FIG. 11a, each weldment is symmetrical about its vertical axis and includes a pair of opposing notches 185 adapted to engage the shoulders 155 of axles 154 that couple the linkage bars of the compression chain 150. The drive mechanism 170 is positioned within the endless loop 108 such that the weldment attachments may engage the underside of adjacent endless loop axle shoulders 155. The drive mechanism includes five weldment attachments dispersed about the drive chains 171. The gears 172–174 are sized and spaced such that at least one of the weldments will engage a linkage bar on the up travel reach and at least one of the weldments will engage a linkage bar on the down travel reach of the endless loop at all times.

Referring next to FIGS. 10(a), 10(b), 18 and 19, the orientation of the weldments as they travel about the path of the drive chain will be described. To facilitate a reversible drive assembly, the weldments must be maintained in a substantially vertical orientation as they travel about the loop formed by drive chain 171. To maintain the weldments in the upright position, a guide roller 186 is provided on the free end of the weldment, and an alignment notch 187 is provided on its bottom end. The guide roller is adapted to engage a guide channel 189 disposed vertically above the drive mechanism 170 when the bracket 179 that connects the weldment to the drive chain engages the drive gear 172. The contour of the guide channel 189 is arranged to ensure that the weldment falls gently away from the link bar axle it carries on an up travel reach as the weldment is rotated about the end of drive gear 172. The guide channel 189 is symmetrically shaped so that it serves to gently position the weldment under a linkage bar axle on its down travel reach as the weldment completes its journey about the drive gear 172.

The alignment notch 187 works in combination with the support notches 185 to perform the same function as the weldment passes about the lower end of the drive mechanism. As can be seen by reference to FIG. 19, the weldment begins to fall away from supporting engagement with the link bar axle it carries as it passes by spacing gear 173 on a down travel reach. As the link bar is disengaged from the support notch 185, the vertical surface 188 of the support notch 185 rests against the link to prevent the weldment from flopping loosely. As the weldment approaches the idler sprocket 174 the alignment notch is engaged by an alignment pin 184 positioned directly under the idler sprocket 174. The geometry of the alignment notch and the positioning of the alignment pin 184 are arranged such that the weldment will flop to the opposite side such that it no longer rests against a link bar on the down travel reach, rather the vertical surface 188 of the opposite support notch 185 rests against a link bar on its up travel reach. As the drive chain continues to rotate, the support notch in contact with the link bar on an up travel reach is then gently rotated into a supporting position underneath the link bar.

Preferably the motor 117 is reversible so that the shelves may be rotated in either a clockwise or a counterclockwise direction. With such an arrangement, when a request is made for a particular container, the queue may be rotated in the shortest direction to the release point. It should be appreciated that the symmetrical guide channel and alignment notch geometries described facilitate the use of a reversible drive motor since changing directions of the drive cable will not adversely affect the positioning of the weldment.

SUPPLY CONVEYOR

Referring specifically to FIGS. 1 and 7, the supply conveyor section 12 may be provided with one or more transfer stops 90 for transferring containers from the supply conveyor to an adjacent loading ramp. There are a wide variety of conventional right angle transfer assemblies for conveyors that may be used to form transfer stop 90. In an embodiment of the transfer stop chosen for the purpose of illustration, each transfer stop has a plurality of transversely disposed traction rollers mounted at longitudinally spaced locations along the conveyor section 12 leaving spaces between the rollers. Power driven endless belts which are disposed within the spaces may be selectively activated to divert containers onto the loading ramp 20. A power operated alignment stop 97 is provided at the end of each transfer stop to ensure that the containers to be diverted to the adjacent loading ramp 20 are properly positioned. Thus, when a container is delivered to a particular transfer stop 90, its associated alignment stop is raised and the container is carried by traction rollers 92 until it abuts against the alignment stop. A presence detector 23 can be provided to detect the presence of a container within the transfer stop. After the presence detector verifies that the container is properly positioned, the traction rollers may be turned off.

Figure 21:
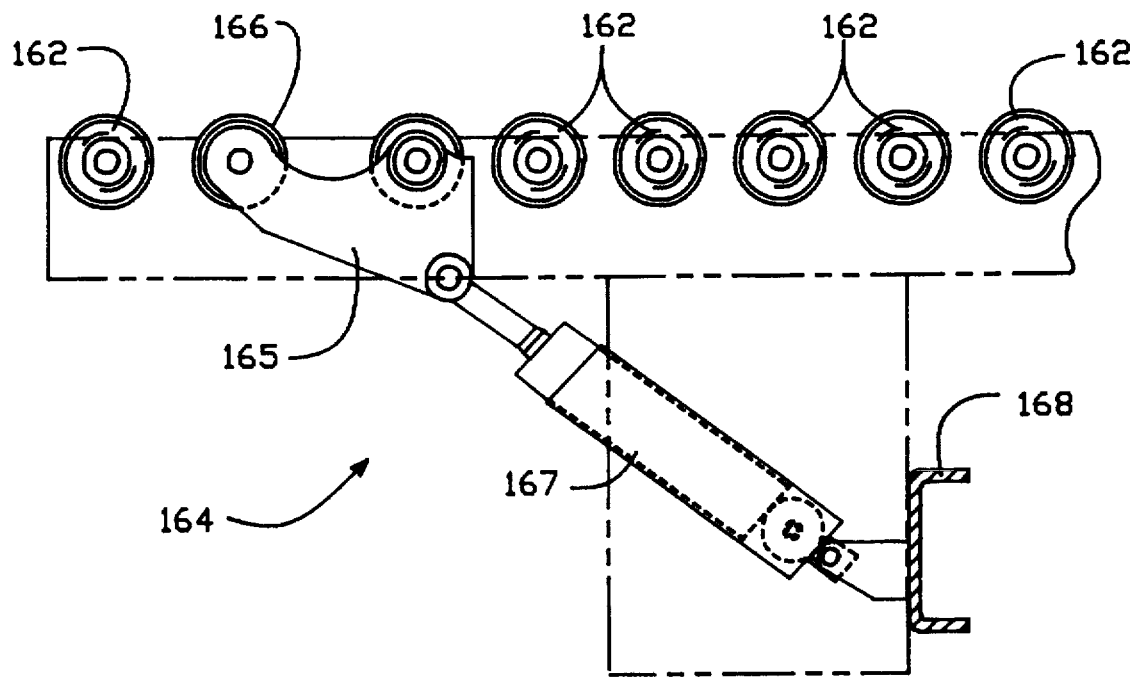
FIG. 21 is a side elevational view of a flow through power operated stopper assembly.

In the embodiment shown in the Figures, the loading ramp is gravity motivated. With such an arrangement, loading ramp 20 is tilted toward the vertical queue 11 and is comprised of a plurality of transversely arranged low friction rollers 162. A power operated stopper 164 which may be pneumatically operated holds the containers until they are ready to be loaded onto the vertical queue 11 (FIGS. 6 and 21). When the container 25 is loaded onto the vertical queue 11, the queue is rotated until an empty shelf is positioned adjacent the loading ramp 20 and momentarily stopped. The power operated stopper 164 is released and the container rolls freely over the low friction rollers 162 and 118 onto the shelf until it strikes soft stop mechanism 136. Then, as previously described, the container is gently lowered into abutment against the shelf blocker 119. The soft stop mechanism 136 will absorb much of the containers momentum as previously described. Although in the embodiment shown in FIG. 6, loading ramp 20 is tilted to facilitate gravity motivation, it should be appreciated that the loading ramp can readily be adapted to facilitate substantially horizontal insertion. This can be accomplished by replacing the low friction rollers with power operated rollers or by adding an actuator assembly capable of pushing containers onto the vertical queue to perform the same function.

When a container 25 is to be unloaded from the vertical queue, the queue is rotated until the appropriate shelf 111 is positioned adjacent the delivery system 14 and momentarily stopped. The appropriate shelf blocker 119 is released, thereby releasing the container which due to the tilt in the shelf 111 rolls freely across low friction rollers 118 onto the discharge station 40 of delivery system 14. It should be appreciated that the shelves may be substantially horizontal and outfitted with the traction rollers to accomplish the same function. Conventional side stopper arrangements are located on the side of the discharge station opposite the exit points for the vertical queue to insure that the discharged containers remain on the delivery conveyor without damaging either the containers or the conveyor. The discharge stations themselves may be conventional right angle transfers that include three sets of spaced apart roller wheels that are disposed between traction rollers of the delivery conveyor. In such an arrangement the conveyor for the delivery system is disposed a few inches below the position at which the shelves are stopped when they discharge the containers. The ends of the roller sets closest to the vertical queue are tilted upward when a container is to be discharged such that the end substantially matches the level of the adjacent shelf edge, thereby providing a smooth ramp for the container to flow over when it is released.

Referring next to FIG. 21, a suitable construction for power operated stopper 164 will be described. In embodiments that incorporate the gravity motivated loading ramp 20, the power operated stopper must act as a shock absorber that absorbs the momentum of containers incident thereon without bouncing the containers back towards the transfer assembly. The power operated stopper includes a pair of dogs 165 pivotally coupled to opposite ends of one of the low friction rollers 162. A rubber strike roller 166 is rotatably coupled to the free end of dogs 165. A pair of side by side hydraulic pistons 167 are coupled between each dog and a fixed brace 168, as shown in FIG. 21 such that when the pistons are extended, the strike roller 166 is in an upright position that blocks the container path. When the hydraulic rams are withdrawn, the strike roller 166 is pivoted into the plane of the low friction rollers 162 and since it is rotatably mounted to the dog, the strike roller functions as just another roller for the loading ramp. The hydraulic pistons function as shock absorbers that receive the impact of the containers as they slide down the loading ramp.

Figure 22:
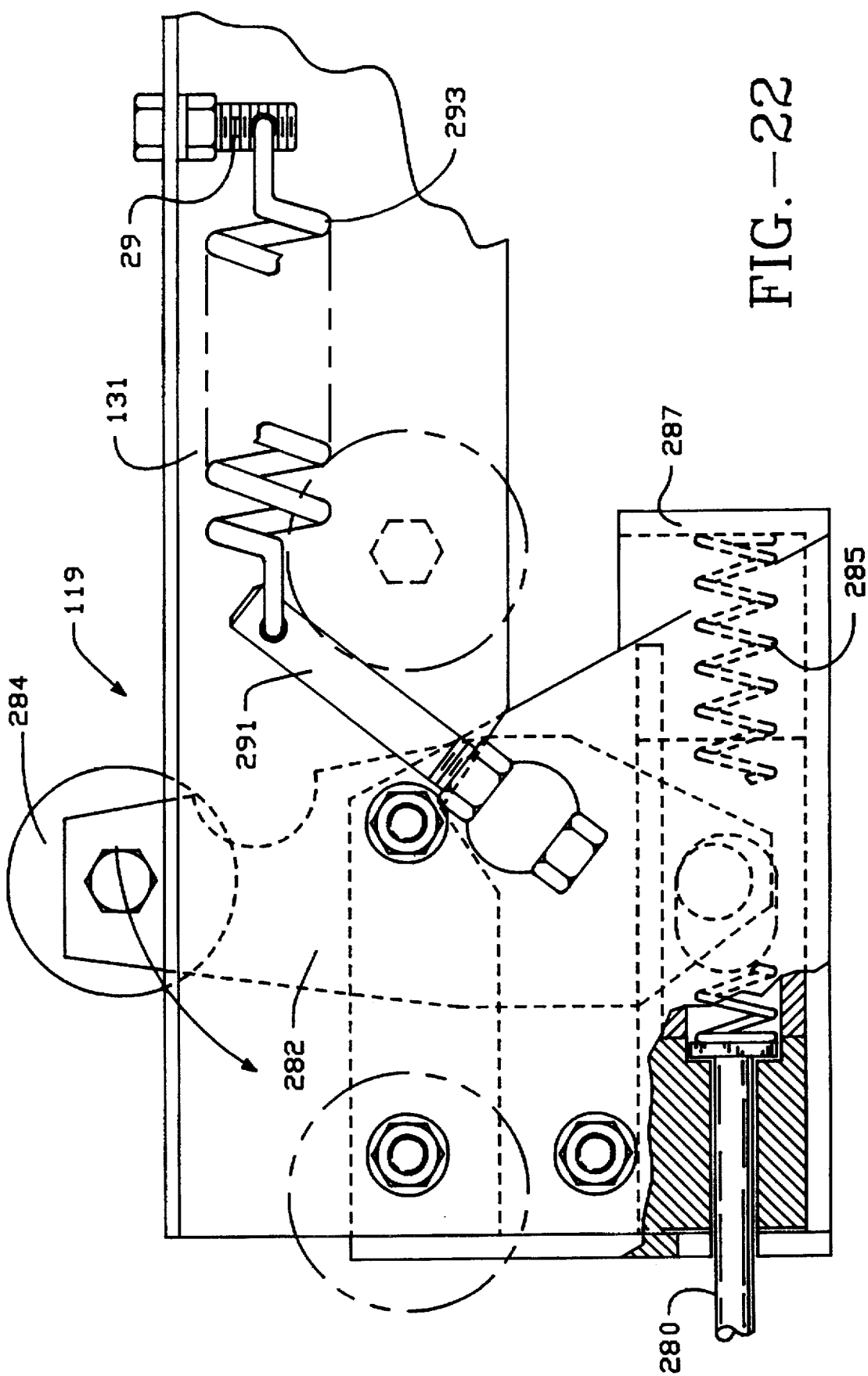
FIG. 22 is a side view of the blocker assembly.
Figure 23:
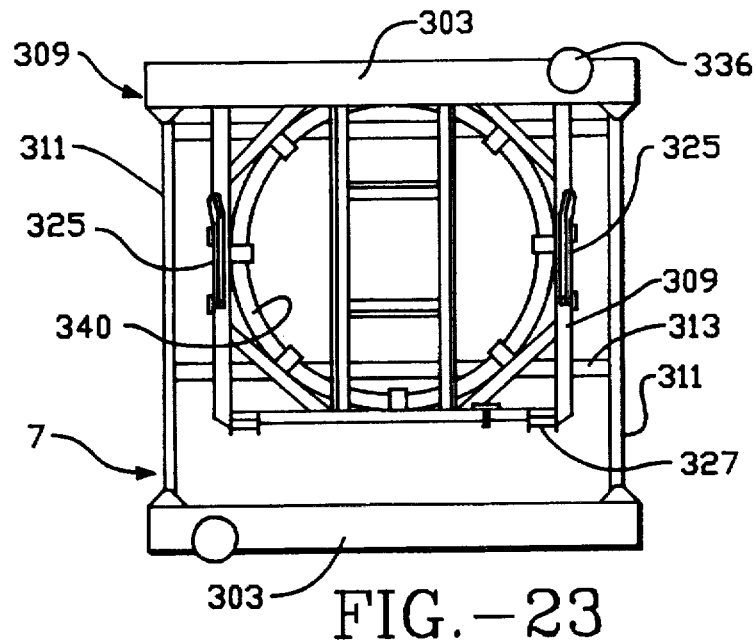
FIG. 23 is a top view of the rotating work table shown in FIG. 3.

Referring next to FIG. 22, a suitable construction for the shelf blockers 119 will be described. Since the power operated blockers only need to be released when their associated shelf is disposed adjacent the delivery system 14, the mechanism for actuating the blockers 119 may be mounted in a single location on either the delivery system or the vertical queue. A pnuematic piston (not shown) activates push rod 280 when a container is to be released. The push rod 280 is mounted to the vertical queue frame 112 (FIG. 5). The blocker 119 includes member 282 which is pivotally mounted to the shelf riser 131 at its lower end. The upper end of member 282 carries a low friction roller 284. When a shelf is disposed adjacent the discharge station 40, the push rod 280 may be activated. When activated, the push rod 280 strikes the lower portion of member 282 thereby causing the member 282 to pivot about a pivot point which drops roller 284 from the raised position shown in FIG. 22 to the lowered position shown in the same drawing. The lowered position is in line with the other low friction rollers 118 on shelf 111. A compression spring 285 is mounted between the push rod 280 and a frame element 287 attached to frame 112. The compression spring returns the push rod 280 to the contracted position when pressure is let off of the pnuematic piston.

Similarly, a return arm 291 is connected on a first end to member 282 and on a second end to spring 293. The opposite end of the spring is mounted to a bolt 295 in shelf riser 131. Spring 293 is arranged to return the member 282 to the upright position when pressure is let off of the pnuematic piston.

In the embodiment described for the purpose of illustration, the vertical queue 11 is adapted to receive two side-by-side containers on each shelf. The throughput of the vertical queue can readily be varied by altering the width of shelves 111 to accommodate various numbers of containers on each shelf and providing the appropriate numbers of loading ramps 20 and discharge stations 40. To further increase the operational rate of the queue, multiple vertically aligned loading and discharge systems may be provided as well.

The delivery system is essentially a conveyor network adapted to deliver the containers to an appropriate work table. The delivery system 14 may include a supply stop 190 for each work table. The supply stops 190 (FIG. 1) may be constructed similarly to the transfer stops 90 or the right angle transfers previously described. Each supply stop retains a particular container until the loading ramp for the work table 7 with which it is associated is ready to accept that container. The construction of the loading ramps for the work tables may be identical to the loading ramps 20 previously described for the vertical queue.

ROTATABLE WORK TABLES

Figure 3:
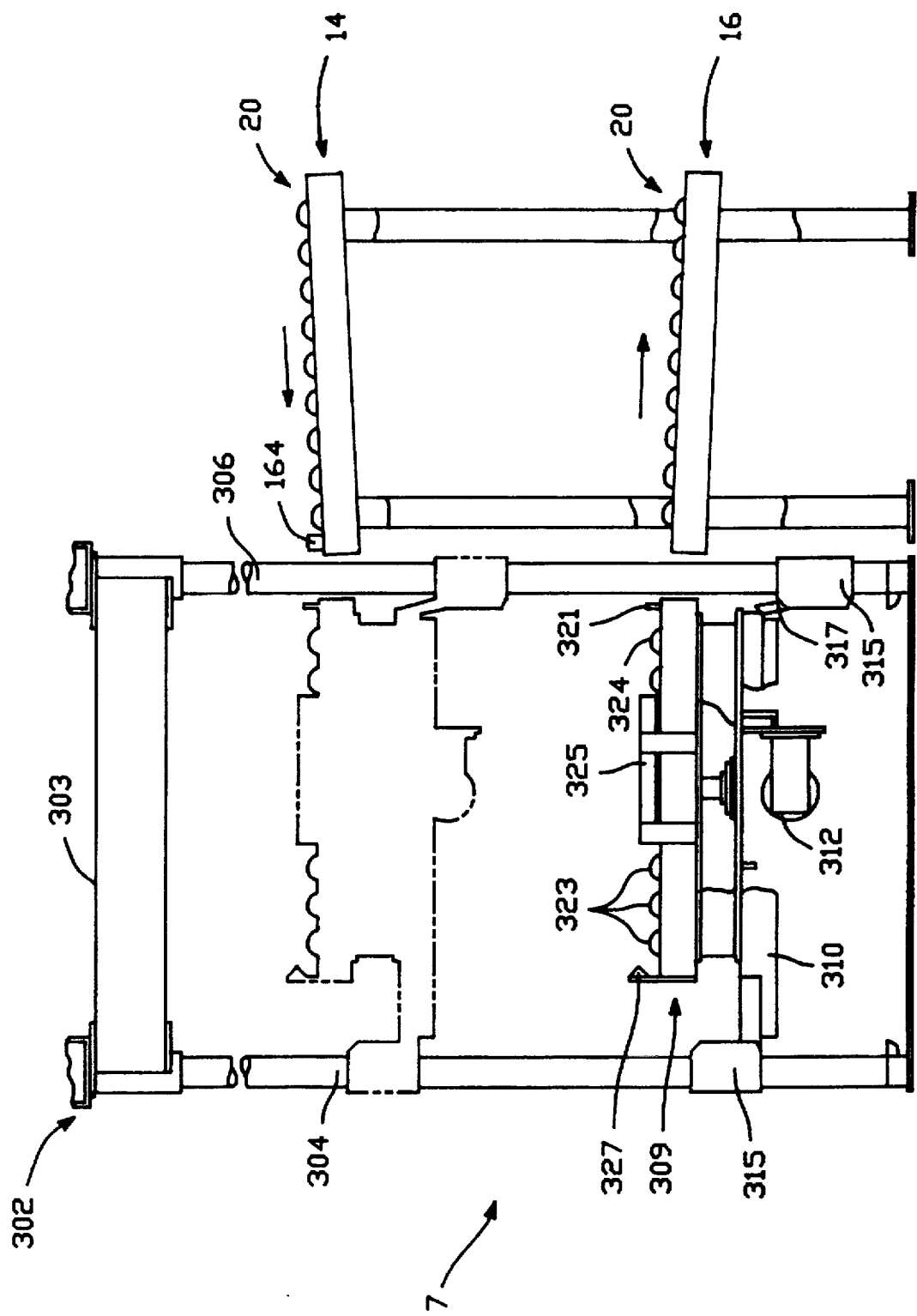
FIG. 3 is a diagrammatic side view of a typical rotating work table as shown in FIG. 1.

The work tables 7 are adapted to automatically receive and discharge containers and are positioned such that an operator can readily access the contents within the container 25 that is sitting thereon. As seen in FIG. 3, the embodiment of the work center described is arranged such that the delivery conveyor of the delivery system 14 is positioned directly above the takeaway conveyor of the takeaway system 16. Thus the work table 7 is adapted to receive containers at one level and discharge containers at a second level. However, it should be appreciated that the positions at which the work tables receive and discharge containers, as well as the actual construction of the work tables 7 may be widely varied within the scope of the present invention.

Referring next to FIGS. 3 and 23–31, the embodiment of the work table chosen for the purpose of illustration will be described. The work table 7 includes a frame 302 having two front posts 304 and two rear posts 306 that are coupled by a plurality of frame members 303. The posts are tubular and arranged in a rectangular fashion. The posts are secured to the floor of the work area and frame members 303 extend between adjacent posts to provide the necessary support. A rotatable platform 309 is carried by a substantially rectangular base 310 that is slidably coupled to the frame posts 304,306. A drive motor 312 carried by base 310 rotates the platforms 309 about a substantially vertical axis. The base 310 is formed by a pair of parallel beams 311 that are coupled by a plurality of risers 313 (see FIG. 27). The beams 311 extend along opposite sides of the frame 303 between one of the front posts 304 and a corresponding rear post 306. Each corner of the base 310 is connected to one of the posts by a sleeve 315. Each sleeve 315 is slideably coupled to an associated post and attached to a drive chain 314 that may be selectively driven to raise or lower the sleeve with respect to its corresponding post.

Figure 24:
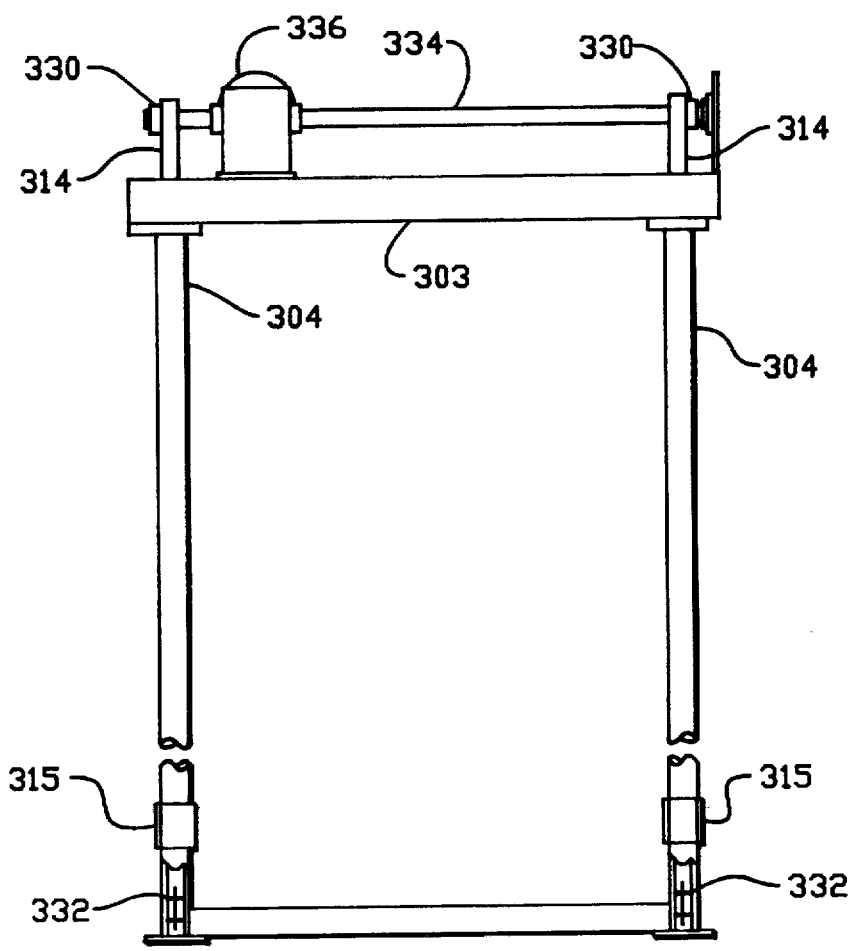
FIG. 24 is a front view of a drive assembly that raises and lowers the rotating work table platform.

Referring next to FIG. 24, each post has a drive chain 314 arranged as a vertically extending endless loop between a drive sprocket 330 on its top end and an idler gear 332 on the bottom. The drive chain 314 travels through the tubular post on one of its reaches and outside the post on its opposite reach (although for safety the portion of the chain outside the operational traveling distance of the platform may be protected by a shroud). The sleeves 315 are each attached to the outer reach of their associated drive chain. The drive sprockets 330 for the drive chains associated with the front posts are mechanically coupled by a drive bar 334. A similar drive bar couples the rear sleeves in a similar fashion. The drive bars 334 are driven by independent reversible motors 336. Thus, the movements of the front sleeves are mechanically coupled, as are the movements of the back sleeves. It will be appreciated that the platform 309 may be raised by moving all four of the sleeves simultaneously, or it may be tilted by independently moving the front or rear sleeve pairs.

Figure 25:
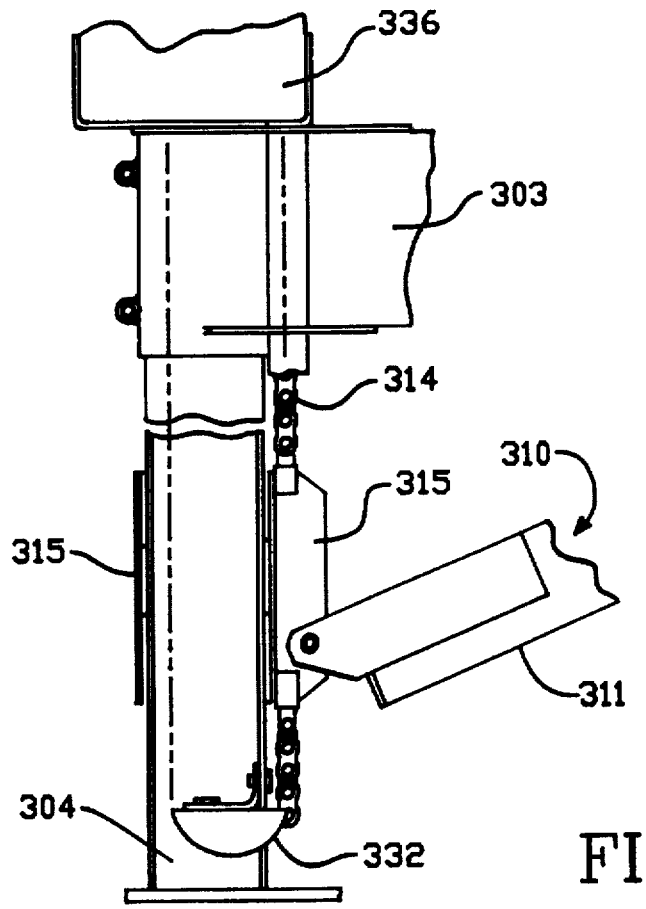
FIG. 25 is a side view of the coupling between the front edge of the work table base and its drive chain with the sleeve and post partially cut away.
Figure 26:
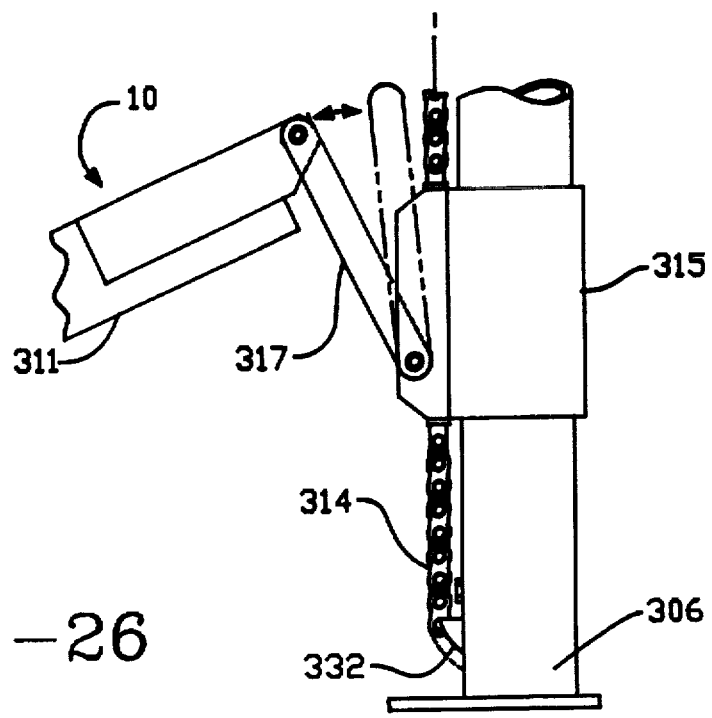
FIG. 26 is a side view of the coupling between the back edge of the work table base and its drive chain.

Referring next to FIGS. 25 and 26, the parallel beams 311 of base 310 are pivotally coupled between the front posts 304 and the rear posts 306. As can be seen in FIG. 25, the front ends of beams 311 are simply pivotally mounted to their corresponding sleeves 315. In order to allow the front and back sides of the platform to move independently, a pair of lever arms 317 are provided to pivotably connect the base to the rear post sleeves to provide the necessary slack during tilting. As can be seen in FIG. 26, a first end of each lever arm is pivotably connected to one of the beams 311 in base 310, while the second end of the lever arm is pivotally connected to the associated rear sleeve. Thus, the front and rear ends of base 310 can move independently with lever arm 317 providing or absorbing the necessary slack.

The platform 309 best seen in FIGS. 3 and 28 carries a gate 321, a plurality of rollers 323, side rails 325 and a pair of stoppers 327. The platform itself is substantially square with the axis of rotation of rollers 323 extending perpendicularly to side rails 325. In the embodiment chosen for description, the delivery system 14 is disposed substantially above the takeaway system 16. Thus, when a container 25 is delivered to the rotating work table the platform is raised to the height of the delivery system. The gate 321 and a power operated stop 164 on the adjacent loading ramp 20 are both dropped and the container is guided by side rails 325 as it passes over the rollers 323 until it is stopped by the stopper 327. The gate 321 is then raised to prevent the container from slipping off the platform. To facilitate transferring the container from the loading ramp 20 to the platform 309, rollers 323 may be either power operated or low friction. Low friction rollers are appropriate if loading ramp 20 is slightly inclined to provide gravity motivation. With the gravity motivated system, the first roller 324 may be a breaking roller to slow down the container as it enters the work table platform. Alternatively the braking roller may be provided as one of the last rollers of the loading ramp to accomplish the same function.

Figure 29:
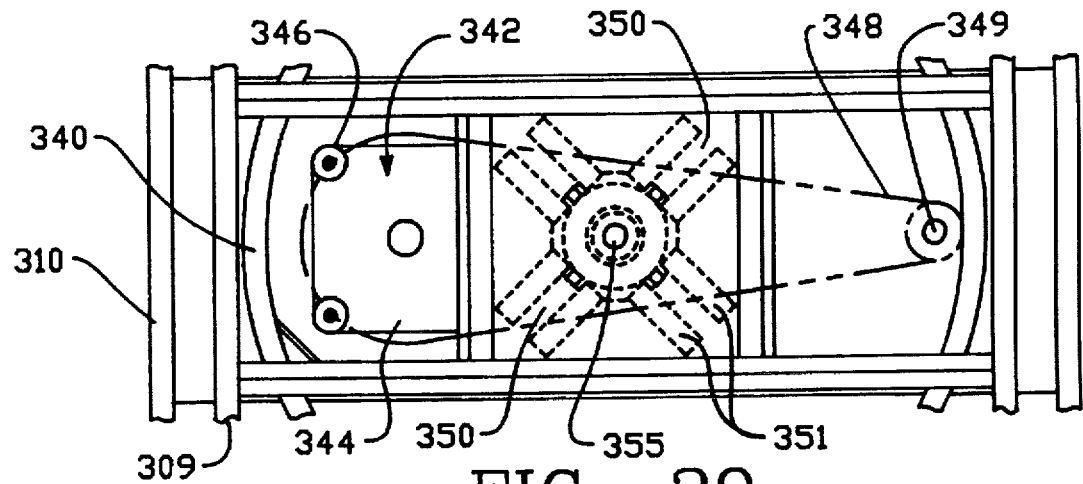
FIG. 29 is a top view of the geneva drive that rotates the work table platform relative to its base.
Figure 30:
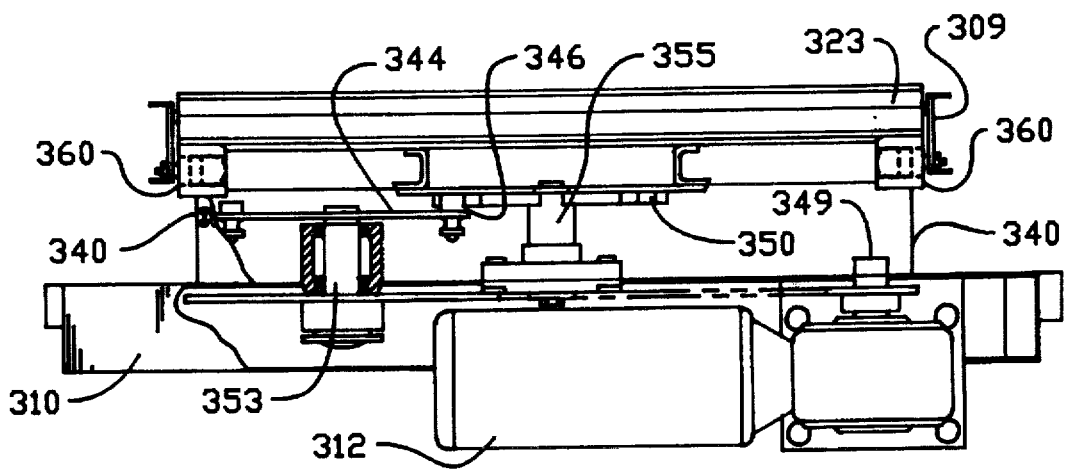
FIG. 30 is a side view of the geneva drive system shown in FIG. 29.

Platform 309 is rotatably mounted to base 310 on a circular track 340 carried by beams 311, 313 and a rotatable shaft. See FIG. 27. A plurality of rollers 360 (FIG. 30) are mounted to the bottom side of platform 309 to travel about the circular track 340. The circular track 340/rollers 360 arrangement is particularly useful for supporting unbalanced loads, as will be frequently encountered with partially full containers. A geneva drive system 342 driven by electrical motor 312 rotates the platform as necessary. The geneva drive (shown in FIGS. 29 & 30) is substantially conventional and includes a square plate 344 having a roller 346 extending upward from each of its corners. The plate 344 is mounted on the base 310, and is chosen to have four sides so that each of the sides of the square containers can be presented to the operator. The rollers 346 are designed to engage channels 350 on the lower side of platform 309. As can be seen in FIG. 29, the channels 350 form a pair of perpendicular lines that intersect at the axis of rotation of the platform about shaft 355. The platform is properly positioned showing one of its sides when two of the rollers 346 engage their associated channels 350 as seen in FIG. 29. It should be appreciated that such an arrangement provides a great deal of stability in its fixed presentation positions and that rotational movement between the presentation positions is sinusoidal. Each channel is formed by a pair of parallel members 351. The plate 344 is driven by a belt 348 that in turn is coupled to the drive shaft 349 of motor 312.

Figure 31:
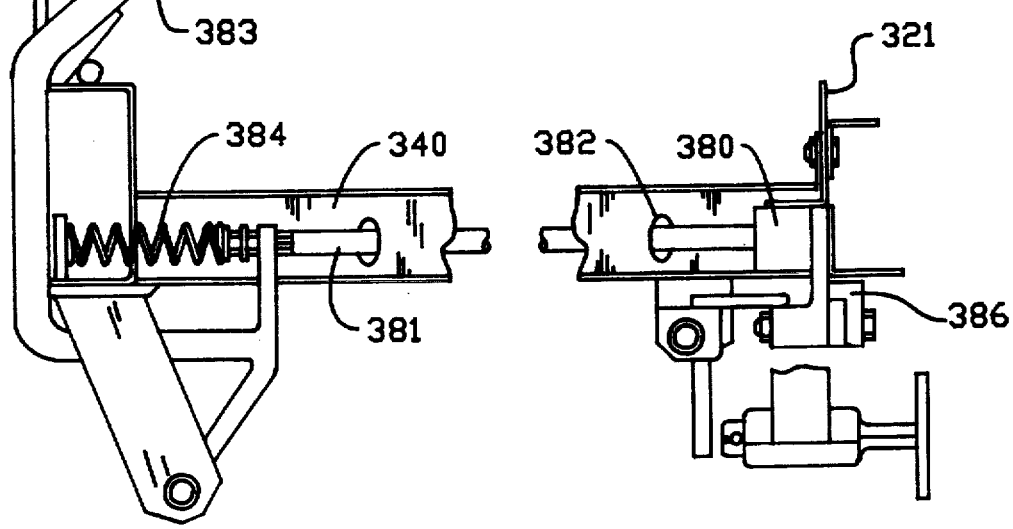
FIG. 31 is a side view of the gate assembly for retaining containers on the work table platform.

Before a container can be placed on the work table, the gate 321 must be dropped. A wide variety of conventional mechanisms can be provided as the gate and the means for raising and lowering the gate. A suitable construction is shown in FIG. 31. The gate 321 takes the form of an L-shaped member that rests upon a moveable block 380. The moveable block is coupled to the end of an extended rod 381 that passes through a couple of apertures 382 in the walls of circular track 340. A hand operated lever 383 mounted to the front side of base 310 is pivotally coupled to the other end of rod 381. A compression spring 384 is biased to press against the rod 381 to press the moveable block 380 towards the rear of the platform. When the work table is sitting in a position such that the gate 321 is adjacent the loading ramp, the handle 383 is disposed right in front of the operator. To drop the gate, the operator pulls the handle 383 which moves block 380 out from underneath the gate member 321 thereby dropping the gate.

Once a container is placed on the work table, the height of the platform is adjusted to suit the particular operator and the platform is tilted towards the operator to provide better access to the interior of the container. Tilting is accomplished by raising the rear sleeves relative to the front sleeves. To ensure operator comfort, it is generally desirable to adjust the platform to approximately waist height and tilt the table in the approximate range of 15°–30° toward the operator. In a fully automated system, when an operator is prepared to begin work, he logs into the controller which verifies that the operator is authorized to work this station. The operators height may be inputted into and remembered by the controller which can then vary the level at which the containers are presented to the operator to match the height of the particular operator.

Each work table is provided with a signal light 375 and a pushbutton 370. The signal lights are controlled by the system controller to light up over the active table. After the operator is finished with an operation, he hits a pushbutton 370 which informs the controller that the designated task is complete. If other items within the container are to be distributed or items are to be placed in other compartments, the platform is rotated to the appropriate position. If the container will not be used any more, the platform is rotated to its neutral position, lowered to the level of the takeaway system 16 and tilted such that the back side of the platform is lower than the front. The gate 321 is then dropped and the container is released. Again the container transfer may be accomplished either through the use of power operated rollers or by slightly inclining the platform towards the takeaway system.

CONSOLIDATION QUEUE

Figure 32:
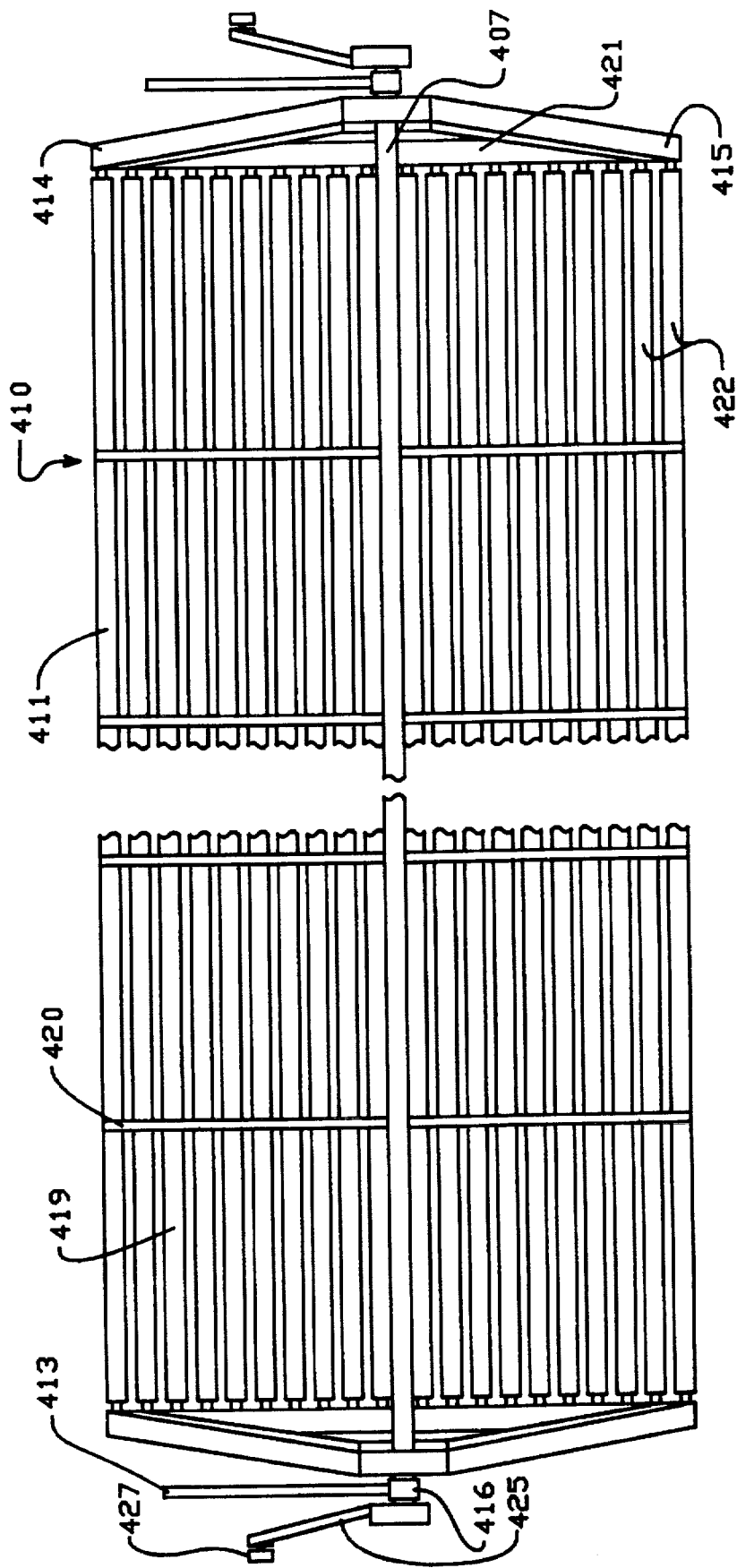
FIG. 32 is a top view of the bottom shelf portion of a consolidation queue pan.
Figure 34:
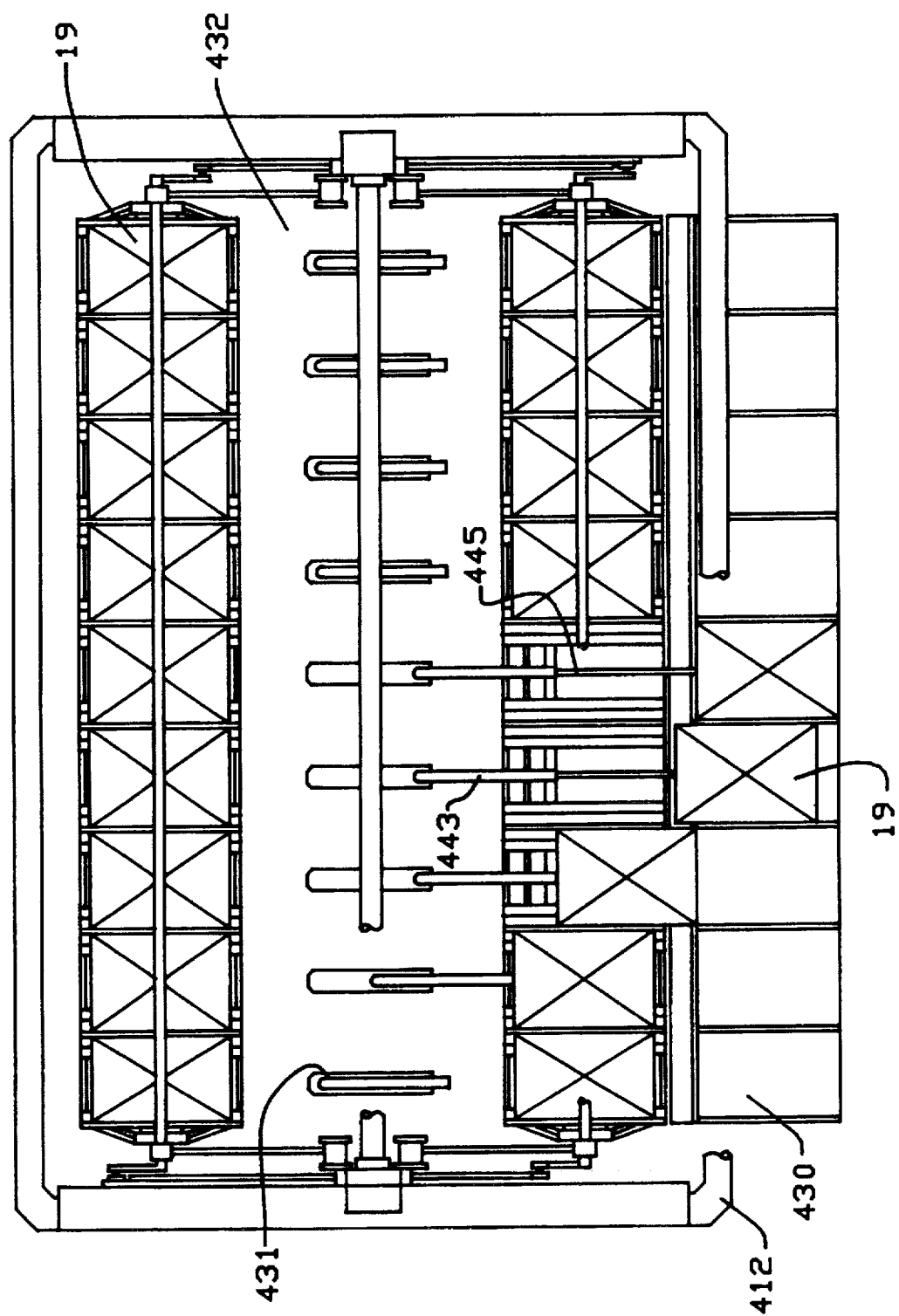
FIG. 34 is a top view of a consolidation queue as shown in FIG. 33 with totes in place and highlighting the extension of the multistage pneumatic rams.
Figure 35:
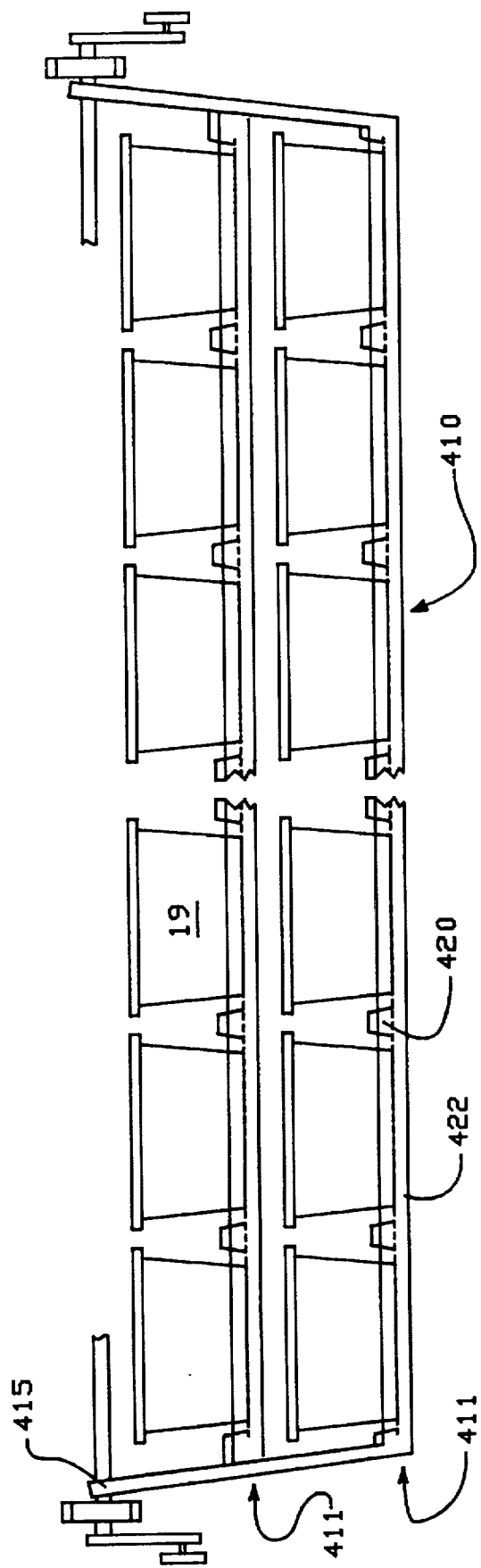
FIG. 35 is a side view of the shelf pan shown in FIG. 32.
Figure 36:
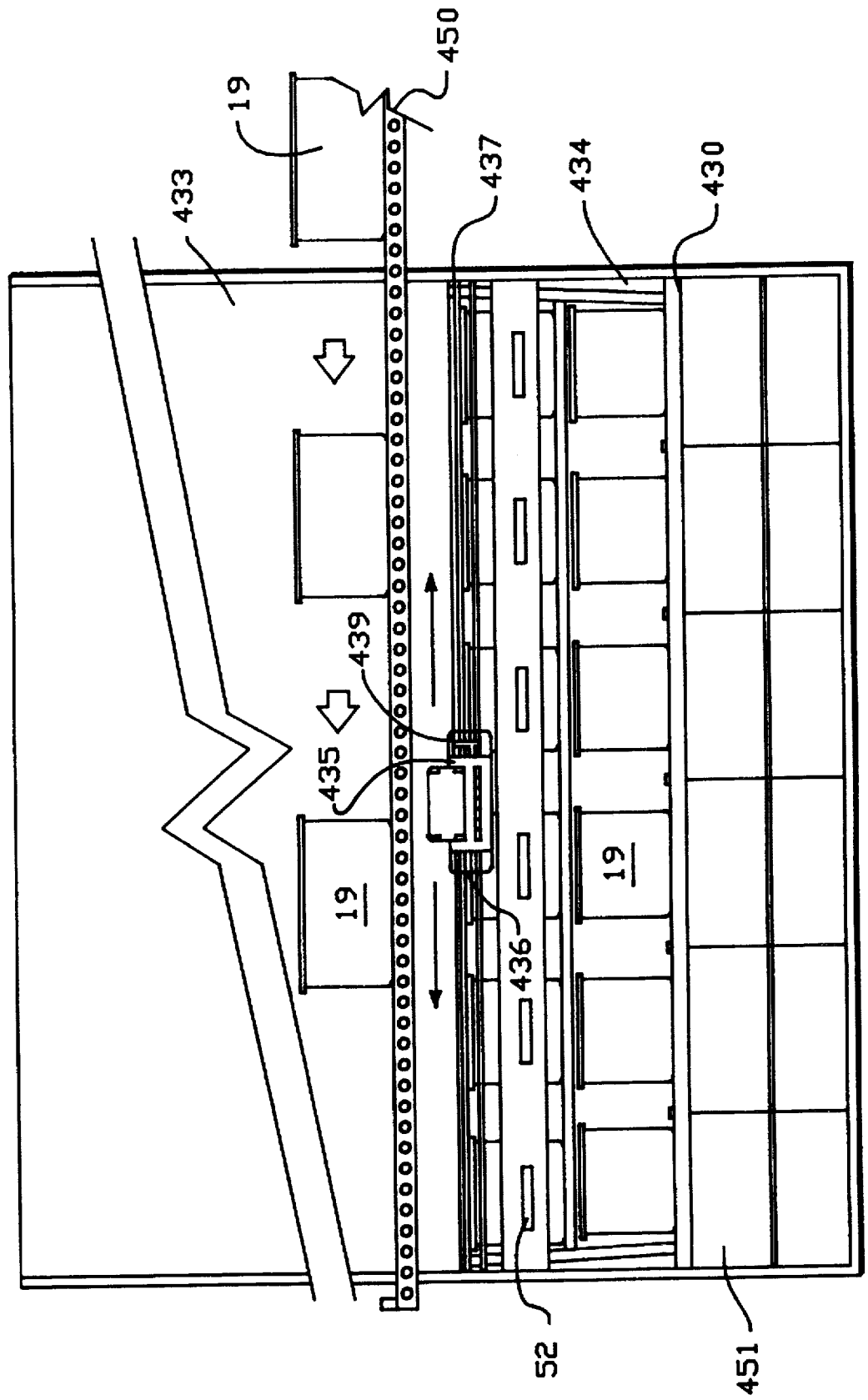
FIG. 36 is a front view of the consolidation queue incorporating a conveyor stub for supplying empty totes.

The consolidation queue 18 is positioned adjacent to work area 5 such that an operator may conveniently work between the consolidation queue and the work tables 7. Structurally, the consolidation queue may take a form very similar to the vertical queue 11, with the primary differences being in the loading and unloading mechanisms, the shelf sizes and the containment mechanisms for keeping the totes on the shelves. Referring next to FIGS. 4 & 32–38, the embodiment of the consolidation queue chosen for the purpose of this description comprises an endless progression of horizontally oriented pans 410 spaced along an opposing pair of endless loops 408 which may take the form of compression chains, for travel about a frame 412. The respective ends of pans 410 are attached to one of the opposing compression chains by brackets and suspension struts just as the shelves of the vertical queue are connected to their respective endless loops. Referring primarily to FIGS. 4, 32 & 35, each end of each pan 410 has an associated pair of suspension struts 414, 415 of appropriate length that are secured from the front and back edges of the pan to the corresponding bracket 413 by a pivot point 416 so that the pans 410 are pivotably supported by the struts. The pivotal mounting causes the pans 410 to always hang below the bracket and the pivot point in a substantially horizontal orientation so that the totes 19 may ride with the shelf as the shelf passes over from its up travel reach to its down travel reach. The endless loop 408 may be driven by an electrically, pneumatically or hydraulically operated reversible motor (not shown). Thus, the consolidation queue may be rotated in either direction.

Two shelves 411 are suspended from each bracket/suspension strut arrangement as can be seen in FIG. 35. It should be appreciated that in alternative embodiments, the pans 410 may readily be constructed so that only one or more than two shelves 411 are suspended from each bracket. The two shelve construction is advantageous in the consumer products distribution application described above because it facilitates standardization of parts between the consolidation queue and the vertical queue. The standardization is possible since the totes are on the order of one-half the height of the described containers which allows many common components between the two queues.

Each shelf includes a riser 421 on each end of the shelf that is secured between suspension struts 414, 415 to provide a triangular frame that supports the shelf. (FIG. 32). A plurality of struts 422 extend between opposing risers 421 to form the base of the tote pads 419 (FIGS. 32 and 35). The upper sides of struts 422 are rounded to provide a low friction surface over which the totes may readily pass.

Shelves 411 are sized and arranged so that the plurality of tote 19 may be placed side-by-side on each shelf. Preferably, each shelf includes a plurality of tote pads 19, each of which receives a single tote drawer 19. Spacers 420 extend perpendicularly across the upper surface of the shelves to separate the various tote pads and to hold the totes in place. By way of example, in a large scale consumer products warehousing application as previously described, a suitably sized consolidation queue 18 may have approximately 40 shelves with each shelf holding about 10 tote drawers. In such a system 20 suspension/bracket arrangements would be provided about the endless loop 408 with each suspension/bracket arrangement supporting two shelves. Alternately, the consolidation queue can be configured to carry a plurality of either full sized or downsized containers 25 on each shelf. Such an arrangement is desirable particularly in distribution systems wherein consolidated or kitted goods are to be returned to a storage carousel for storage rather than delivered for immediate shipping or production use.

Figure 33:
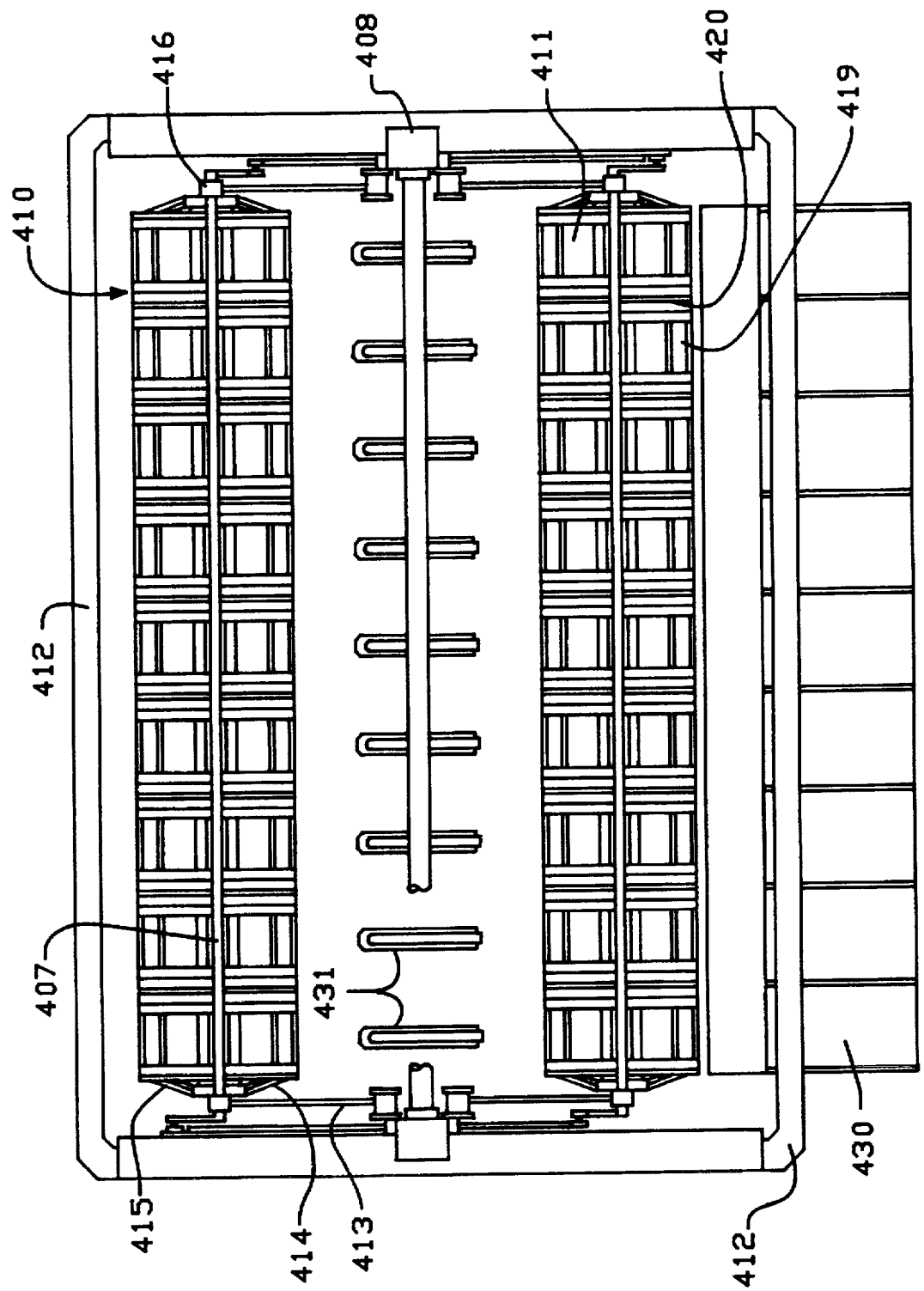
FIG. 33 is a cut away top view of the consolidation queue taken at the level of the fixed loading shelf.

Referring next to FIG. 33, the endless loop compression chains 408 comprise a multiplicity of pivotably coupled linkage bars that travel about continuous guide track. The linkage bars and guide track may take a form identical to the linkage bar and guide track arrangements previously described with respect to the vertical queue 11. Similarly, a drive mechanism that rotates the compression chain 408 and guide channels that ensure the shelves remain substantially horizontal as they pass over the top or under the bottom of the consolidation queue 18 may also be identical to the corresponding components of the vertical queue.

The front face of the consolidation queue includes a fixed loading shelf 430 that is mounted on the frame 412 and protrudes outwardly towards the operator at about waist level. As seen in FIG. 34, a plurality of pneumatic rams 431 are disposed opposite the fixed loading shelf 430 within the open interior portion 432 of the consolidation queue between the shelves on an up travel reach and those on a down travel reach. The actual number of pneumatic rams will correspond to the number of tote pads carried by each shelf 411, with each ram being associated with a particular one of the tote pads 419. The pneumatic rams are positioned such that when one of the shelves 411 is positioned adjacent a fixed loading shelf 430 and a particular ram is actuated, the actuated ram will push its associated tote drawer 19 onto the fixed loading shelf 430.

Since the totes must be pushed fully onto the fixed loading shelf to allow the operator to close their lids when an order is complete, and since the width of open interior area 432 is relatively small, pneumatic rams 431 are multistage ram arrangements as can be understood by reference to FIG. 34. The pneumatic rams have a first stage 443 having a fixed stroke and a second stage 445 having a variable stroke. The first stage is fixably mounted to the carrier of second stage 445 such that the entire first stage moves with any movements of the second stage. A plunger having a large surface area strike plate is positioned such that when it is actuated, the strike plate will engage the tote positioned on the adjacent tote pad and push it onto the fixed loading ramp 430. Suitable rams for both the first and the second stages are produced by Bimba Manufacturing Co. of Monet, Ill.

In operation, it may be desirable to vary the amount that a tote is pushed out based upon the status of the order it is receiving. Thus, for example, it may be desirable to push the totes three fourths of the way out for normal loading operations, but all of the way out when the last item is being placed into the tote in order to facilitate closing the totes lid. In such a system, pushing the tote all of the way out onto the fixed loading shelf may be used as a signal that informs the operator to close the tote's lid.

A front panel 433 is attached to the front exterior side of frame 412 to cover the front portion of the consolidation queue. (FIG. 6). The panel 433 includes an opening 434 that receives the fixed loading shelf 430 and is sized suitably to allow tote drawers 19 to open onto the fixed loading shelf. The panel 433 serves to protect the operator by preventing loose goods from falling off of the consolidation queue. A track 437 is disposed on the front surface of panel 433 somewhat above the opening 434. A carriage 436 that carries a printer 435 and a bar code scanner 439 is mounted on the track for movement back and forth thereon. The printer carriage and track arrangement may be conventional components. As will be described below, the control system is devised such that it is capable of moving the carriage 436 back and forth along the track 437 so that the printer 435 and bar code scanner 439 may be positioned over any one of the opened tote drawers 19. After all of the goods destined for a particular tote have been loaded therein, the printer 935 is positioned over the loaded tote and prints the required shipping invoices. The bar coded scanner 439 may be used to identify inventoried goods placed into or taken out of the consolidation queue. This is particularly useful when the consolidation queue is being used in the context of a receiving station or when unidentified or misplaced goods are found in the containers.

To fill a particular tote drawer 19, the shelf on which the tote drawer is located is rotated until it is positioned adjacent to the fixed loading shelf 430. The pneumatic ram 431 disposed adjacent to the chosen tote is then actuated, thereby pushing the tote onto fixed loading shelf 430. A plurality of video displays 52 may be positioned on the front panel 433 above the opening 434 but below the printer track 437, with a single video display being associated with each tote drawer position. The video displays would generally be directed by the control system to display instructions to the operator as to the identity and quantity of goods to be placed in the open drawer. The video displays may take the form of conventional LED or LCD displays or the like. The printer 435 is automatically positioned above the open tote drawer simultaneously with its opening and when appropriate prints a shipping invoice voucher. After the operator places the desired goods in the open drawer, the invoice is taken from the printer and placed in the drawer. The drawer is then manually closed. It will be appreciated that a separate invoice may be printed for each transaction as individual items are placed into the tote, or a single invoice may be printed after all of the ordered items have been placed in the tote.

The consolidation queue 18 may be loaded with empty totes via a wide variety of mechanisms which may be either manual or automatic. In the embodiment shown in FIG. 36, a tote supply conveyor stub 450 is disposed adjacent to the front surface of consolidation queue 18 above the printer 435 at a height that is within the operator's reach. Empty totes are provided to the conveyor stub 450 in a conventional manner. With such an arrangement, a plurality of totes will typically be available on the conveyor stub within the operator's reach. The operator is responsible for grabbing empty totes off the conveyor stub 450 and inserting them onto empty tote pads 419 adjacent the fixed loading shelf 430. As will be described below, the totes 19 may be loaded onto the shelves of the consolidation queue either as a batch or in a prompted manner as needed, depending upon requirements of the system. As each tote is placed on its shelf, its discrete identification indicia (not shown) (which takes the form of a bar coded label) is read by the bar code scanner 439 and recorded by the work center controller 500 in a tote inventory file 526. Drawers 451 are provided below fixed loading shelf 430 to temporarily store particular goods as needed.

In an alternative arrangement, the conveyor stub may be replaced with a continuous conveyor (not shown), that remains in continuous motion carrying totes past the front of the consolidation queue. The passing totes are then selectively picked for insertion onto the consolidation queue as needed.

Figure 37:
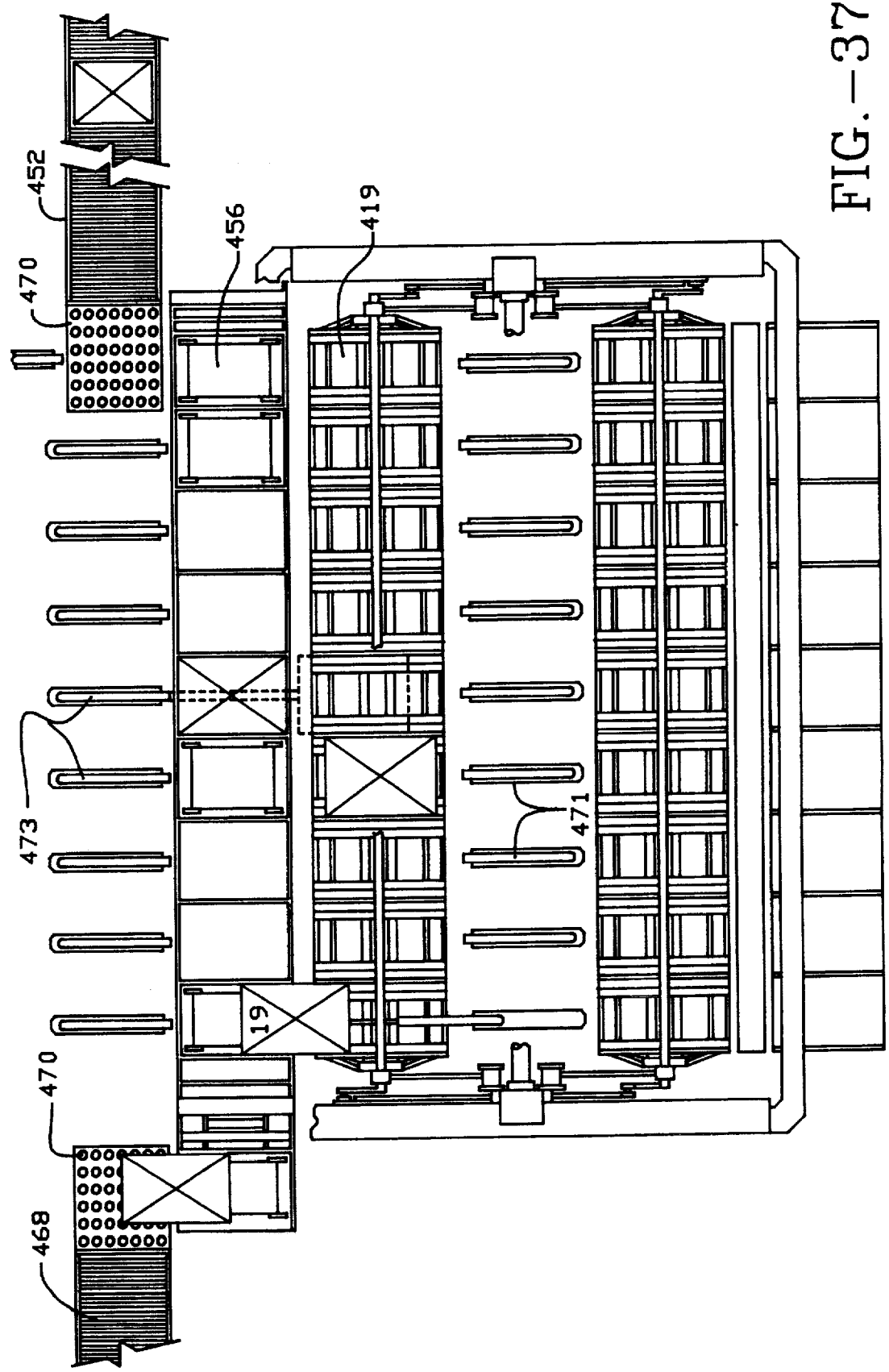
FIG. 37 is a plan view of an automatic tote loading mechanism.

Alternatively an insertion structure may be provided along the back side of the consolidation queue for mechanically loading the totes. Referring next to FIG. 37, a suitable automatic tote loading arrangement will be described. A conveyor stub 452 delivers empty totes 19 to the consolidation queue. A loading track 456 is provided for transferring totes 19 from conveyor stub 452 to the shelves of the consolidation queue. The loading track travels in an endless loop disposed adjacent the back side of the consolidation queue, preferably at a level different from the level of the fixed loading shelf 430 and its associated rams 431. The loading track has a plurality of tote carrying locations and is adapted to accurately position any one of the tote carrying locations in front of any particular shelf tote pad 419 on the shelf 411 disposed adjacent the track.

A plurality of loading rams 473 are disposed behind the loading track to transfer totes from the loading track to the consolidation queue 418.

Alternatively, the loading track may be replaced by a carriage (not shown) that transfers totes 19 from the conveyor stub 452 to the shelves of the consolidation queue. The carriage is mounted on a track disposed in place of the loading track. The carriage is adapted to move back and forth along the track so that it may be positioned adjacent any one of the various tote pads 419 on the active shelf.

The carriage includes a pair of transfer pads, each of which receives a single tote 19. Each transfer pad includes a power driven endless belt, a pair of gates located on opposite sides of the endless belt, and an actuator arm. A presence sensor detects when a tote is properly positioned on the transfer pad. A reversible motor (not shown), is provided to drive the endless belt in either direction.

To load containers onto the consolidation queue, they are first delivered to conveyor stub 452 in a conventional manner. A conventional alignment device (not shown), ensures that the containers are delivered to the conveyor stub substantially perpendicularly to the loading track or carriage. The end of the conveyor stub includes a transfer stop 470 for loading totes onto the loading track or carriage. The transfer stop 470 may take a form similar to the transfer stops 90 described above, although they are sized appropriately for the totes.

In the carriage arrangement, the two transfer pads may be loaded simultaneously. Once the carriage is loaded with empty totes, it travels along the track until one of the transfer pads is located adjacent a tote pad 419 onto which an empty tote is to be loaded. At that point, the opposite gate is dropped and both the power driven endless belt and the actuator arm are activated to transfer the tote 19 onto the adjacent tote pad 419. The carriage is then moved (if necessary), to position the second transfer pad adjacent the tote pad onto which the tote it carries is to be loaded. The second tote would then be loaded in the same manner as the first.

A wide variety of mechanisms may be provided to unload the consolidation queue as well. In an embodiment chosen for the purpose of illustration, a tote disposer conveyor stub 468 is provided along the back side of the consolidation queue behind loading track 456 at the same level as the loading conveyor stub 452. A plurality of multistage unloading rams 471 are disposed opposite the track 456 within the interior portion of the consolidation queue between the shelves on the up travel reach and those on the down travel reach. The actual number of unloading rams 471 will correspond to the number of tote pads 419 carried by each shelf 411, with each ram 471 being associated with a particular one of the tote pads 419. The unloading rams 471 are positioned such that when activated, they will push their associated tote out onto the loading track 456. The loading track 456 then transfers the tote 19 to conveyor stub 468, which in turn carries the tote to its intended destination. The actual construction of unloading rams 470 may be identical to pneumatic rams 431 as previously described.

In an alternative embodiment, tote disposal conveyor stub 468 may be placed directly adjacent the back side of the consolidation queue at a level distinct from either the fixed loading shelf 430 or the loading conveyor stub 452. The unloading rams 470 would be disposed adjacent the disposal conveyor stub 468 for pushing totes directly thereon. The disposal conveyor stub 468 is disposed on a level separate from fixed loading shelf 430 only to provide more space for and better access to the rams 431 and 470 respectively. To increase the throughput of the consolidation queue multiple loading and unloading assemblies may be provided at separate levels.

In some applications it will be desirable to place the consolidated goods into containers suitable for placement back onto a storage rack. In such systems the consolidation queue 18 is adapted to carry containers 25 (or downsized containers) in place of totes 19. In such an arrangement, only one shelf would be carried by each bracket/suspension strut arrangement. It should be appreciated that in some applications it may be desirable to place full cases of material directly onto the shelves of the consolidation queue in place of the totes.

SHIPPING QUEUE

In many distribution applications such as the consumer products warehousing application described herein, the totes must be delivered by truck to retail establishments located outside the distribution facility. To maximize efficiency, it is important to load the truck in the reverse order of the delivery stops it will be making. Therefore, it is desirable to provide the totes to the shipping dock in an order suitable for loading directly onto the delivery trucks. It will be appreciated that the requisite ordering can be accomplished by selectively choosing the order in which totes are withdrawn from the consolidation queue 18. However, in high volume operations, the time delays involved in rotating the consolidation queue back and forth sufficiently to properly order the totes will become prohibitive if it is necessary to continue consolidation operations during unloading. Therefore, in high volume operations, there may be a need to provide a separate shipping station which automatically arranges the totes into an order suitable for loading directly onto delivery trucks.

Figure 38:
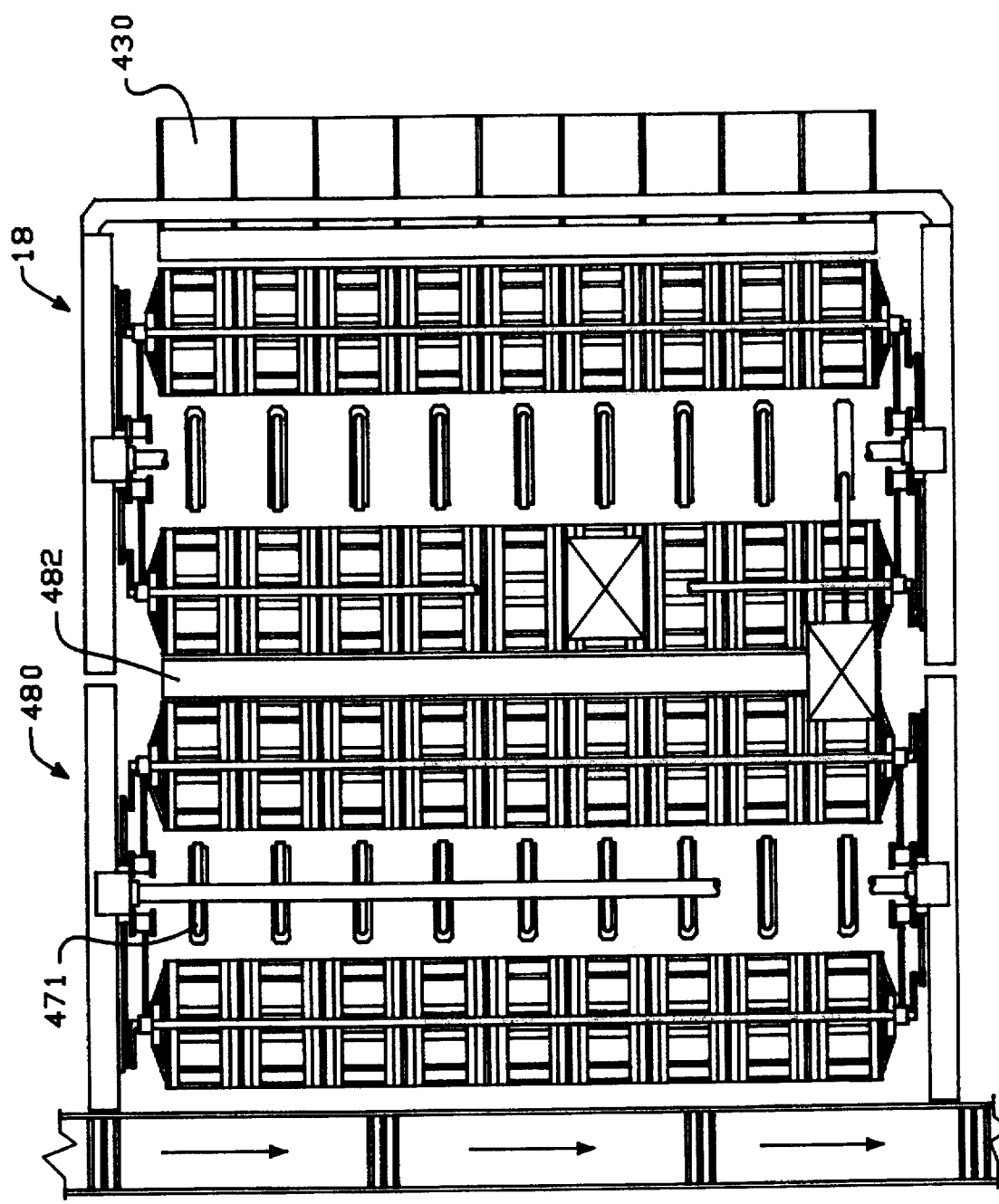
FIG. 38 is a top plan view of a shipping and consolidation queue arrangement.

It will be appreciated that the actual construction of the shipping station may be widely varied. However, in an embodiment of the invention chosen for the purpose of illustration, a shipping queue 480 is provided having a construction substantially identical to the consolidation queue 18 previously described, except that there is no need for the fixed loading shelf 430, printer 435 or bar code reader 439. The shipping queue 480 may be loaded directly from the consolidation queue 18 by positioning the shipping queue directly behind the consolidation queue as shown in FIG. 38. A fixed transfer shelf 482 is disposed between the two queues in place of the disposal conveyor stub 468 previously described. The unloading rams 471 in this embodiment take the form of multi-stage pneumatic rams having a total stroke long enough to push their associated totes over the transfer shelf 482 and onto a shelf on the shipping queue. Therefore, to transfer filled totes from the consolidation queue 18 to the shipping queue 480, the consolidation queue is rotated until a shelf 411 having filled totes is disposed adjacent the transfer shelf 482. The shipping queue is simultaneously rotated until an empty shelf is disposed adjacent the transfer shelf. The appropriate unloading rams 471 may then be actuated to transfer selected totes between the two queues.

It will be appreciated that the actual insertion and extraction assemblies, as well as the method of loading and unloading the shipping and consolidation queues may be widely varied. For example, the shipping queue may be arranged to both load and unload the consolidation queue. To facilitate loading the consolidation queue, the shipping queue can be provided with a plurality of multi-stage rams that face the transfer shelf 482. When actuated, the rams would pass totes in the opposite direction across the transfer shelf from the shipping queue to the consolidation queue. The shipping queue itself may be loaded or unloaded using the same assemblies as previously described for loading and unloading the consolidation queue. To increase the throughput of the shipping queue, multiple loading, unloading and/or transfer assemblies may be provided at separate levels.

OPERATION OF THE SYSTEM

The work station components described may be used for a wide variety of purposes. For example, in warehousing applications, the work center may function as both a receiving station to receive inventory items into the system and as an issue station for consolidating customer orders. In production environments, the work center is used to receive inventory and to kit goods for production. By way of example, representative methods of operation will be described with respect to work centers adapted particularly for order consolidation and receiving functions in the consumer products environments previously described.

ISSUE WORK STATION

When an order is received, it is entered into a computer which searches an inventory record to determine whether the ordered goods are in inventory. In any given day several hundred customers place orders calling for any of 50,000 or more individual stock units, with the actual number of items requested for each stock unit varying widely. Therefore, in a large scale operation, a master computer would be used to organize the orders into related batches, with each batch corresponding to a family of related goods. By way of example, related families might include: hair care products; first aid products; RX; sporting goods, etc. The orders can be filled in batches to optimize efficiency. If more than one work center is provided that may function as an issue station 60, then the batches of orders are distributed between the various operating work centers as necessary to keep each operator busy.

The issue stations are arranged for efficiently consolidating orders. When an operator is ready to begin filling orders, a container that carries ordered items is delivered to the work center. Each of the tote drawers 19 on consolidation queue 18 is designated to receive a specific customer order. It will be appreciated that in actuality a particular customer may have ordered enough goods to fill several hundred totes. However, as indicated above, rather than sending each customer a truck load randomly containing the ordered goods, it is desirable to package the ordered goods for each customer in smaller lots of related goods. Consolidating the orders in groups of related goods facilitates rapid restocking at the retail stores when the goods are delivered. Therefore, the master controller organizes the ordered products into lots suitable for loading into the described totes.

By way of example, the first product to be distributed may be aspirin. A specific container (which may be container #123) that carries aspirin is delivered to the vertical queue 16 within the work center. The container may also carry shampoo, toothpaste and other products within its various compartments. When an operator is prepared to begin consolidating orders, container #123 is delivered to one of the work tables 7. When the container arrives the signal light 375 over the selected work table lights up to indicate the active container to the operator and one of the tote drawers associated with an order that requires aspirin will be automatically opened. An instructional video terminal 50 (FIG. 2) is positioned adjacent the work tables in full view of the operator. The video terminal instructs the operator which items are to be distributed next and the quantity of units to be distributed in any given step. Similar information is presented on the appropriate video display 52 positioned above the open tote drawer.

In the example given, aspirin is the first displayed item and the video terminal would inform the operator as to how many items of aspirin would be distributed. The operator may then pick the desired number of units of aspirin and step over to the consolidation queue. The operator notices the number of stock units to be placed in the open drawer as verified by the appropriate video display 52 positioned over the open drawer and then deposits the requested number of boxes of aspirin into the open tote drawer 19. After depositing the appropriate amount of aspirin in the first drawer, the operator shuts the first drawer and another automatically opens with both the video terminal and the appropriate video display showing the number of units to be placed in the next drawer. If the operator is carrying enough aspirin the second drawer will be filled as well. When the operator runs out of aspirin, he steps back over to the container and retrieves some more. This cycle may be continued until either all of the aspirin within the container has been distributed or all of the pending orders for aspirin have been filled. It should be appreciated that the consolidation queue will have to be periodically rotated to position its various shelves adjacent the fixed loading shelf 430 so that all of the orders that request aspirin can be filed in one pass.

Once the aspirin has been distributed, the operator hits pushbutton 370 which informs the controller that he is finished with the designated tasks. The platform would then be rotated to present the next stock unit which would be distributed in the same manner. After all of the orders that are to be filled with items contained within container No. 123 have been distributed, it would be discharged from the work table and returned by the takeaway system 16 and an external conveyor network to the storage structure or other appropriate station.

While the contents of the first container are being distributed, additional containers are delivered to the remaining work tables. The contents of a second container located on a table adjacent the first are then distributed in the same manner. This cycle is continued using all of the work tables, with new containers being delivered to each table after the container located thereon has been discharged. When the last item to be placed in each of the totes is delivered, the printer 435 is activated to print a shipping invoice or receipt when the tote drawer is first opened. As previously indicated, the printer is mounted on a carriage that travels back and forth across the front face of the consolidation queue. Therefore, the operator may readily grab the shipping invoice and place it in the open tote along with the final goods. It will be appreciated that with such a system a very large number of orders can be filled with a minimum number of operator man-hours. Most importantly, a single operator working at a single work station can consolidate entire orders and entire batches of orders.

It should be appreciated that the controller may be designed to provide inventory control as well. Specifically, when goods are received into the system, the controller is informed of the number of goods placed into the container. As distribution occurs, the controller instructs the operators to issue specific quantities of goods. Therefore, the controller can subtract the number of goods distributed from the number of goods originally stored in the container. When a particular container compartment is supposed to be empty, the controller would so inform the operator on the video terminal 50. Since the video terminal would typically be a monitor for the computer that functions as the work center controller, a keyboard would generally be provided in the work area 5 so that the operator can manually inform the controller of inventory shortages and excesses.

It has been determined that for most high volume operations, approximately four work tables are desirable to ensure that the operator will virtually always have something to distribute. However, the actual number may vary dependant upon the requirements of a particular system. It should be appreciated that on any given day, the actual number of orders that request a particular stock unit will vary greatly. To ensure a smooth operation, it is desirable to regulate the delivery of the containers to the work tables to provide balance. Thus, rather than filling all of the work tables with containers carrying stock units that are only requested in one or two orders each, the control system is preferably designed to deliver some containers that carry goods that are requested by a relatively large number of orders simultaneously with those carrying items requested in only a few orders. Such balance reduces the likelihood that the operator will fill the orders faster than the system can provide new containers.

It should also be appreciated that the actual sequence in which the various products are distributed may be widely varied within the scope of the present invention. The actual distribution sequence will most likely be the product of an optimization routine tailored to a specific application. Thus, in our example, suppose that one and only one of the orders calls for a toothbrush. When the shelf carrying the tote associated with the order for a toothbrush is positioned adjacent the fixed loading shelf 430 of consolidation queue 18, it may be desirable to distribute the toothbrush at that time, rather than waiting for all of the aspirin orders to be filled and having to rotate the consolidation queue back to the proper shelf. The video terminal 50 and the appropriate video display 52 would display suitable instructions to the operator. It should be apparent that the instructions of video terminal 50 and display 52 may be presented in a wide variety of ways and that they can readily be integrated into a single display unit.

The temporary storage queue 9 (preferably in the form of vertical queue 11) is provided to ensure that working containers will always be available to the work tables. Thus, the system is able to request containers from the storage structure well in advance of the time they are actually required to eliminate delays while the containers are being retrieved from storage. Similarly, each work table 7 is provided with a loading ramp 20 that is capable of holding a container in a position free of interference with the delivery of containers to the other work tables. Thus, the system controller is preferably designed to request the delivery of a container to the loading ramp associated with a particular work table before the container held thereon is discharged, thereby further reducing the down time between discharging a depleted container from the work table until the delivery of a new one. Any time a container is discharged from the work center, the controller orders a new container to replace it. When the new container arrives at the work center, an identification scanner reads the identifying indicia thereon and reports the containers identity to the system controller which is then free to select delivery of that particular container to one of the work tables at any time depending upon the needs of the system. The aforementioned process is repeated until all of the orders in the batch are filled.

It will be appreciated that there is no need for the operator to know in advance the expected contents of each of the tote drawers. Rather, the controller may be designed to merely provide instruction as to how many of which items carried by a container on one of the work tables are to be placed in the open tote drawer. When the final items have been placed in the tote, the consolidated orders disposed in the tote drawers 19 are then ready for delivery to the customers, The tote drawers may be readily removed from the consolidation queue for delivery to the final destination. If the customer is an internal production facility, the totes may be delivered to the production work stations. If the orders are to be delivered by mail or parcel post, the totes would be delivered to a packing or wrapping station. If the goods are to be delivered to the customers by truck in the totes, the totes may be delivered to a shipping queue as previously discussed that arranges the totes in reverse delivery order to facilitate loading onto a delivery truck. Although the totes could be readily arranged for shipping by selecting the order of the removal from the consolidation queue, in high volume operations, such a procedure would take too much time and therefore a separate shipping queue may be provided to coordinate the outgoing freight shipments.

RECEIVING WORK STATION

Figure 40:
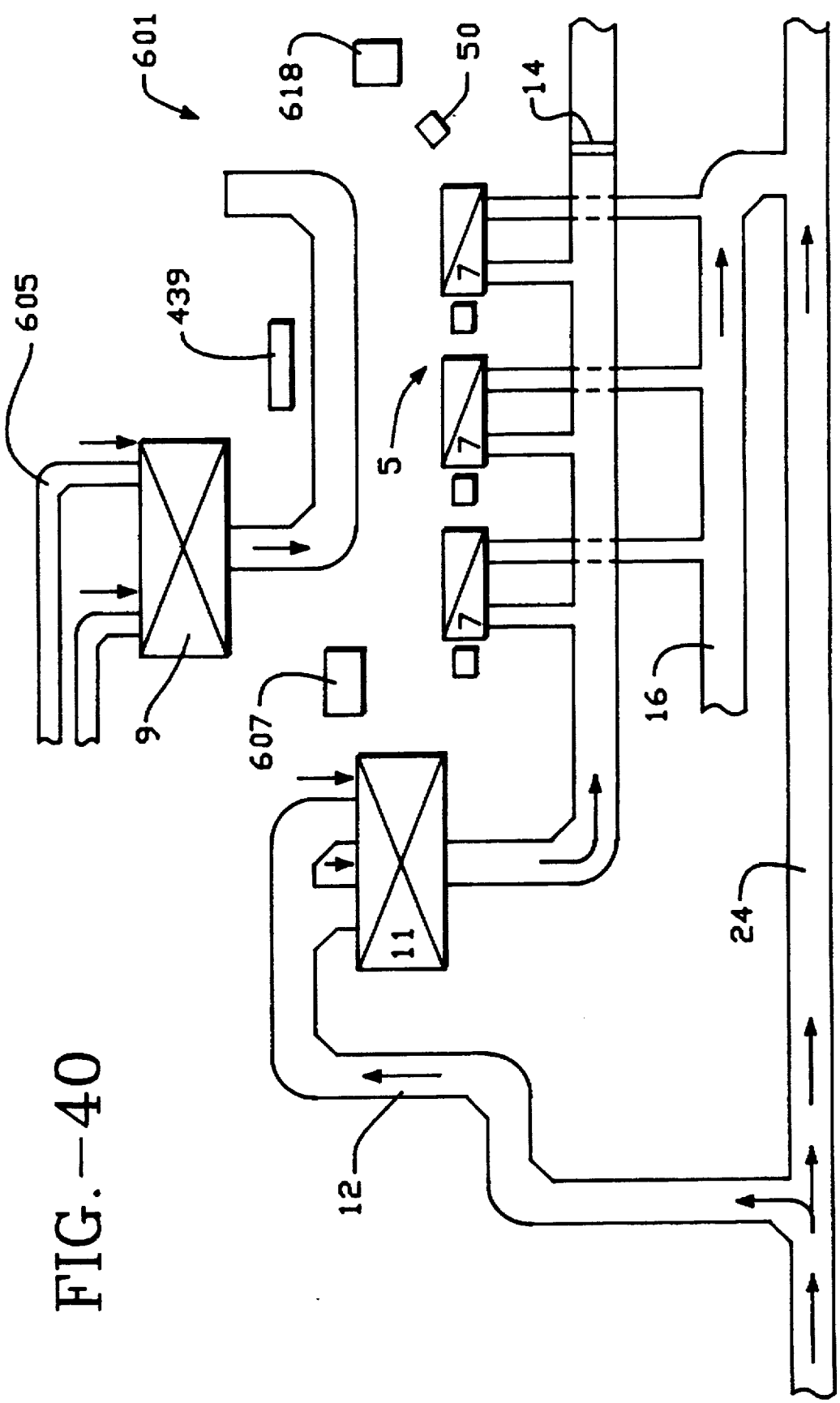
FIG. 40 is a plan view of a receiving work station.

The work center may also be configured specifically to receive inventory into the system. Referring next to FIG. 40, an embodiment of the receiving work station 601 chosen for the purpose of illustration includes a work area 5 having a plurality of rotating work tables 7, a temporary storage queue 11, a supply conveyor 12, delivery system 14, takeaway system 16, a receiving transport conveyor 605, a cubing table 607 and storage shelves 618. In an alternative embodiment storage shelves 618 may be replaced by a consolidation queue 18. Additionally, it may be desirable to provide the receiving transport conveyor 605 with a temporary storage queue for holding received packages until an operator is ready to work with them.

The receiving station functions quite simply. Specifically, goods brought into the distribution facility or warehouse are placed onto receiving transport conveyor 605. The receiving transport conveyor carries the received goods to the receiving work station 601. The receiving transport conveyor 605 is adapted to carry a typical assortment of packages of material of the type to be stored within the storage facility in containers 13. Of course, the actual shape and sizes of the received packages can take on a wide variety of forms. In a fully automated system, many, if not most, of the received goods will have appropriate bar coded labels when they are received into the facility. In such systems, when an operator receives a package, a hand held bar code scanner 439 located adjacent the receiving transport conveyor 605 may be used to automatically identify the received goods. The operator would then only need to verify that the scanner recorded both the proper identity and quantity of the received goods. The receiving station also includes a video terminal 50 which displays the read information. The terminal may be the monitor for the work center controller 500 (FIG. 41) which may take the form of a personal computer or any other suitable computer terminal. Thus, if the scanner is unable to identify the received goods, or if the goods are damaged or otherwise nonconforming, then the operator may manually input the correct information.

Once the work center controller is informed about the nature of the goods received, it determines the container compartment size appropriate for holding the received goods. As described above, it is contemplated that many of the containers 25 will have multiple compartments 27 and that any particular container having multiple compartments would have a variety of different goods stored within its various compartments. To optimize space utilization within a warehousing system, it is desirable to have each of the containers as full as possible. Thus, the controller must calculate the expected volume of the received goods and coordinate the delivery of a container having an empty compartment large enough to hold those goods. It should be appreciated that to optimize space utilization it is desirable to place the received goods in the smallest practical compartment.

A cubing table 607 is provided to calculate the size and weight of goods inputted into the system. Once the size and weight of a particular item has been determined, the system controller records the measured physical characteristics of the item. Therefore, any time similar goods are received in the future, the controller can calculate the appropriate compartment size for any given quantity received.

The cubing table 607 may take the form of a flat table that rests upon a scale and has sensors to measure the maximum length, width and height of the received goods. When an entirely new item is received, the item is placed on the cubing table and its measurements are taken. The operator then informs the controller of its measurements and the controller calculates the volume required for each item and multiplies the calculated volume by a fudge factor which ensures that the operator will not have to spend an inordinate amount of time stacking the item into a compartment. The controller then records the adjusted volume per unit in a weights and measurements file for future reference.

After the proper container size has been determined, a container is ordered that has a suitably sized empty compartment. It should be appreciated that the master controller 501 would generally maintain an inventory record that records the identity and quantity of items stored in each container. The master controller 501 also maintains a listing of which compartments are empty and their designated size. Therefore, when a request is made for a container having a particular sized compartment, the master controller can provide an extended list of available containers that have an appropriately sized empty compartment. Contrary to what might be the intuitive approach, it is desirable to refill a container well before it is completely emptied in order to maximize space utilization. Therefore, containers are generally brought into the receiving station partially full, with some of their compartments empty.

After the goods have been received and the appropriate compartment size calculated, a container having a suitably sized empty compartment is delivered from the vertical queue 11 to one of the work tables 7 in the receiving work station 1. When an appropriate container is delivered to a work table, the signal light 375 associated with that container is lit to inform the operator which table is active and the video terminal 50 would inform the operator of the appropriate compartment into which the received goods should be placed. The operator then places the received goods into the selected container compartment. Once the operator is finished loading the received goods into their designated container, he hits a pushbutton 370 which informs the controller that loading is complete. If the particular container used is completely filled, then it will automatically be discharged from the work table and delivered via takeaway system 14 and conveyor network 24 to storage 2 or another appropriate work station. If the container has additional empty compartments, it may be retained on the work table to receive the next items that require that particular compartment size.

The controller is designed to request the delivery of containers having appropriate empty compartments before they are needed. The containers delivered are stored in the vertical queue 11 until they are needed on one of the work tables. Since different containers will have different compartment sizes, the controller will attempt to stock the vertical queue with a variety of containers which have different compartment sizes. Generally, the number of containers in the queue having a particular empty compartment size will depend on the anticipated demand for that particular container size.

Storage shelves 618 are provided in the vicinity of the work area to hold items that cannot immediately be placed into containers. It will be appreciated that occasionally, there may be time delays in delivering appropriately sized containers to one of the work tables. In such cases, the controller realizes that it does not presently have a suitably sized container on one of the work table and it instructs the operator to place the received goods on a particular one of the storage shelves 618. At a later time, when an appropriately sized container is delivered to the work station, the controller instructs the operator to retrieve the stored item from shelves 618 and place the items in the appropriate container.

In some high volume operations, in order to maximize efficiency, it may be desirable to provide temporary storage for substantially all of the received goods before they are loaded into containers in order to separate the receiving and replenishment functions. To accommodate this, a consolidation queue 18 would be provided in place of storage shelves 618. In such a system, the operator would scan or otherwise inform the controller of the identity of the received goods as previously described. The controller would then cause the consolidation queue to open one of the tote drawers 19 (or more if necessary). The operator would then place the received goods in the open tote drawer 19 and the controller would remember where the particular goods are stored. After all of the goods have been received, the controller would then coordinate the delivery of containers to the work table and the opening of the tote drawers to facilitate replenishing the inventory. Specifically, the controller coordinates the delivery of containers having empty compartments to the work area. Once an appropriate container is delivered to a work table, the signal light 375 disposed over the active work table 7 is lit to inform the operator of the active table. The controller opens a tote drawer holding items that require the designated compartment size and the operator transfers the goods between the open tote and the selected container. When the transfer is complete the operator pushes pushbutton 370 to inform the controller that the task is complete. This process is repeated until all of the received items have been entered into inventory. It will be appreciated that such an operation can allow a single operator to efficiently carry out the receiving function for a relatively large operation. When demand becomes too much for a single operator, additional receiving work stations can be provided.

CONTROL SYSTEM

It will be appreciated that a wide variety of automated controllers could be developed to drive the work center heretofore described. A good controller system must lend itself to a modular construction so that if and when the needs of the work center change, additional components may be added or subtracted with little or no change in the system software. To maximize efficiency, the system controllers should be arranged to ensure that an operator working at one of the work centers will always have work on hand as opposed to having to wait for a working container to arrive. Efficient integration of the system requires a tremendous amount of computing power capable of handling tens of thousands of requests per hour.

By way of example, a control system suitable for substantially automatically directing a representative work station that includes a single work area 5 having four rotatable work tables, a vertical queue 11, and a consolidation queue 18, as well as the conveyor segments necessary to connect the various components as discussed above will be described. Referring initially to FIGS. 41 and 42, the control architecture includes a plurality of pyramided local area networks (LANs) intended to distribute responsibility towards the lowest level. The control system includes a master controller 501 that communicates with one or more work center controllers 500 over a primary local area network 509. Each work center 1 has an associated work center controller 500 that monitors its activities. Each work center controller coordinates the activities of a plurality of component controllers that each control the activities of one or more specific components. In the described embodiment, the component controllers include a queue controller 502, a consolidation controller 504, a table controller 506 and a local conveyor controller 508. As best seen in FIG. 42, each work center controller 500 communicates with its associated component controllers over a dedicated second tier local area network 510. Each of the various component controllers communicates with a plurality of programmable array logic boards 550 over a third tiered local area network 511. The logic (PAL) boards 550 in turn directly control the motors, rams and other mechanisms that drive the described components of the storage system. Additionally, the logic boards 550 receive information provided by presence scanners 23 and other components to determine whether a particular request made by the carousel controller can be safely carried out.

The master controller 501 is responsible for knowing the contents within each container, receiving orders, and coordinating the activities of the various work center controllers as well as any external controllers. By way of example, an external computer can control the delivery of containers to the work center and/or the distribution of customer orders as described in U.S. Pat. No. 5,171,120 Alternatively, the master controller may itself be responsible for such tasks.

To keep track of the inventory within the system, the master controller 501 maintains an inventory file that keeps track of all of the goods in inventory, together with an indication of the container(s) and compartments within the containers in which specific goods are stored. In one of the preferred embodiments, the inventory record includes a listing of the contents in each compartment of each container. Thus, when it is necessary to locate empty containers or those having empty compartments of a particular desired size, a listing of such containers can be readily ascertained by searching through the inventory record. The inventory record includes an indication of the container number and compartment in which particular goods are stored, the identity of the goods, the quantity of the goods, and the date the goods were received into inventory (to facilitate FIFO inventory procedures).

The master controller also maintains a weights and measures file which remembers the weight and dimensions of all of the items expected to be in inventory. Thus when an item is received, the control system can look up its anticipated size and calculate the compartment size that is appropriate to hold the received goods. Anytime a new item is received by the system, its weight and dimensions are checked and this new information is provided to the weights and measures file.

When an order is received, it is entered into a customer order file in the master controller 501. The master controller then searches the inventory record to determine whether the ordered goods are in inventory and designates the particular container(s) that hold the desired goods. The orders are then divided into related batches as previously described and each of the work center controllers would be provided with a batch of orders which its associated work center is expected to fill. By way of example, a batch of orders may include all of the orders for a particular family of good. After a particular batch has been filled, a new batch of orders may be provided. This cycle would be continued until all of the orders have been filled. Alternatively, the batch of orders may include all orders expected for a particular day or work shift. It should be appreciated that the system can readily be modified to facilitate updating the batch of orders as new orders are received.

Each batch of orders is arranged in the form of an issuing in process file. The issuing in process file contains all of the information that the work center will require in order to independently process the orders in its batch. Specifically, this includes identifying the specific orders to be processed, including the particular items and quantities that are requested in each order, billing information so that the shipping invoices may be printed, and an indication of specific containers (including compartment designations) which carry each of the ordered goods. At the beginning of any issuing procedure, the master controller 501 would transmit an issuing in process file to the work center controller 500 responsible for the particular batch of orders. At the end of the issuing process, the work center controller would inform the master controller of the particular orders it was able to fill. Additionally information about inventory discrepancies in the containers may be provided as well.

When a work center is being used as a receiving station, the master controller would initially provide the work center controller 500 with an extended list of containers having empty compartments along with an indication of the size and location of the empty compartments within the listed containers.

The work center controllers 500 are responsible for integrating and directing the activities of the component controllers within their designated work station and communicating with the master controller 501 and any other external controllers. The specific component controllers include queue controller 502, a table controller 506, local conveyor controller 508 and when appropriate, consolidation controller 504. The work center controller also directly controls communications with the operator via video terminal 50 and video displays 52. The queue controller 502 manages vertical queue 11. The consolidation controller 504 manages the consolidation queue 18 and its respective tote drawers 19. Specifically it organizes the rotation of the shelves, the insertion and removal of tote drawer 19 from the consolidation queue, and the opening of tote drawer 19 onto the fixed loading shelf 430. The consolidation controller also communicates with a plurality of sensors that are adapted to detect the closing of a particular drawer. The work table controller 506 manages the activities of the rotatable work tables 7 and the local conveyor controller 508 manages the activities of supply conveyor 12, delivery system 14 and takeaway system 16.

The queue controller directs two logic boards 550 that take the form of queue PAL board 552 and queue safety PAL board 554. Queue PAL board 552 directs the operations and movements of loading ramp 20, motor 117, pneumatic shock absorbers 140,141 on the soft stop mechanisms 136, the strike rod that drops the shelf blockers 119, and power operated stopper 164. The queue safety PAL board monitors a plurality of sensors that ensure that everything is clear for the queue to rotate or otherwise perform a requested function. In particular, sensors verify that the soft stop mechanisms 136 are fully retracted, that nothing is obstructing the junction between loading ramp 20 and the vertical queue and that power operated stopper 164 has been returned to its blocking position. The queue PAL board 552 will not perform a requested function until it receives an enable signal from the safety PAL board 554.

The table controller 506 directs four logic boards each of which controls the activities of a single work table. Specifically, each table PAL board 556 runs the reversible motors 336 that lift and lower the front and back sides of the work table base 310, as well as drive motor 312 which rotates the platform 309. In addition, the table PAL boards monitor the safety sensors and conveyor conditions to ensure that the table is free to perform its requested functions.

The conveyor controller 508 watches over three logic boards including supply PAL board 558, delivery PAL board 560 and takeaway PAL board 562. Supply board 558 controls the activities of supply conveyor 12 and transfer stop 90. Delivery board 560 controls delivery system 560 and transfer stops 190, while takeaway PAL board 562 controls the takeaway conveyor system.

The consolidation controller 508 directs several logic boards including a consolidation PAL board 564 and safety PAL board 566 which control the rotation of the consolidation queue and monitor that it is clear to rotate in a manner similar to the way queue PAL board 552 and queue safety PAL board 554 operate. A printer PAL board 568 orchestrates the movements of the printer and separate ram PAL boards are provided to direct the operation of each set of pneumatic rams 431, etc.

Communications between the various component controllers and their respective logic boards 550, may be accomplished through the use of a wide variety of conventional communication networks. However, in order to reduce the total computing power required, as well as to reduce costs and maximize efficiency, a novel LAN architecture has been developed to facilitate such communications.

One of the overriding goals of the described architecture is to minimize or even eliminate the need for priority interrupts. It has been our experience that with the volume of data that must be transferred between the logic boards and the component controllers, an architecture based upon priority interrupts is needlessly complicated and inefficient. Therefore, referring specifically to FIG. 42, a plurality of interface boards 570 are provided to act as buffers for communications between the logic boards and the component controllers. The interface boards are formed of 8-bit I/O registers, that temporarily store received data. In effect each of the logic boards may send messages to the appropriate component controller over its associated third tier LAN 511 at any time. The messages are received by an interface board associated with the particular logic board and saved in a temporary buffer. Therefore, the component controllers can go about their business in an orderly fashion without having to deal with interrupts from the logic boards. As the component controllers perform their designated tasks, they periodically check their associated interface boards to determine whether the logic boards have sent any messages since the last inquiry.

By way of example, the master controller 501 and work center controller may take the form of conventional personal computers such as the IBM AT. The component controllers may take the form of compatible microprocessors having internal memory such as INTEL 8032's or 8052's. The interface boards may take the form of 8-bit I/O registers and the logic boards may be formed of programmable array logic chips such as the 20L8.

When a container is received by the work center it approaches on supply conveyor array 12. An identification scanner 22 (FIG. 1) disposed adjacent the supply conveyor acknowledges the reception of a particular container (i.e., #123) and informs the conveyor controller 508 of its arrival. The conveyor controller then informs both the queue controller 502 and the work center controller 500 of the arrival of container #123. The work center controller 500 responds by instructing the conveyor controller to deliver the container to a particular loading ramp 20 (FIG. 1). The conveyor controller then instructs the supply PAL board 558 to actuate the appropriate motors and alignment stops to deliver container #123 through the appropriate transfer stop 90 to the selected loading ramp 20. Presence sensors S1 disposed adjacent the loading ramps 20 detects the presence of a container on the loading ramp and presence sensors S2 disposed adjacent the transfer stops 90 detect the presence of containers on the transfer stops. Both of these presence sensors are monitored by the supply PAL board. If a container is located in a transfer stop or on a loading ramp through which container #123 is supposed to pass, the supply board will not carry out the requested transfer and will inform the conveyor controller of the blockage. When the blocking container is removed (as detected by sensors S1,S2) the supply PAL so informs the conveyor controller which then issues another command to advance the container towards its loading ramp 20. Presence sensor S1 is monitored by both queue PAL board 552 and supply PAL board 558. Therefore, when the container is positioned on the loading ramp 20 both the queue controller and the conveyor controller are so informed. The conveyor controller informs both the work center controller and the queue controller that container #123 is now resting in loading ramp 20. The queue controller then proceeds to insert the container onto an empty shelf when it gets a chance.

When the queue controller is ready to insert container #123 onto the vertical queue, it instructs the queue PAL board 552 to activate drive motor 117 (FIG. 5) to rotate the compression chain until an empty shelf is disposed adjacent the loading ramp 20 holding container #123. The queue controller 502 remembers which shelves carry containers, as well as the identity of the particular containers stored on each. In the gravity motivated loading ramp previously described, the transfer between the loading ramp 20 and the vertical queue 11 is accomplished by releasing power stopper 164 (FIG. 6). When an empty shelf 111 (FIG. 6) is positioned adjacent the loading ramp, queue controller 502 instructs queue PAL board 552 to extend soft stop mechanism 136 and release the power stopper 164. A presence sensor S3 (FIG. 7) that is monitored by safety PAL board 554 verifies that the shelf is indeed empty. Assuming that all other safety checks are clear, the safety PAL board issues an enable signal to the queue board and loading is carried out as previously described. Once container #123 is properly positioned on the shelf, the queue controller waits for further requests from the work center controller or the delivery of other containers to the loading ramps. Before the queue can be rotated again, the queue safety PAL board 554 must verify that everything is clear.

When an operator is ready to begin filling orders, the work center controller 500 provides the queue controller 502 with a list of desired containers known to be in the vertical queue. The queue controller then chooses the listed container that is easiest to provide (typically the container closest to the delivery system 14) and causes the vertical queue to rotate until the selected container is adjacent the delivery system, wherein the queue is momentarily stopped and the appropriate shelf blocker 119 (FIGS. 8 and 22) is released allowing the selected container to roll on the delivery system 14. Once the queue controller chooses the container(s) to be delivered, it informs the work center controller 500 of its choice (container #123 in the example). The work center controller then instructs the local conveyor controller 508 to deliver the container to a particular work table 7. The local conveyor controller 508 then manages delivery of the container to the loading ramp 20 associated with the chosen work table. The actual mechanics of movements along the delivery system are similar to those described for the supply conveyor and are directed by delivery PAL 560. An identification scanner 22 disposed adjacent the delivery conveyor verifies the identity of the container being delivered to the work tables and observes its orientation. The work center controller and the table controller are both informed when container #123 is actually delivered to the work table loading ramp by a presence sensor S4 (FIG. 1) positioned to monitor the loading ramp.

At this point, the table controller takes responsibility for the container. As soon as the work table itself is emptied, the platform is raised and tilted into a position for receiving the container. The individual table PAL boards monitor presence sensor S4 and presence sensors S5 which detect the presence of a container on the platform 309 (FIG. 3). Any time the table PAL notices a container on the loading ramp and the absence of a container on platform 309, it directs reversible motors 336 (FIGS. 23–24) to lift the platform to the level of the loading ramp and put in the appropriate tilt. Other presence sensors (not shown) are used to monitor the height of the platform. The table controller 506 then orchestrates the transfer of the container from loading ramp 20 (FIG. 3) to the rotating work table 7. This includes dropping power operated stopper 164 and gate 321 (FIG. 3). Once the gates have been dropped the container flows onto the work table. Sensor S5 indicates to the table PAL board when the container is properly positioned and gates 164 and 321 are raised to their default positions. Once the container is loaded, the table PAL informs the work table controller which then instructs the table PAL to lower the table to a particular position (associated with the operators height) and rotate the platform so that the appropriate compartment faces the operator. Once that movement is completed, the table PAL so informs the table controller which in turn informs the work center controller.

Once the container is disposed on the work table, the work center controller decides how the goods contained therein will be distributed. Using the aspirin example, the work center controller informs the consolidation controller 504 of specific shelves and tote drawers to be opened and the sequence in which they should be opened. Simultaneously, the signal light 375 associated with the work table that holds the selected container is lit and the video terminal 50 and the video displays 52 associated with the open tote drawer present instructions telling the operator the identity and quantity of the next items to be picked. By way of example, the video terminal may indicate the identity of the next few stock items to be distributed, the table on which the container holding the goods is located, the compartment within the container holding the goods and the total number of stock units to be distributed. Each of the video displays 52, which are disposed on the consolidation queue above the tote drawers may display the number of stock units to be placed in their associated tote drawers together with a short description of the stock unit (i.e., Bottles of Bayer aspirin—5 mg—100 tablets).

After receiving instructions from the work center controller, the consolidation controller 504 instructs consolidation PAL 564 to activate the drive motor to rotate the consolidation queue until the desired shelf is adjacent the fixed loading shelf 430 (FIG. 4). Of course, consolidation PAL 564 cannot rotate the queue unless it receives an enable signal from safety PAL board 566. Once the proper shelf is in position, the consolidation controller is informed of the successful rotation and instructs the ram PAL board to actuate the appropriate ram thereby causing the first selected tote drawer to open and the operator places the required number of units therein (as indicated by video display 52). When finished, the operator manually closes the tote drawer. The closing event is detected by a sensor (not shown) which informs the consolidation PAL board 564 which in turn informs controller 504 that a task has been completed. The consolidation controller then directs the ram PAL to open the next drawer and informs the work center controller of the closing event. The work center controller updates the video terminal and displays to eliminate the finished order. Preferably, the video terminal would always display the next several picks so that during a single trip to the work table, the operator can grab enough stock units to fill several orders when appropriate.

It will be appreciated that the work center controller 500 need only inform the consolidation controller of the identity and sequence of the drawers to be opened. Preferably only the next few drawers to be opened would be disclosed at any one time, with the list being periodically updated.

It should also be appreciated that the work center controller 500 knows how many more drawers are to be filled with aspirin, as well as how many units of aspirin are expected to be in the active container. Thus, if all of the active aspirin orders have been filled, or if the entire supply of aspirin is depleted, the work center controller would determine whether there are any other products to be distributed from the active container. If so, those products would be distributed in the described manner. If not, the table controller 506 would be directed to discharge the aspirin container #123 to the takeaway system 16 which returns the container to the conveyor network 24. If the container holds two material items that are to be distributed, it may be necessary to rotate the container after the first item has been picked. This is accomplished simply by having the work center controller direct the table controller to rotate the container the desired amount.

The described cycle is repeated until all of the orders have been filled. In some cases it may be desirable to have the operator interrupt distributing goods disposed in a container located on one work table to distribute goods from another container. This is particularly true if the second container has only a few goods to be distributed. Since several totes are arranged in parallel on a single shelf, when the consolidation queue is rotated such that the tote designated to receive items from a second or third container are positioned adjacent the fixed loading shelf 430, then the work center controller may be programmed to direct the consolidation controller to open the tote drawer associated with goods from the second container. The operator is then informed of the switch by video terminal 50. Since the consolidation controller is only instructed to open particular totes drawers, it does not need to be specifically informed of the switch.

When the final item is placed in a particular tote to fill a single order, the work center controller instructs the consolidation controller 504, which in turn directs the printer PAL 569 to position the printer 435 (FIG. 4) over the open tote. The printer PAL 569 remembers each printer position and needs only be instructed of the position to which it must travel. The work center controller may simultaneously activate the printer using standard printer interface routines.

The general control architecture for a receiving work station will be very similar to the controller described for the issue work station. Since the receiving station includes a vertical queue, a plurality of work tables and various conveyor arrays it would have the described table, queue and conveyor controllers. The receiving work center controller would also monitor bar code scanner 439 (FIG. 4) which is used to identify received goods. If the received goods have appropriate bar code labels indicating both the identity and quantity of the goods, the receiving work center controller calculates the container size necessary to hold the received goods and directs the queue controller to deliver an appropriate container to one of the work tables in the manner previously described. The operator then places the received goods into the container and strikes the pushbutton 370 which notifies the work center controller that the task is completed.

Although only a few embodiments of the present invention have been described in detail, it should be understood that the present invention may be embodied in many other specific forms without departing from the spirit or scope of the invention. It will be apparent that each of the described components could be varied to a large degree. Therefore, the present examples and embodiments are to be considered as illustrative and not restrictive, and the invention is not to be limited to the details given herein, but may be modified within the scope of the appended claims.

What is claimed:

1. A randomly accessible consolidation queue for presenting article containing means used in material handling operations to an operator, the consolidation queue comprising:

a frame;

queue track means carried by the frame and forming a vertically oriented endless loop having a first travel reach and a second travel reach;

a multiplicity of vertically spaced shelves carried by the queue track means for holding said article containing means, said shelves being pivotally coupled to said queue track means such that they remain substantially horizontal as they are carried between the first travel reach and the second travel reach;

drive means for rotating the shelves about the endless loop;

opening means for transferring said article containing means from a shelf on the first travel reach to a loading area to facilitate inserting articles into and removing articles from said article containing means;

means for unloading an article containing means from the consolidation queue on a back side thereof by extracting said article containing means from a shelf located on the second travel reach;

the opening means and the unloading means being arranged to allow simultaneous transfer of a container to said loading area from a shelf on the first travel reach and extraction of a container from a shelf on the second travel reach of the queue track means; and control means for directing the drive means to rotate the shelves and for actuating said opening and unloading means.

2. A consolidation queue as recited in claim 1 wherein said opening means includes a first set of selectively actuatable rams disposed interior of the consolidation queue between said first travel reach and said second travel reach for pushing selected article containing means from a shelf into said loading area.

3. A consolidation queue as recited in claim 2 wherein said rams are pneumatic.

4. A consolidation queue as recited in claim 3 wherein said rams are multi-stage.

5. A consolidation queue as recited in claim 1 further comprising display means for communicating with an operator, wherein the display means transmits instructions to the operator as to the identity and the quantity of the articles to be transferred between said article containing means disposed in the loading area and an external location.

6. A consolidation queue as recited in claim 5 wherein each shelf includes a multiplicity of article containing means pads adapted to hold one of said article containing means, the pads on adjacent shelves being vertically aligned and said loading area having a multiplicity of article containing means accommodating positions that have the same spacing as the vertically aligned pads.

7. A consolidation queue as recited in claim 6 further comprising a front panel mounted to the front said of the frame, the frame and front panel combining to form an opening suitable for passing article containing means between a shelf and said loading area.

8. A consolidation queue as recited in claim 7 wherein said display means includes a multiplicity of video displays, each said video display being associated with a particular article containing means accommodating position and disposed on said frame above said opening.

9. A consolidation queue as recited in claim 6 further comprising a printer for typing information about materials placed into or taken from said article containing means.

10. A consolidation queue as recited in claim 9 further comprising:

an elongated track mounted to the front side of the frame above said loading area; and a carriage for carrying said printer and coupled to said track for travel back and forth along the track to facilitate positioning the printer above any one of said article containing means accommodating positions.

11. A consolidation queue as recited in claim 10 further comprising a bar code scanner carried by said carriage for inputting information into said control means.

12. A consolidation queue as recited in claim 11 further comprising means for automatically loading article containing means onto said consolidation queue.

13. A randomly accessible consolidation queue for presenting containers used in material handling operations to an operator, the consolidation queue comprising:

a frame;

queue track means carried by the frame and forming a vertically oriented endless loop having a first travel reach and a second travel reach, said queue track means including:

a compression chain having a multiplicity of pivotably coupled linkage bars, a multiplicity of axles for pivotally coupling adjacent linkage bars, and a multiplicity of brackets, wherein a first end of each said bracket is mounted to a particular one of said axles and a second end of each said bracket is secured to another bracket at a position that is spaced apart from said compression chain to form a pivot point;

a multiplicity of vertically spaced shelf pans carried by the queue track means for holding said containers, said shelf pans including a pair of suspension struts that are pivotally coupled at a particular pivot point, said shelf pans being positioned at substantially equal increments about the queue track means such that a first multiplicity of shelf pans are located on the first travel reach and a second multiplicity of shelf pans are located on the second travel reach, and the shelf pans being pivotally coupled at a particular pivot point so they remain substantially horizontal as they are carried between the first travel reach and the second travel reach;

a drive for rotating the shelf pans about the endless loop;

opening means for transferring a container from a shelf pan on the first travel reach to a loading area to facilitate inserting articles into and removing articles from the container; and means for unloading a container from the consolidation queue on a back side thereof by extracting the container from a shelf pan located on the second travel reach, the opening means and the unloading means being arranged to allow simultaneous transfer of a container to said loading shelf from a shelf pan on the first travel reach and extraction of a container from a shelf pan on the second travel reach of the queue track means.

14. A consolidation queue as recited in claim 13 wherein said opening means includes a first set of selectively actuatable rams disposed in the interior of the consolidation queue between said first travel reach and said second travel reach for pushing a selected container from a shelf pan onto said loading shelf.

15. A consolidation queue as recited in claim 14, wherein said unloading means includes a second set of selectively actuatable rams disposed in the interior of the consolidation queue, between said first travel reach and said second travel reach, for pushing a container from a shelf onto an unloading track disposed on the back side of the consolidation queue.

16. A consolidation queue as recited in claim 13 wherein said axles are disposed between spaced-apart guide rollers, and said queue track means further includes a guide track for receiving said guide rollers for travel thereabout.

17. A consolidation queue as recited in claim 13 wherein said drive includes a pair of spaced-apart drive chains, each drive chain having a plurality of links interspaced with a plurality of equally-spaced apart brackets, a plurality of rods carried by said brackets, weldment attachments pivotally coupled to the rods to engage a particular one of said axles for rotating the shelves about the endless loop.

\* \* \* \* \*